(12) United States Patent
van Leeuwen

(10) Patent No.: US 7,599,884 B2
(45) Date of Patent: Oct. 6, 2009

(54) PROGRAMMABLE JOINT PAYMENT GUARANTEE FINANCIAL INSTRUMENT SET

(75) Inventor: Robert Joseph van Leeuwen, Ottawa (CA)

(73) Assignee: Bob van Leeuwan, Ontario (CA)

( * ) Notice: Subject to any disclaimer, the term of this patent is extended or adjusted under 35 U.S.C. 154(b) by 1364 days.

(21) Appl. No.: 10/145,636

(22) Filed: May 16, 2002

(65) Prior Publication Data

US 2002/0198827 A1 Dec. 26, 2002

(30) Foreign Application Priority Data

Jun. 12, 2001 (CA) .................................. 2350445

(51) Int. Cl.
*G06Q 30/00* (2006.01)
(52) U.S. Cl. ...................................................... 705/39
(58) Field of Classification Search ............. 705/39–40, 705/35, 42–44, 64–70, 74–78; 713/156–159, 713/168–181; 726/1–21
See application file for complete search history.

(56) References Cited

U.S. PATENT DOCUMENTS

| | | | | |
|---|---|---|---|---|
| 6,098,053 A * | 8/2000 | Slater | ........................... | 705/44 |
| 6,151,588 A * | 11/2000 | Tozzoli | ......................... | 705/37 |
| 6,332,133 B1 * | 12/2001 | Takayama | ..................... | 705/39 |
| 6,529,885 B1 * | 3/2003 | Johnson | ........................ | 705/64 |
| 7,155,409 B1 * | 12/2006 | Stroh | ......................... | 705/37 |
| 7,433,845 B1 * | 10/2008 | Flitcroft et al. | ................ | 705/44 |
| 2001/0044764 A1 * | 11/2001 | Arnold | .......................... | 705/35 |

OTHER PUBLICATIONS

Scarlata, "Institutional Developments in the Globalization of Securities and Futures Markets", Jan./Feb. 1992, Federal Reserve Bank of St. Louis Review, v74n1, pp. 17-30.*

* cited by examiner

*Primary Examiner*—Mary Cheung

(57) ABSTRACT

A number of implementations of a transaction settlement process are illustrated. A system verifies buyer, seller, and financial institution data and instructions. The system stores buyer credit information, and the joint transaction instructions of buyers, sellers, and financial institutions. The system verifies invoice data against the transaction instructions and the buyer's acceptance instructions, and choose, based on the inputs, whether electronic credit or money is sent to either a joint electronic account of the buyer and the seller, or to the electronic account of the seller.

3 Claims, 41 Drawing Sheets

JOINT PAYMENT GUARANTEE

JOINT PAYMENT GUARANTEE

Fig. 6 OPEN CREDIT

JOINT PAYMENT HOLD

Fig. 13 — JOINT PAYMENT HOLD

LONG TERM JOINT PAYMENT HOLD

CREDIT CHECK

Fig. 19 CREDIT CHECK

Fig. 20 CREDIT CHECK

Fig. 21 BLENDED PAYMENT

PRO-FORMA

PRO-FORMA

Fig. 26 PRO-FORMA

Fig. 28

| TRANSACTION STATUS | | | PHYSICAL | | | DIGITAL | |
|---|---|---|---|---|---|---|---|
| ACTIVA-TION | | DATE & TIME | OK/NG | AUTHENTI-CATION | DATE & TIME | OK/NG | AUTHENTICATION |
| NORMAL | CERTIFICATE | | | IOB2, IOB22, BANK1, (BANK21) | | | |
| NORMAL | REGISTRATION | | | JPG SP | | | |
| NORMAL | DELIVERY | | | IOB22 | | | |
| NORMAL | DELIVERY ACCEPTANCE | | | IOB2 OR REPRESENT-ATIVE | | | |
| TIMEOUT | SETTLEMENT REQUISITION | | | JPG SERVICE PROVIDER | | | |
| NORMAL | SETTLEMENT REQUISITION | | | IOB22 | | | |
| NORMAL | SETTLEMENT PAYMENT | | | IOB2 & BANK1 | | | |
| TIMEOUT | SETTLEMENT PAYMENT | | | BANK1 | | | |
| REMEDIAL | UPDATE REQUEST | | | IOB2 | | | |
| REMEDIAL | UPDATE APPROVAL | | | IOB22, BANK1, (BANK21) | | | |
| REMEDIAL | SETTLEMENT PROPOSAL | | | IOB2, IOB22 | | | |
| NORMAL | SETTLEMENT PAYMENT | | | JPG SERVICE PROVIDER | | | |
| FOR END | REVOCATION | | | JPG SERVICE PROVIDER | | | |

What is this
E-commerce Financial Instrument (EFI)?

Combination of:
1. Business processes and rules
2. Software
3. Platform
4. Communications with security With the added ability to provide the sharing of risk Flexible financial instrument that allows buyer and sellers to:
- share risk; and
- handle any transaction size.

Fig. 35

Industry Snapshot (with EFI)

"How do you ensure that potential trading partners can live up to their end of the bargain?"

Contracts: 0%
Prequalifications: 0%
Escrow: 0%
Line of Credit: 0%
Rely on eMarketplaces: 0%
Rely on reputation: 0%
Do nothing: 0%
EFI: 100%

The EFI virtually Guarantees both parties will play fair......
It is an instrument of TRUST, as well as business transactions.

| SECRET KEY | AUTHENTICATING ORGANIZATION CERTIFICATE |
|---|---|
| K(S, TC) | PUBLIC KEY KP, TC |

| DEVICE ID | COMMON KEY | AUTHENTICATING ORGANIZATION CERTIFICATE | TRANSMISSION RECEIPT-EXCLUSIVE COMMON KEY WITH TRANSACTION MANAGEMENT DEVICE | TRANSMISSION/RECEIPT-EXCLUSIVE COMMON KEY WITH TRANSACTION MANAGEMENT DEVICE | |
|---|---|---|---|---|---|
| | | PUBLIC KEY | | PUBLIC KEY | SECRET KEY |
| A | K(C, A) | K(P, A) | K(C(A), TC) | K(P(TC), A) | K(S(TC), A) |
| Z | K(C, Z) | K(P, Z) | K(C(Z), TC) | K(P(TC), Z) | K(S(TC), Z) |

PROGRAMMABLE JOINT PAYMENT GUARANTEE FINANCIAL INSTRUMENT SET

FIELD OF THE INVENTION

Person to Person, Person to Business, Business to Business, Commerce, with emphasis on electronic commerce, in the field of Contingency Trade Credit Instruments The present invention relates to a delayed settlement instrument set, including a contingency delayed payment reservation and settlement instrument (JPG), a dual path delayed settlement instrument which uses time or object information (OC), a payment reservation and settlement instrument (JPH), a payment reservation, allocation, and long-term settlement instrument (LT JPH), a delayed credit reservation instrument (CC), a blended delayed payment instrument, capable of contingency and delayed payment reservation settlement processes (BP), a payment settlement planning instrument (PF), a handheld device settlement system for the delayed settlement of money, and an encryption system for maintaining the privacy of the settlement processes.

DESCRIPTION OF RELATED ART

As for conventional payment means, payment is popularly made in cash, by cheque, note, transfer between banking accounts, including those governed by a letter of credit, prepaid card, and credit card.

Common payment methods are prepayment methods by which payment is made before receiving goods, immediate payment upon receipt of goods, and delayed payment after receipt of goods. However, in any of these payment methods, a purchaser is subject to a risk of receiving goods and a payment risk, whereas a seller is subject to a collection risk of receiving payment That is, in the prepayment method, a purchaser is subject to the risk of receiving goods, namely that the purchaser may not receive goods even after the payment is made by any payment means, or the purchaser may not be satisfied with the received goods. There also may arise the payment risk that the already paid money may not be refunded.

In the immediate payment on the receipt of goods, a payment means is limited to cash, cheque, etc. Furthermore, although a purchaser can receive goods in exchange for the payment, the purchaser cannot carefully check the received goods. Therefore, the purchaser is subject to the risk of receiving goods, in that the received goods are not satisfactory. There is also a payment risk as in the prepayment method.

In the delayed payment after receipt of goods, however, a seller is subject to the collection risk, in any of the above described payment means, that the expense cannot be collected, or if collected, may take a long time and large expenses on collection efforts, even after the goods are delivered.

When a purchaser is not satisfied with the contents of the received goods, he or she can return the goods to the seller of the goods. However, the purchaser is also subject to the risk that the paid money is not refunded, and it may take a long time to get back even if it should be successfully refunded.

Furthermore, another problem may arise with digital contents such as software, image data, etc. transmitted through a communications network, goods that are delivered by an organization other than that of the seller, or goods that are constructed after the initiation of a purchase agreement. That is, such intangible goods or goods where delivery verification is second-hand, are subject to the risk that a purchaser may refuse the payment by insisting the poor quality of the received goods even after the goods have been successfully delivered to the purchaser.

As described above, in the conventional settlement system in any payment method with any payment means, a payee such as a seller of goods. a service provider, etc. is subject to a collection risk, and a payer such as a purchaser, service requester, etc. is subject to the risk of receiving goods or a payment risk. Both the payer and the payee are subject to the risk of returning goods.

If payment is refused by a payer, collection of payment might requires the intervention of the courts, the courts often have to order the seizure of property which can then be sold to make payment to the claimant. Using conventional payment methods, where the payment is not guaranteed against an asset, the claimant (or payee) is subject to a bankruptcy or insolvency risk of the payer during the period of the collection process. The claimant is also subject to a collection effort cost.

OBJECTS AND SUMMARY OF THE INVENTION

Therefore, an object of the present invention is to provide a computer system with a software algorithm which avoids the disadvantages of prior art mentioned herein.

Another object of the present invention is to store the credit data of any buyer.

Another object of the present invention is to provide a computer system which stores the credit data of any buyer in a manner which allows the subdivision of the credit applied to a single secured asset owned or partially owned by the buyer.

Another object of the present invention is to provide a computer system which stores the credit data of any buyer in a manner which allows the aggregation of forms of credit, including a subdivision of credit applied to a single secured asset, to be used as a block of credit by the buyer.

Another object of the present invention is to provide a computer system which stores the joint transaction instructions of any buyer, seller and financial institution.

Another object of the present invention is to provide a computer system which executes the transaction instructions of any buyer, seller and financial institution.

Another object of the present invention is to provide a computer system which allows the buyer to advance a partial security interest to the seller.

Another object of the present invention is to provide a computer system which, when an a priori agreed event takes place, will conduct a transaction in accordance with instructions provided any buyer, seller, and financial institution.

Another object of the present invention is to provide a computer system which, when an a priori agreed event takes place, will conduct a trade credit transaction in accordance with instructions provided any buyer, seller, and financial institution.

Another object of the present invention is to provide a computer system which will record a reservation of secured types of trade credit in a manner which will legally survive bankruptcy.

In accordance with an aspect of this invention, a method wherein each of the buyers, sellers, and financial institutions involved in a joint transaction, enter their transaction instructions and conditions into the computer system.

In accordance with another aspect of this invention, a method wherein a joint transaction instruction set, containing the instructions of each of the buyers, sellers, and financial institutions involved in a joint transaction, to be modified at the request of any of the parties, with the consent of the other parties.

In accordance with aspect of this invention, a method by which successive transactions are completed, where each succeeding transaction can only be finalized after the correct completion of the preceding transaction.

In accordance with another aspect of this invention, a method by which an amount of time can be inserted into a transaction.

Problems that this invention is intended to solve:
1. When people and/or businesses agree to buy and supply from and to each other, respectively, and there is uncertainty that is introduced in the transaction, the financing and the delivery of the product become emotionally and logistically intermingled. Distrust on the product delivery side creates an environment that creates distrust on the financial side. This instrument set reduces or eliminates the distrust on the financial side of buy/sell agreements that, at some point between the initiation of the business relationship and final settlement, are in dispute, as it gives the payer and payee parties equal ability to regulate movement of financial resources reserved for the agreed transaction.
2. When transaction processes are engaged, a period of time elapses from the point of the initiation of the transaction and the acceptance of the product for use by the buyer. During this period, the buyer or the seller may encounter circumstances which require both parties to re-negotiate the terms of the transaction. This instrument set allows the contingency reservation of the transaction amount as an incentive to bring the two parties to consensus, given the change in circumstances.
3. Parties may have a series of transactions over time, during which the relationships between the parties may change in a manner affecting one or more of the transactions. This instrument allows for contingency reservation of the transaction amount as an incentive to bring the two parties to consensus, given the change in circumstances.
4. In the case where a seller extended credit to a buyer, and payment was refused, there was no guarantee that money or the financial assets in the amount of the agreement were actually available for settlement until after the collection process, which might involve litigation, was resolved. This instrument allows the reservation of the proposed settlement payment in total in the case of a dispute.
5. In the case where prepayment was made by the buyer, the amount prepaid could not be prevented from reaching an unethical seller. This instrument allows the buyer the ability to prevent payment from reaching the seller when the buyer is not satisfied with what the seller has delivered.
6. In some supply agreements, the payment method that both parties can agree to, can not be covered by an individual payment method. In these cases, a mix of financial instruments may be required. This instrument allows the parties to mix instrument types to suit the specific transaction.
7. For buying businesses or individuals, receiving credit from suppliers is quite often based on the level of trust they have built up over time. On the financial side, this level of trust is based on previous payment history. This instrument allows the issue of trust for the financial side of the transaction to be dealt with in a manner that reduces or eliminates the need to build up financial history with each supplier or suppliers in general.
8. For suppliers, receiving payment within the agreed timeframe, and/or within the terms of the purchase agreement can be difficult. This instrument provides a method to assure the supplier that payment will be extracted from the buyer within the time frame specified.
9. Individuals or businesses may wish to distribute their assets to other individuals or businesses over a period of time, while distributing joint control of the use of those assets immediately. This instrument allows for that type of distribution to take place.
10. Individuals may wish to control ownership and control of asset disbursement independently. This instrument allows ownership to be split independent of joint control of the assets.
11. Individuals or businesses may wish to determine the whether the amount of assets available for distribution from a buyer to that individual or business will cover the amount of a transaction agreement. This instrument allows a credit check to be accomplished using a(n electronic) database against assets which the individual or business has committed to the financial service provider or bank, as part.
12. Individuals or businesses may wish to blend payment terms for transaction agreements. This instrument allows payment terms to be blended as part of a general transaction agreement.
13. Previously, the financial institution of the payer would normally establish a claim independently, and with priority over, all other creditors. This invention allows creditors who use this instrument to establish a claim at the same level as the financial service which secures the asset or secures a number of assets to be used as the guarantee, where the subdivision of a claim on assets is used as the payment settlement amount. Furthermore, this invention effectively allows a subdivision of a single security interest, or subdivision of a plurality of security interests by using the financial institution as the clearance house for granting credit against these security interests.
14. Previously, a financial institution would fully guarantee payment by paying a settlement amount within the terms of the payment method. This invention allows the bank or financial service organization which secures the buyer's assets, to guarantee payment in a way that requires no transaction to take place until and unless an invoice is not paid by the payer within a previously agreed time period between invoice and payment. In this way, the buyer does not lose the ability to accrue interest until payment is due, and the bank or financial service organization does not lose the ability to accrue interest on its resources.
15. This invention allows the bank or financial service organization to guarantee payment of a payer without requiring a settlement transaction to put the guarantee in place, unless the required payer payment is not executed.
16. This invention allows a buyer to show a vendor exactly the amount of credit availability necessary to cover the purchase amount.
17. This invention allows more than two parties to have joint control over the distribution of assets.
18. This invention allows buyers to use secured assets to obtain vendor credit.
19. This invention allows claims by a vendor on a buyer's asset(s) to be registered prior to a court order.
20. This invention increases the probability that receivables are collectable, allowing banks or financial service organizations to use a higher percentage factor when assessing receivables for the purpose of extending credit.
21. Previously, some vendors might be required to post a security bond, as a guarantee of job performance. This invention, when used by a vendor as a security guarantee, can eliminate the need for a security bond (in this case the vendor would be the payer in a JPG arrangement).

22. Previously, an unethical buyer might commit to payments in excess of his or her ability to pay, based on their corporate asset value. This invention provides the ability to eliminate the possibility of a payer committing to payment guarantees in excess of the amount of security interest registered by the bank or financial service organization.

23. This invention provides the ability to transfer legal and/or taxable ownership of assets from one party to another, while the said assets are held within a Joint Payment Hold or Long Term Joint Payment Hold facility.

24. At present, when using an escrow account, it is not possible to earn interest by law, at least in the U.S. This joint payment hold instrument allows parties to enter into an agreement that may be long term in nature, where the value of keeping the funds in an escrow account would be diminished greatly by the amount that the funds would be restricted from earning when compared to an investment account.

25. At present, individuals and corporations entering a long term relationship (i.e. a marriage, partnership, or merger) may bring certain assets to the relationship over which they wish to retain some form of control. However, there is no financial process that allows those individuals and corporations to share control while determining the movement of those assets over a period of time after the initiation of a long term relationship.

26. At present, there is no similar instrument available that would allow them to block the other party from using those assets without their permission and still be able to use those assets for investment purposes, once the partnership is recognized by law.

27. As part of a stepped process, there is no financial instrument available that allows the parties to agree on the use of disputed assets, where those disputed assets would be allocated after a dispute arises in the manner of this joint payment guarantee financial instrument.

How this was done previously:

a) Previously. for suppliers, payment could be assured within the specified timeframe and/or within the specified terms of a purchase agreement could be assured by creating a letter of credit between the two companies. However, a letter of credit is not constructed to deny both parties of the interest and credit benefits that accrue during the period of a dispute between the parties. In the case where the subject of dispute allows the payer, within the terms of the letter of credit, to retain the payment amount, the payer accrues the interest and credit benefits for the period of the dispute. In the case where the subject of dispute allows the payee to force payment, within the terms of the letter of credit, the payee may accrue interest and credit benefits for the period of the dispute. The party which does not retain the payment amount during the dispute loses the interest and credit benefits, and acquires the risk that the other party with be declared insolvent or bankrupt at any point before the dispute is settled.

b) Previously, if the transaction agreements were affected by a change in the relationship between the parties, the transaction would either be stopped (no payment made), reversed (payment was sent back to the buyer by the seller), or kept by the seller. All of these payment settlements would be under the control of the party (payer or payee) who possessed the settlement money at the time settlement was initiated. In this invention, control of the settlement money at the time settlement is initiated is given jointly to the payee and the payer.

c) Previously, for buyers, supplier credit payment time, could be extended by the use of a credit card, if the supplier had credit card facilities, in those cases where the supplier required an underwriter for the buyer's credit.

d) Previously, if financial instruments were to be mixed, each would have to be negotiated separately. For example, if paying by credit card and cheque, each payment would be settled separately.

e) Previously, protection from an unethical seller could be accomplished by the use of a, "gold" credit card service. This service required the seller to place a large deposit with the credit card company, to act as a guarantee, to be drawn upon in cases where customers required repayment because of dissatisfaction with the product(s) delivered.

f) Previously, an escrow service could hold funds in the anticipation of the possibility of a dispute. However, there was no financial vehicle to place funds in joint custody after the initiation of a transaction.

g) Previously, vendors could only buy blanket insurance coverage against non-payment of buyers as a contingency trade credit product. There was no instrument available that would provide a contingency arrangement on individual transactions.

h) Previously, individuals and businesses relied on their own internal credit manager to decide the level of trust they could extend financially to another individual or business.

i) Previously, businesses could set up joint ownership of a corporation to distribute joint control over assets, but there was no facility to allow for joint control of distribution of those assets unless ownership was exactly evenly split between two parties and there was no instrument that could give joint control to more than two parties. For three parties or more, there was no consensus financial instrument.

j) Previously, ownership could be given without control by the establishment of a trust. However, control of the trust was not normally shared in a manner requiring consensus.

k) Previously, suppliers could ask for bank and/or trade references, a purchase order, a partial or whole prepayment, a letter of credit, an escrow agreement, or a credit card debit as some guarantee that some or all parts of the payment amount would be reserved for the transaction. Bank and/or trade references will only indicate observed behaviour, but do not guarantee the transaction amount. Prepayment reduces the ability of the payer to make money on assets that otherwise would be distributed after delivery. Letters of credit are agreements between two specific parties, and guarantee payment on a non-changeable format of demand and therefore do not protect payer and payee equally for events which occur after the agreement has been struck. For example, in the case where the payer's financial institution is obligated to make payment upon demand from the payee, the payer therefore relies on the goodwill of the payee to reduce the payment demands, should developments between the initiation of the letter of credit and the demand for payment reduce the amount the payer wishes to pay.

l) Previously, payments which were blended would require an individual transaction agreement to be registered for each payment facility.

m) Previously, when assets were used to secure credit, through the use of registered security interests, claims on these assets through the disbursements enabled by the sale of these assets were settled by paying, in full, claims in order of the registration of those security interests. The first-registered security interest was paid first, the second-registered security interest is paid second, and so on until all the funds were disbursed. In the case of insolvency or bankruptcy, usually only the first-registered creditors would get any payments.

n) Previously, credit card companies would pay the vendor at the end of the business day in which the transaction was registered. This would cause the credit card company to lose the benefit of interest accrual on the payment amount for the time period between payment to the vendor and repayment of the account by the buyer.

o) Previously, a vendor would have to purchase non-payment insurance in order to get a payment guarantee which would enable a transaction only after the promised payment was not enacted.

p) Previously, in order to obtain vendor credit, the buyer would have to allow the vendor conduct a credit check, to the level that the vendor felt necessary in order to establish credit worthiness. This credit check process was not satisfactory to the vendor, because there would be no specific reservation of credit specifically for that vendor. This credit check process was not satisfactory to the buyer, because the vendor would be able to see the entire value of the credit facility available to the buyer, which the buyer might want to keep confidential.

q) Previously, vendors extending credit would be extending that credit as subordinated debt.

r) Previously, vendors would have to obtain a court judgment in order to establish a claim on a buyer's assets.

s) Previously, a bank or financial service organization would apply a very low percentage factor to a business receivables.

t) Previously, credit card companies would require a security bond from vendors, which would be used to guarantee that transactions unsatisfactory to buyers could be reversed in the case of a dispute.

u) Previously, credit lines were issued using cheques as a method of specifying amounts which could be withdrawn. There was no way of assuring the vendor that the buyer was not overdrawing their account for the period between the purchase agreement until the cheque was presented for payment.

v) Previously, one or the other party would retain the use of the assets, in the case of a transaction, until after the transaction was complete or the dispute was resolved.

w) Previously, assets would be protected in a long term relationship by litigation after the assets were used without the other partners permission. In marriages, pre-nuptial agreements are now being used to clarify the legal terms, but litigation is still necessary to block the use of funds.

x) Previously, there was no stepped process available in a single financial instrument.

The key unique aspects of this invention:
Within the scope of the descriptions provided:

1) This invention allows the buyer's financial institution to guarantee delayed payment of funds from a payer's general-use credit facility.

2) This invention gives suppliers an ability to do a delayed credit check with their client's financial institution, and have that financial institution guarantee the proposed amount of the delayed credit check payment for no more than the amount of the delayed credit check agreement.

3) This invention allows sellers to ensure future extraction of a payment amount from their clients financial institution, using only a payment demand.

4) This invention allows sellers, that extend credit, to ensure payment is received within the time specified on the purchase agreement.

5) This invention allows buyers to ensure that sellers do not receive delayed payment until the buyer has agreed that payment is due.

6) This invention allows buyers and sellers, individually or in combination, to stop the settlement of a delayed payment amount using a facility where the disbursement of that amount is controlled by the respective parties.

7) This invention allows buyers and sellers to individually apply delayed payment terms to individual supply agreements.

8) This invention allows buyers and sellers to choose from more than one financial instrument when negotiating a delayed payment agreement. This instrument includes a joint payment guarantee, an open credit, joint payment hold, a long-term joint payment service, a credit check, a blended payment, and a pro-forma configuration.

9) This invention allows the financial institution guaranteeing delayed payment to choose secured debt, subordinated debt, or a combination thereof.

10) This invention gives individuals or businesses a method to reserve the payment amount until settlement of disputes, when there is a failure of either the buyer of the seller to satisfy the other in a purchase agreement.

11) This invention allows buyers and sellers to use a contingency trade credit instrument on an individual transaction.

12) This invention allows buyers and sellers to use a contingency trade credit instrument on a portion of an individual transaction.

13) This invention allows a plurality of individuals or businesses to choose, over time, how to transfer allocations of an asset base to another plurality of individuals or businesses in a controlled manner, using a plurality of trade credit instruments.

14) This invention allows individuals or businesses to plan future transactions in a binding manner.

15) This invention allows delayed transaction agreements to be enacted based on the successful completion of a previous transaction.

16) This invention allows agreements to be re-negotiated, extended, or discontinued, with the joint agreement of the parties involved.

17) This invention provides a way for a single level of claim on an asset may be subdivided between various payees.

18) This invention provides a way of choosing an asset from a variety of assets to use as the payment guarantee.

19) This invention provides a way to use a plurality of assets as a plurality of guarantees against a plurality of payment claims by a plurality of claimants.

20) This invention increases the potential interest accrual of both the buyer and the bank or financial service organization for the time period between the transaction agreement and enactment of the guarantee.

21) This invention allows buyers to use secured assets to obtain vendor credit.

22) This invention allows claims by a vendor on a buyer's asset(s) to be registered prior to a court order.

23) This invention provides a method, which, if used to transfer a security interest, or, where allowed by law, a subsection of a security interest, to a third party, to use a security interest to gain vendor credit.

24) This invention allows investments to be made within joint payment hold agreement;

25) This invention allows parties to pre-specify or post-specify investment agreements for funds involved in a dispute;
26) This invention allows a settlement mechanism to pay the users back for long-term use of the instrument;
27) This invention allows parties entering a partnership to retain control of the delayed disbursement and re-allocation, either individually or collectively, of the assets they bring into the relationship.
28) This invention allows the contingency reservation of the transaction amount as an incentive to bring the two parties to consensus, given the change in circumstances.
29) This invention allows for contingency reservation of a delayed transaction amount as an incentive to bring the two parties to consensus, given a change in circumstances.
30) This invention reserves the payment amount of a delayed agreement total in the case of a dispute.
31) This invention allows the buyer the ability to prevent payment from reaching the seller when the buyer is not satisfied with what the seller has delivered.
32) This invention allows the parties to mix financial instrument types to suit the specific transaction.
33) This invention allows the issue of trust for the financial side of the transaction to be dealt with in a manner that reduces or eliminates the need to build up financial history with each supplier or suppliers in general.
34) This invention provides a method to assure the supplier that payment will be extracted from the buyer within the time frame specified.
35) Individuals or businesses may wish to distribute their assets to other individuals or businesses over a period of time, while distributing joint control of the use of those assets immediately. This invention allows for that type of distribution to take place.
36) This invention allows ownership to be split independent of joint control of the assets.
37) This invention allows a delayed credit check to be accomplished using a(n electronic) database against assets which the individual or business has committed to the financial service provider or bank, as part.
38) This invention allows payment terms to be blended as part of a general transaction agreement.
39) This invention allows creditors who use this instrument to establish a claim at the same level as the financial service which secures the asset or secures a number of assets to be used as the guarantee. This effectively allows a subdivision of a single security interest, or plurality of security interests.
40) This invention allows the bank or financial service organization which secures the buyer's assets, to guarantee payment in a way that requires no transaction to take place until a payment demand is not paid within the previously agreed time period between payment demand and payment. In this way, the buyer does not lose the ability to accrue interest until payment is due, and the bank or financial service organization does not lose the ability to accrue interest on its resources.
41) This invention allows the bank or financial service organization to guarantee payment without requiring a settlement transaction to put the guarantee in place, unless the required payment is not executed.
42) This invention allows a buyer to show a vendor exactly the amount of credit availability necessary to cover the purchase amount.
43) This invention allows more than two parties to have joint control over the distribution of assets.
44) This invention allows buyers to use secured assets to obtain vendor credit.
45) This invention allows claims by a vendor on a buyer's asset(s) to be registered prior to a court order.
46) This invention increases the probability that receivables are collectable, allowing banks or financial service organizations to use a higher percentage factor when assessing receivables when extending credit.
47) This invention allows an individual or business to provide a financial guarantee without buying a security bond.
48) This invention provides the ability to eliminate the possibility of committing to payment guarantees in excess of the amount of security interest registered by the bank or financial service organization.
49) This invention provides the ability to transfer legal and/or taxable ownership of assets from one party to another, while the said assets are held within a Joint Payment Hold facility.
50) This invention allows parties to enter into a joint delayed settlement agreement that allows the parties agree on the asset re-allocation during the period between the initiation of the agreement and the final settlement payment.
51) The CC configuration of this invention may be combined with the PF configuration of this invention to be used in any of the other configurations of this invention.
52) The CC and the PF configurations of this invention may be used separately or in combination to support or initiate the other configurations of this invention.
53) This invention could support a continuous stream of joint payment guarantee instruments, each following the successful completion of the previous instrument. If a previous instrument should fail to be satisfactorily completed, then the instrument stream could be programmed to halt until both parties agree to restart.
54) This invention could aid program planning by programming of financial payment agreements using the if-then-else format of normal software routines.
55) This invention could be used in conjunction with project planning tools, providing a pro-forma cash flow analysis.
56) This invention could be structured using a third party as a verification mechanism for the validity of invoices. In this way, milestone payments could be guaranteed with this instrument.
57) The configurations of this invention may be used for a plurality of parties to the agreement.
58) The configurations of this invention may be settled by transmitting payment to another settlement
59) instrument configuration within this same invention.

For a basic transaction using this invention:
1) Every Individual or Business (IOB) that wishes to use this service must establish a banking/financial service provider relationship with a bank or other financial service organization (Bank). This relationship would include a bank account (minimum for the receive side of the transaction (Bank 21)), and registration of assets and establishing a credit line with that Bank.
2) Every IOB and Bank must have an agreement with the JPG Service Provider, stating the terms and conditions under which the service is provided, and allowing the JPG Service Provider the access necessary to provide and/or access the services related to that agreement.

Existing Systems
1) 3$^{rd}$ party settlement processing unit G
2) Communications, document, and electronic money transmission services, which include, but are not limited to, the internet, EDI (Electronic Data Interchange), handheld communication device, telephone, fax, courier, mail, and teletype. These services may include security or encryption to guard against the unintentional release of confidential or proprietary data, or the loss of property.
3) Bank1 (Financial institution of the payer)
4) Bank21 (Financial institution of the payee)
5) IOB2 (Payer)
6) IOB22 (Payee. In the case of the LT JPG configuration of this invention, IOB22 can be required to issue settlement payments. For the purposes of this invention description, however, we will always refer to IOB22 as the payee.)
7) National payment clearing house/association (NACHA and its associates in each state in the U.S.A. and CPA (Canadian Payments Association) in Canada. Others in other countries. All monetary settlements between parties are conducted through these organizations. For the purposes of this invention description, when stating a settlement is executed, the settlement is assumed by default to be cleared through the NPA(s) of the country or countries involved in the execution of the transaction. For the purposes of transmission of ownership of, or a security interest in, assets, the national payment/clearing house/association description herein refers to the organization that registers those transactions. For example, the Land Registry Office registers transfer of ownership of, and security interests against, property for the Province of Ontario, Canada.

Things that are new:
i) The JPG service provider 5
ii) The JPG deposit facility 6
iii) The JPG service agreement and methodology
iv) The relationships of each party to the JPG service provider Some Definitions:

Certificate Management information may include, but is not limited to:
Purchase Order Number
Payer Information
Payee Information
JPG Service Provider Information
Payer's Financial Institution Information
Payee's Financial Institution Information
Independent 3$^{rd}$ Party Information (if required)
What type of certificate this is. Choices are:
  i) Joint Payment Guarantee
  ii) Open Credit
  iii) Joint Payment Hold
  iv) Long Term Joint Payment Hold
  v) Credit Check
  vi) Blended Payment
  vii) Pro-Forma
Certificate status and subtype information, including, but not limited to:
  i) Settlement request
  ii) Update request
  iii) Copy of registration
  iv) Proposal
  v) Revocation request
  vi) Settlement information
  vii) Receipt
  viii) Status
  ix) Next procedure
Type of electronic money and amount(s) allocated to the payment method(s)
Certificate Expiry Date
Authorization information Account Management information may include, but is not limited to:
  Who the account entitlement belongs to
  What signoff procedure must be followed in order to transmit electronic money into/from the account
  Credit hold information Settlement Management information may include, but is not limited to:
  Who the settlement is coming from
  Where the settlement is going to
  When Settlements are due
  Time and/or object information which would activate settlement or the start of a settlement process Monetary Asset information may include, but is not limited to:
  What utility is being drawn against for the payment
  How much is available in the utility
  How much is reserved in the utility and for whom
  When time/dates are due to expire, and re-allocation strategy in the case of no transactions Goods sales and remedial management information may include, but is not limited to:
  The production of goods
  The shipping of goods
  The clearing/return of goods by the customer
  The rework/remedial efforts on goods returned by the customer Goods receipt management information may include, but is not limited to:
  The receipt of goods
  The acceptance/rejection/remedial cycle of goods (General Use) Credit Facility
The creation of a secured credit facility at a financial institution requires the individual or business to pledge, or secure, some collateral, or asset(s), against the amount of money that will be issued by the financial institution from the credit facility. The JPG credit facility is issued from either a secured credit facility, or from a credit facility comprised of a combination of secured and unsecured credit A primary method of securing assets is registration of a security interest by the financial institution on one or more assets of the individual or business. The most well-known form of a registered security interest is a first lien, or first mortgage on property, including land or land and buildings. Other forms include, but are not limited to, registered security interests on machinery, production equipment, cash, or marketable securities. While this invention is based on the premise of using secured credit, unsecured credit may also be advanced by the individual or business' financial institution for the provision of electronic money. The financial institution of the payer, (in other words, the issuer of the credit facility), in granting the general use JPG credit facility, in that having granted the credit facility, will generally only deny a transaction agreement if:
a) The credit facility has been discontinued;
b) The amount demanded is higher than the amount of credit facility available;

c) The transaction agreement can not or should not be executed according to the governing transaction rules.

In this way, the credit facility is used by the payer to enact a payment guarantee. The governing transaction rules allow the enactment of a guarantee by the payer, without the necessity of a financial transaction moving all or a portion of the credit facility into the control of another party.

Electronic Money Transactions

Issuance of electronic money from a credit facility requires the financial institution of the individual or business to issue money from its own cash account, which is accounted for as being borrowed from the financial institution by the individual or business.

This invention includes the use of the transfer of a security interest or a part of a security interest from the payer's financial institution to either the payee's financial institution or the JPG SP as an additional method by which electronic money can be said to be transmitted.

This invention includes the use of the transfer of ownership of assets as transmission of electronic money, including, but not limited to, the transfer of ownership in stock certificates and property.

BACKGROUND OF THE INVENTION

Joint Payment Guarantee

In the first configuration according to the present invention, a Joint Payment Guarantee settlement system includes a unit for transferring to the payee and the Joint Payment Guarantee Service Provider the money information containing the JPG settlement mechanism agreement certificate, which is settled upon one of two conditions being satisfied: either the delivery of goods has been accepted as executed by the payer, or the expiration of the time limit between the delivery of a valid invoice (settlement request) from the payee to the payer. In the former case, a unit is included for transferring settlement to the payee. In the latter case, a unit is included for transferring settlement to the JPG Service Provider, to be held in a unit, containing account information, by the JPG service provider. In this latter case settlement sent to the JPG service provider initiates an additional JPH release mechanism in the settlement mechanism. Alternately to the JPH release mechanism, and described as a separate configuration, a LT JPH release mechanism may be employed.

The JPH release mechanism includes a unit for transferring to the payer and the payee money information containing the JPH release mechanism agreement, which is settled when the payee and the payer agree to all terms of the release agreement. The JPH release mechanism contains a unit for final settlement of the money information when the release mechanism agreement has been executed.

In the above described configuration, the payer can indicate the payer's future payment capacity, to the payee, according to the money information contained in the Joint Payment Guarantee settlement mechanism agreement when the payer purchases goods and/or services. The bank or financial service organization of the payer shall, in addition to the promise of payment by the payer, guarantee the payment amount shall be sent to the JPG service provider, should the payer fail to send payment within the agreed time period after receipt of the payee's settlement request. The payee, in combination with the JPG service provider, can thus secure a future payment with a reduction in collection risk. The payee can initiate extraction of the settlement amount from the payer by submitting a valid settlement request.

The final settlement guarantee is, in the above described configuration, issued by both the payer, and the bank or financial institution of the payer. The portion of the guarantee issued from the payer is a form of trade credit. The portion of the guarantee issued from the bank or financial institution of the payer, where it underwrites the guarantee of the payer, is a form of contingency in credit.

The money information containing the JPG settlement information settled upon receipt of a properly authorized execution request is generated by the payers financial institution. It is desired that the money information contains data about the time and object information which must be satisfied in order to release payment to the payee or to confirm that payment has been released to the payee, and, in the alternative, the conditions which must be satisfied in order to release payment to the JPG service provider.

With the above described configuration, the payee can confirm, with the authentication of the payer's financial institution, that the payer's financial institution has reserved that portion of the payer's credit facility equal to the settlement amount, and can confirm the money information containing the JPG settlement information settled upon receipt of a properly authorized execution request. Therefore an object item (providing goods, services, etc.) can be executed on a future date without dependence on extension of unsecured credit by the payee to the payer, and settlement payment and payment withholding for the same can be assured without dependence on the payee's personal or corporate reputation.

It is desired that the money information containing the JPG settlement information includes authorization information about the authorization authority and procedure for receipt of objects for which payment is made. When the money information containing the JPG settlement information includes the authorization authority and procedure information for receipt of objects for which payment is made, the payer's financial institution can confirm necessary information according to more detailed information at the final settlement and effectively avoid paying a settlement in response to an illegal settlement request. Further, it prevents a payer and/or a payee from using the JPG settlement information for a transaction other than that agreed by both parties.

Open Credit

In the second configuration of the present invention, an Open Credit settlement system includes a unit for transferring to the payee the money information containing the OC settlement mechanism agreement certificate, which is settled upon one of two conditions being satisfied: either the delivery of goods has been accepted as executed by the payer, or the expiration of the time limit between the delivery of a valid invoice (settlement request) from the payee. For both the former and the latter cases, a unit is included for transferring settlement to the payee.

In the above described configuration, the payer can indicate the payer's future payment capacity, to the payee, according to the money information contained in the OC settlement mechanism agreement when the payer purchases goods and/or services. The bank or financial service organization of the payer shall, in addition to the promise of payment by the payee, guarantee the payment amount shall be sent to the payee, should the payer fail to send payment within the agreed time period after receipt of the payee's settlement request. The payee, can thus secure a future payment with a reduction in collection risk. The payee can initiate extraction of the settlement amount from the payer by submitting a valid settlement request.

The final settlement guarantee is, in the above described configuration, issued by both the payer, and the bank or financial institution of the payer. The portion of the guarantee issued from the payer is a form of trade credit. The portion of the guarantee issued from the bank or financial institution of the payer, where it underwrites the guarantee of the payer, is a form of contingency in credit.

The money information containing the OC settlement information settled upon receipt of a properly authorized execution request is generated by the payer's financial institution. It is desired that the money information contains data about the time and object information which must be satisfied in order to release payment to the payee.

With the above described configuration, the payee can confirm, with the authentication of the payer's financial institution that the payer's financial institution has reserved that portion of the payer's credit facility equal to the settlement amount, and can confirm the money information containing the OC settlement information settled upon receipt of a properly authorized execution request. Therefore an object item (providing goods, services, etc.) can be executed on a future date without dependence on extension of unsecured credit by the payee to the payer, and settlement payment for the same can be assured without dependence on the payee's personal or corporate reputation.

It is desired that the money information containing the OC settlement information includes authorization information about the authorization authority and procedure for receipt of objects for which payment is made. When the money information containing the OC settlement information includes the authorization authority and procedure information for receipt of objects for which payment is made, the payer's financial institution can confirm necessary information according to more detailed information at the final settlement and effectively avoid paying a settlement in response to an illegal settlement request. Further, it prevents a payer and/or a payee from using the OC settlement information for a transaction other than that agreed by both parties.

Joint Payment Hold

In the third configuration of the present invention, a Joint Payment Hold settlement system includes a unit for transferring to the payee and the Joint Payment Guarantee Service Provider the money information containing the JPH settlement mechanism agreement. The JPH settlement agreement is, in the first stage, settled on the condition that the JPG SP has properly executed a settlement request. In the second stage, settlement to the payee from the JPG SP is achieved on the condition that payee and the payer have jointly properly executed a settlement request.

For the first stage, the money information containing the JPH settlement information settled upon receipt of a properly authorized execution request is generated by the payers financial institution. It is desired that the money information contains data about the time and object information which must be satisfied in order to release payment to the JPG SP.

In the second stage, the money information containing the JPH settlement information settled upon receipt of a properly authorized execution request is generated by the JPG SP's financial institution. This settlement may be made to the payee, the payer, or a portion to both, according to the joint payee and payer settlement request. It is desired that the money information contains data about the time and object information which must be satisfied in order to release payment to the payee.

With the above described configuration, the payee can confirm with the authentication of the payer's financial institution that the payer's financial institution has reserved that portion of the payer's credit facility equal to the settlement amount. and can confirm the money information containing the JPH settlement information settled upon receipt of a properly authorized execution request. Therefore an object item (providing goods, services, etc.) can be executed on a future date without dependence on extension of unsecured credit by the payee to the payer, and reservation of the amount of the settlement payment for the same can be assured without dependence on the payer's personal or corporate reputation.

The final settlement guarantee is, in the above described configuration, issued by both the payer, and the bank or financial institution of the payer. The portion of the guarantee issued from the payer is a form of trade credit. The portion of the guarantee issued from the bank or financial institution of the payer, where it underwrites the guarantee of the payer, is a form of contingency in credit.

It is desired that the money information containing the JPH settlement information includes authorization information about the authorization authority and procedure for receipt of objects for which payment is made. When the money information containing the JPH settlement information includes the authorization authority and procedure information for receipt of objects for which payment is made, the payer's and the JPG SP's financial institutions can confirm necessary information according to more detailed information at the final settlement and effectively avoid paying a settlement in response to an illegal settlement request. Further, it prevents a payer, JPG SP, and/or a payee from using the JPH settlement information for a transaction other than that agreed by all parties.

Long Term Joint Payment Hold

In the fourth configuration of the present invention, a Long Term Joint Payment Hold settlement system includes a unit for transferring to the payee and the Joint Payment Guarantee Service Provider the money information containing the LT JPH settlement mechanism agreement. The LT JPH settlement agreement is, in the first stage, settled on the condition that the JPG SP has properly executed a settlement request. In the second stage, incremental settlement to the payee from the JPG SP is achieved on the condition that both the payee and the payer have jointly properly executed an incremental settlement request.

For the first stage, the money information containing the LT JPH settlement information settled upon receipt of a properly authorized execution request is generated by the payers financial institution. It is desired that the money information contains data about the time and object information which must be satisfied in order to release payment to the JPG SP.

In the second stage, the money information containing the LT JPH settlement information settled upon receipt of a properly authorized execution request is generated by the JPG SP's financial institution. It is desired that the money information contains data about the time and object information which must be satisfied in order to release payment to the payee.

With the above described configuration, the payee can confirm with the authentication of the payer's financial institution that the payer's financial institution has reserved that portion of the payer's credit facility equal to the settlement amount, and can confirm the money information containing the LT JPH settlement information settled upon receipt of a properly authorized execution request. Therefore an object item (providing goods, services, etc.) can be executed on a future date without dependence on extension of unsecured credit by the payee to the payer, and reservation of the amount of the settlement payment for the same can be assured without dependence on the payer's personal or corporate reputation.

The final settlement guarantee is, in the above described configuration, issued by both the payer, and the bank or financial institution of the payer. The portion of the guarantee issued from the payer is a form of trade credit. The portion of the guarantee issued from the bank or financial institution of the payer, where it underwrites the guarantee of the payer, is a form of contingency in credit.

It is desired that the money information containing the LT JPH settlement information includes authorization information about the authorization authority and procedure for receipt of objects for which payment is made. When the money information containing the LT JPH settlement information includes the authorization authority and procedure information for receipt of objects for which payment is made, the payer's financial institution can confirm necessary information according to more detailed information at the final settlement and effectively avoid paying a settlement in response to an illegal settlement request. Further, it prevents a payer, JPG SP, and/or a payee from using the LT JPH settlement information for a transaction other than that agreed by all parties.

Credit Check

In the fifth configuration of the present invention, a Credit Check verification system includes a unit for transferring to the payee and the Joint Payment Guarantee Service Provider the money information containing the Credit Check mechanism agreement.

With the above described configuration, the payee can confirm with the authentication of the payer's financial institution that the payer's financial institution has reserved that portion of the payer's credit facility equal to the credit check amount.

The final settlement guarantee is, in the above described configuration, issued by both the payer, and the bank or financial institution of the payer. The portion of the guarantee issued from the payer is a form of trade credit. The portion of the guarantee issued from the bank or financial institution of the payer, where it underwrites the guarantee of the payer, is a form of contingency in credit.

This configuration may be used to create the credit reservation for one of the other configurations of the present invention.

Blended Payment

In the sixth configuration of the present invention, a Blended Payment settlement system, includes a unit for transferring to the payee, the Joint Payment Guarantee Service Provider and, if required, a third party, the money information containing the BP settlement mechanism agreement. It is desired that the BP settlement agreement contains money, time and object information detailing the type of subsidiary mechanism agreement or agreements which are part of the blended settlement agreement. Using the information contained in the BP agreement, all or parts of the payment amount or amounts are settled using, individually or collectively, JPG, OC, JPH, LT JPH, and $3^{rd}$ party agreements which are specified in the BP settlement agreement.

The final settlement guarantee is, in the above described configuration, issued by both the payer, and the bank or financial institution of the payer. The portion of the guarantee issued from the payer is a form of trade credit. The portion of the guarantee issued from the bank or financial institution of the payer, where it underwrites the guarantee of the payer, is a form of contingency in credit.

Pro-Forma

In the seventh configuration of the present invention, a Pro Forma planning system includes a unit for transferring to the payee and the Joint Payment Guarantee Service Provider the money information containing the PF planning mechanism agreement.

It is desired that the money information contained in the PF planning agreement include time and object information which would have to be satisfied in order to release payment to the payee, should the PF agreement be transcribed verbatim into below mentioned configurations of this invention.

With the above described configuration, the payee and the payer can jointly plan future settlement agreements in accordance with the JPG, OC, JPH, LT JPH, CC and BP configurations of the present invention. Furthermore, when properly authorized to do so, this configuration may be structured to activate a certificate or registration of a certificate of the aforementioned types upon the receipt of properly authorized time and object information specified in the pro-forma certificate.

The final settlement guarantee is, in the above described configuration, issued by both the payer, and the bank or financial institution of the payer. The portion of the guarantee issued from the payer is a form of trade credit. The portion of the guarantee issued from the bank or financial institution of the payer, where it underwrites the guarantee of the payer, is a form of contingency in credit.

BRIEF DESCRIPTION OF THE DRAWINGS

FIG. 28, shows the transaction status information for this invention;

FIGS. 29 through 36, shows a general overview of the overall configuration for the embodiments of this invention.

FIG. 40, if provided, would show the procedures of the process (encrypted settlement process for the delayed settlement of money) according to the ninth embodiment of the invention;

FIG. 42, if provided, would show the general configuration of the settlement system according to the eighth embodiment of the present invention (handheld device usage);

FIG. 43, if provided, would show the procedures of the process (handheld device usage) according to the eighth embodiment of the invention;

DESCRIPTION OF THE PREFERRED EMBODIMENT

JPG

First, the general configuration and the procedure of the process according to the first embodiment of the present invention is described below by referring to FIGS. 1 through 4, and 5.

Figure 1:
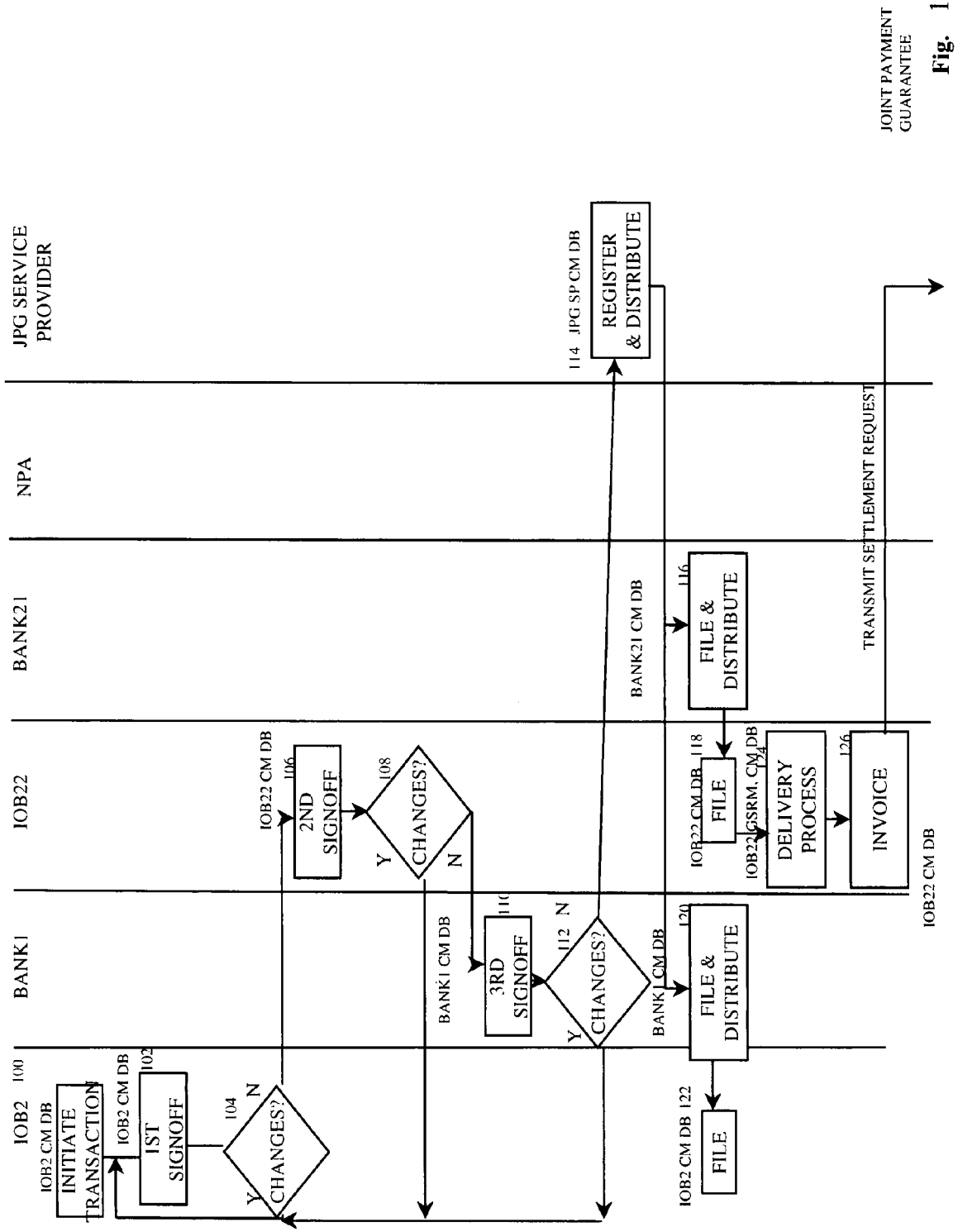
FIGS. 1 through 4, shows the procedures of the process (settlement process for the JPG settlement of money) according to the first embodiment of the present invention.
Figure 2:
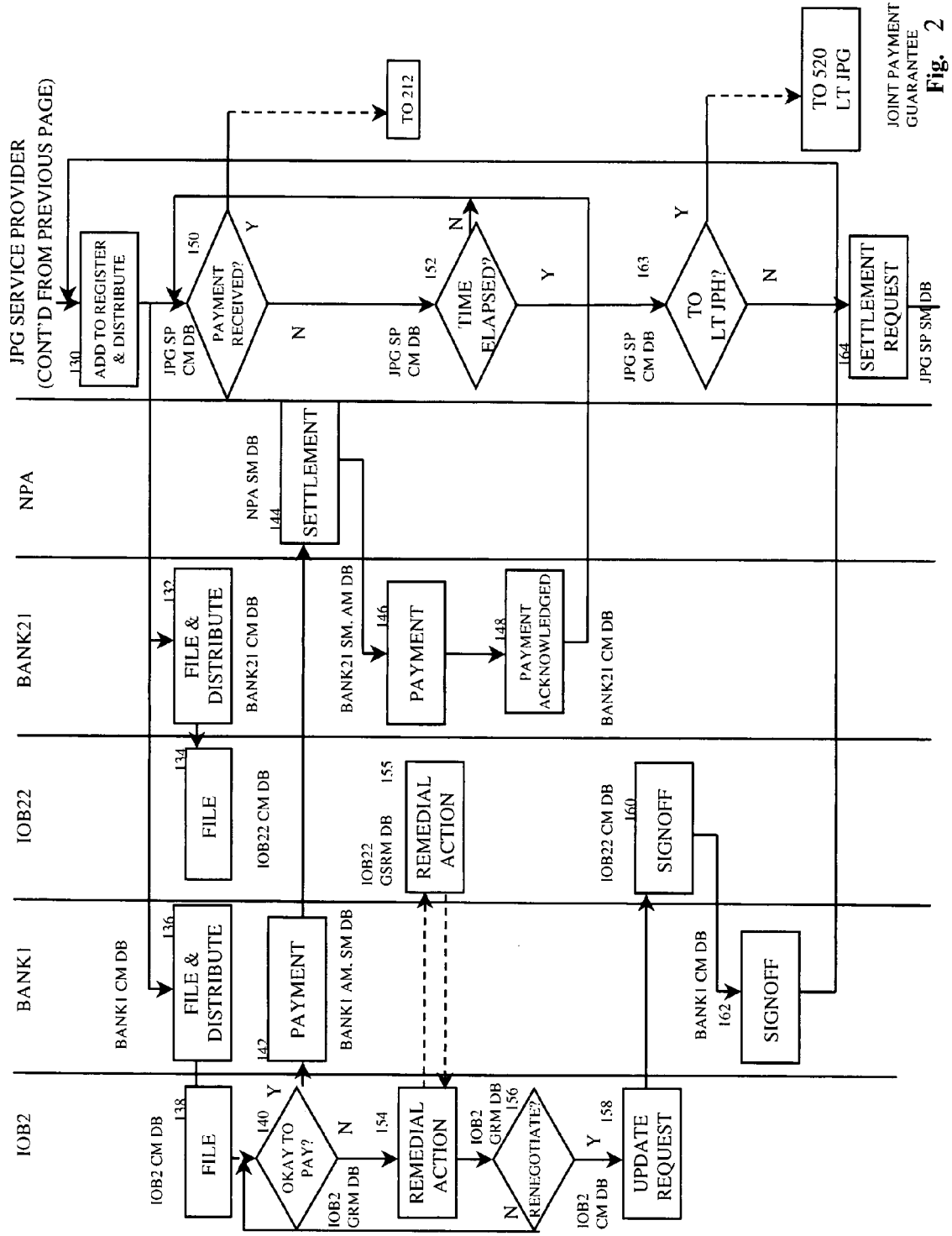
Figure 3:
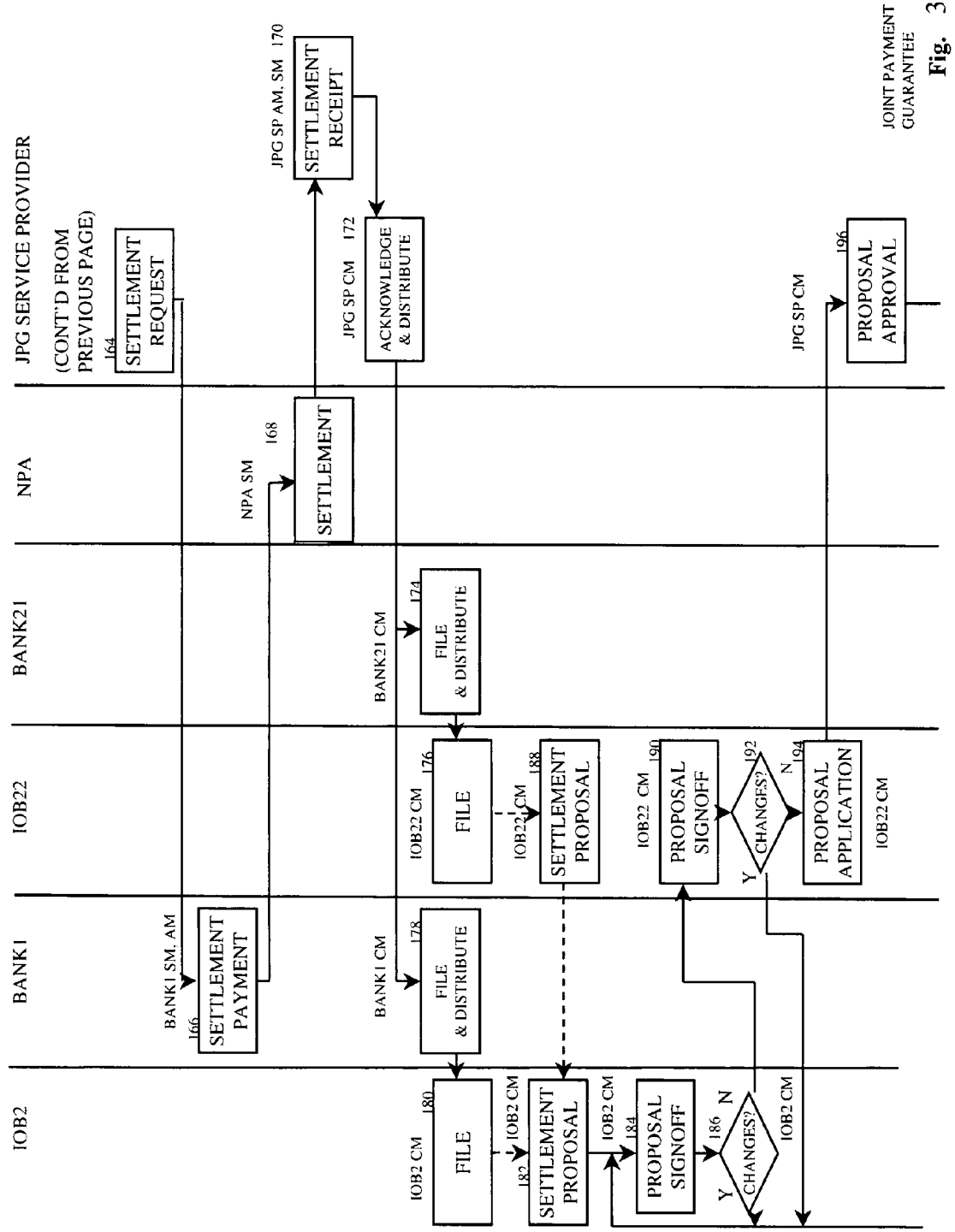
Figure 4:
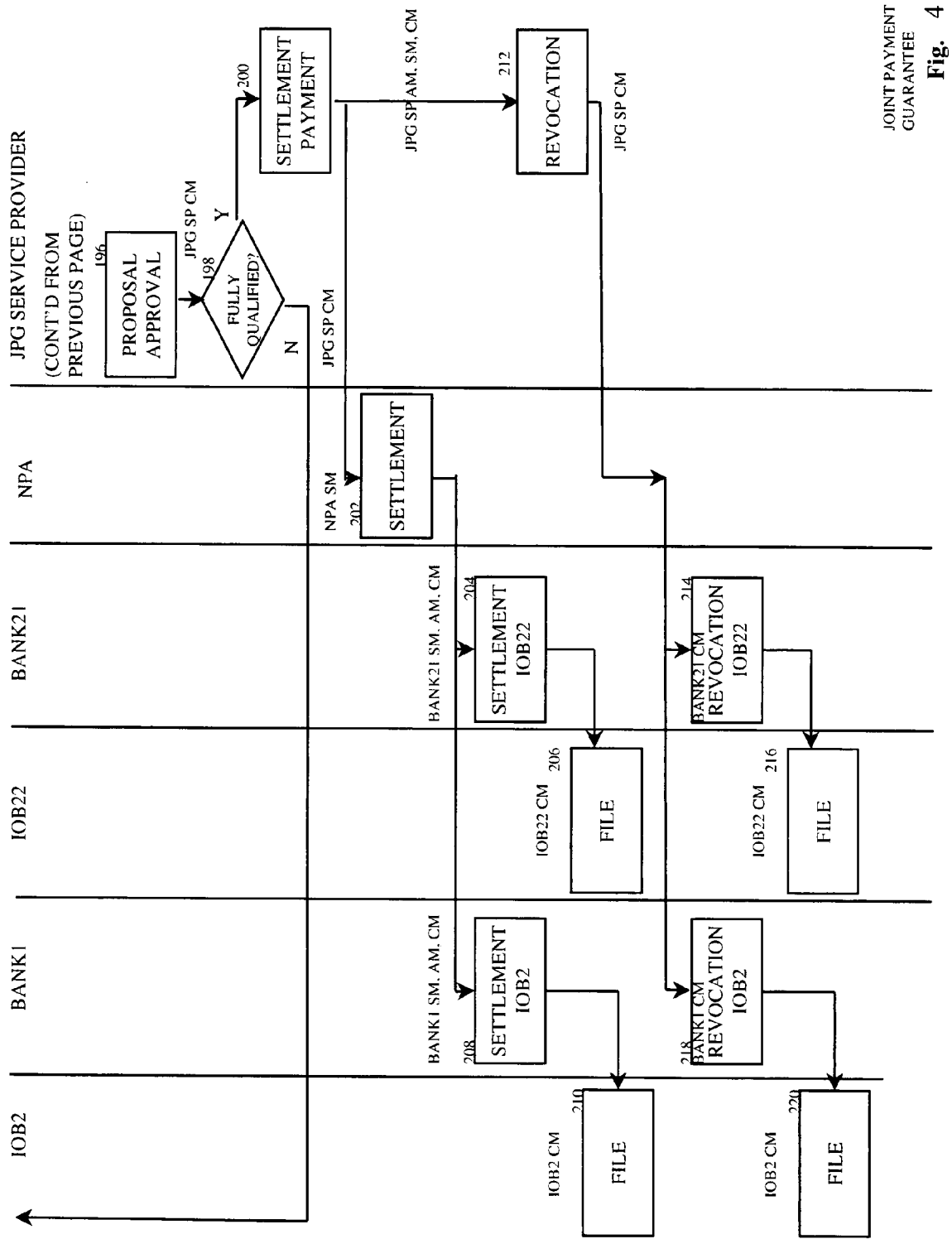
Figure 5:
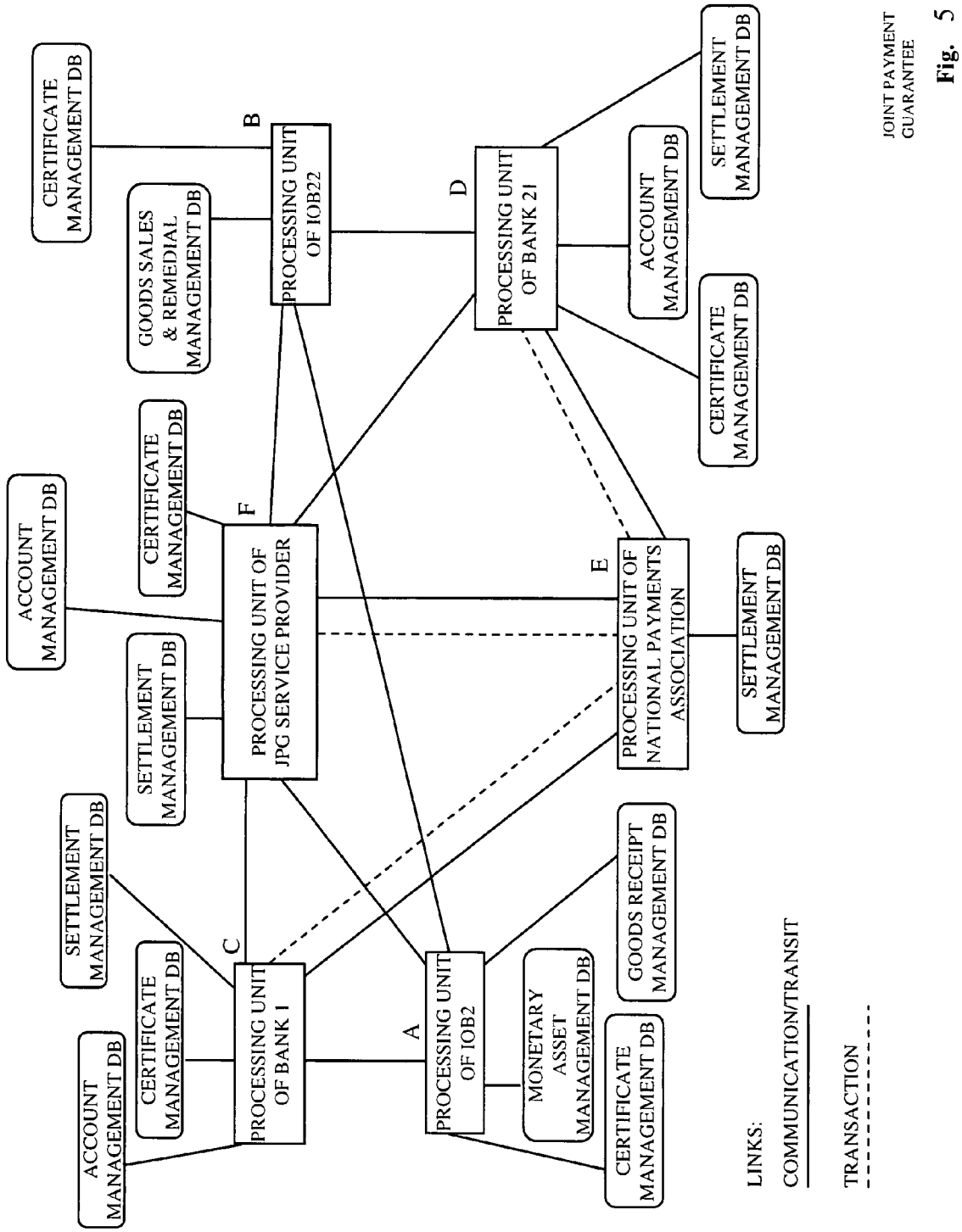
FIG. 5, shows the general configuration of the settlement system (process for the JPG settlement of money) according to the first embodiment of the present invention.

FIG. 5 shows the configuration of the system according to the first embodiment of the present invention. In FIG. 5, a payer's (IOB2's) processing unit A is provided for the payer of the transaction amount. A payee's processing unit B is provided for the intended payee (IOB22) of the transaction amount.

A processing unit C of the payer's financial institution is provided at the financial institution at which the payer has opened an account, and established a credit facility. A processing unit D of the payee's financial institution is provided at the financial institution at which the payee has opened an account. A financial institution correspond to, for example, a bank, or a financial service provider.

A processing unit E of the National Payments Association is provided at the financial institution at which payments are settled between financial institutions on a national basis. The National Payments Association would correspond, for example, to the Canadian Payments Association in Canada, or NACHA, the National Automated Clearing House Association in the United States. In the case of an international transaction, the National Payments Association would correspond, for example, the CPA and NACHA working together.

A processing unit F is provided at the financial institution which is the JPG service provider.

The payer's processing unit A comprises a certificate management database (hereinafter referred to as CM DB), for use in managing the information contained in the JPG certificates; a monetary asset management database (hereinafter referred to as MAM DB), for use in managing the monetary asset information (money information) which are used to guarantee for the JPG certificates; and a goods receipt management database (hereinafter referred to as GRM DB), for use in managing the receipt of goods information.

The payee's processing unit B comprises a certificate management database (hereinafter referred to as CM DB), for use in managing the information contained in the JPG certificates; and a goods sales and remedial management database (hereinafter referred to as GSRM DB), for use in managing the sale of goods and remedial actions.

The payer's financial institution's processing unit C comprises of a certificate management database (hereinafter referred to as CM DB), for use in managing the information contained in the JPG certificates; an account management database (hereinafter referred to as AM DB), for use in managing the account and credit facility information of a customer (payer) of a financial institution; and a settlement management database (hereinafter referred to as SM DB), for use in managing the money information used in the settlement of transactions.

The payees financial institution's processing unit D comprises of an account management database (hereinafter referred to as AM DB), for use in managing the account and credit facility information of a customer (payer) of a financial institution; a certificate management database (hereinafter referred to as CM DB); and a settlement management database (hereinafter referred to as SM DB), for use in managing the money information used in the settlement of transactions.

The National Payments Association's processing unit E comprises of a settlement management database (hereinafter referred to as SM DB), for use in managing the settlement of transactions between financial institutions.

The JPG Service Provider's processing unit F comprises of a settlement management database (hereinafter referred to as SM DB), for use in managing the money information used in the settlement of transactions; an account management database (hereinafter referred to as AM DB), for use in managing the account information of the JPG transaction amount settled to the JPG Service Provider by the payer's financial institution; and a certificate management database (hereinafter referred to as CM DB), for use in managing the information contained in the JPG certificates.

The settlement process according to the first embodiment of the present invention is described below by referring to the flowchart shown in FIGS. 1 through 4. In FIGS. 1 through 4, each of the processes performed by the payer's processing unit A, the processing unit of the payer's financial institution C, the payee's processing unit B, the processing unit of the payee's financial institution D, the processing unit of the National Payment Association E, and the processing unit of the JPG service provider F (in order from left to right), is represented by an item in each column. The process line covering more than one column indicates the relationship between the processes of respective units. For convenience in explanation, the payer's processing unit A can be indicated by (IOB2), the processing unit of the payer's financial institution C can be indicated by (Bank1), the payee's processing unit B can be indicated by (IOB22), the processing unit of the payee's financial institution D can be indicated by (Bank21), the processing unit of the National Payment Association E can be indicated by (NPA), and the processing unit of the JPG service provider F can be indicated by (JPG SP).

In the flowchart of FIGS. 1 through 4, the payer's processing unit A initiates a transaction by filling out a JPG certificate (step 100, hereinafter referred to as S100). The payer, in filling out the transaction information, includes the reservation information from the payer's general use credit facility, for the trade credit guarantee. At the payer's processing unit A the certificate then, in series, is signed by each internal signatory authority, each of which has the capability to propose changes (S102). If changes are proposed, the certificate is transmitted to the payer's processing unit A (back to the start of S102). If the signoff is complete with no changes, the JPG certificate is transmitted to the processing unit of the payee B (both "if" decisions are part of S104).

The certificate information contains the monetary security information of the buyer. The monetary security can be defined, for example, as the security interest of, or the monetary equivalent of the value of that security interest. This information is in a form that allows that monetary security to be subdivided and distributed to each seller and, or, financial institution named in that certificate, as a settlement payment, for a completely formalized certificate.

At the payee's processing unit B the certificate then, in series. is signed by each internal signatory authority, each of which has the capability to propose changes (S106). If changes are proposed, the certificate is routed back to the start of the signoff procedure (back to the start of S102). If the signoff is complete with no changes, the JPG certificate is transmitted to the processing unit of the financial institution of the payer C (both "if" decisions are part of S108).

At the payer's financial institution's processing unit C the certificate then, in series, is signed by each internal signatory authority, each of which has the capability to propose changes (S110). If changes are proposed, the certificate is transmitted to the processing unit of the payer A (back to the start of S102). If the signoff is complete with no changes, the JPG certificate is transmitted to the processing unit of the JPG service provider F (both "if" decisions are part of S112).

Each of the payer, the payee, the payer's financial institution, and the payee's financial institution need to agree to the transaction information contained in the certificate information as first formulated in steps 100 through 112.

At the JPG SP's processing unit F the completed certificate is registered. A copy of the registered certificate is then transmitted to each of the financial institutions of the payer C and the payee D (S114).

At the processing unit of the financial institution of the payer C, the copy of the registered certificate is stored, and a copy of the certificate is transmitted to the processing unit of the payer A (S120). At this step, the portion of payer's credit facility which is to be used by the payer's financial institution to underwrite the trade credit process is reserved by the payer's financial institution.

At the processing unit of the payer A, the copy of the registered certificate is stored (S122).

At the processing unit of the financial institution of the payee D, the copy of the registered certificate is stored, and a copy is forwarded to the processing unit of the payee (S116).

At the processing unit of the payee, the copy of the registered certificate is stored (S118), and approval to start the payee's delivery process is registered (S124). Once the delivery process has ended, the processing unit of the payee modifies the registered certificate to indicate the invoice information, and transmits the invoice-modified certificate to the processing unit of the JPG SP (S126).

At the processing unit of the JPG SP the modified certificate is registered. A copy of the registered certificate is then transmitted to each of the financial institutions of the payer C and the payee D (S130).

Following registration of the certificate in Step 130, the processing unit of the JPG SP registers a time-dependent query loop (described below as Steps 150 and 152).

At the processing unit of the payee's financial institution D, the registered invoice-certificate is filed, and a copy is transmitted to the payee's processing unit B (S132).

At the processing unit of the payee B, the copy of the registered certificate is filed (S134).

At the processing unit of the payer's financial institution C, the copy of the registered certificate is filed, and a copy is transmitted to the processing unit of the payer A (S136).

At the processing unit of the payer A, the copy of the registered certificate is filed (S138). Following the filing of the certificate in Step 138, a query loop is started within the processing unit of the payer A. The query loop transmits, to the registered internal signing authority, a demand for authorization to pay the registered invoice. If authorization is received, the processing unit transmits authorization to the payer's financial institution C. This authorization starts the fulfillment process of the payer's guarantee of payment. If authorization is declined, the processing unit transmits, to the payer's remedial authority, a request for remedial action (S140).

At the processing unit of the payer's financial institution, receipt of authorization to pay the settlement amount is processed, and payment is transmitted, using electronic money, to the NPA's processing unit E (S142).

The NPA's processing unit E registers the settlement and transmits the electronic money to the payee's financial institution's processing unit D. (S144).

The payee's financial institution's processing unit D deposits the electronic money in the account of the payee (S146). The payee's financial institution's processing unit D registers that payment of the settlement amount has been received for the certificate registered in Step 130, and transmits that registration to the processing unit of the JPG SP F, to be processed by the query loop of Steps 150 and 152, described below.

At the processing unit of the payer A, the query request for remedial action request transmitted to the remedial authority is processed. At the processing unit of the payer A, a remedial action notice is transmitted to the processing unit of the payee B(S154). If the remedial action required is accomplished by the payee or the payer without the necessity of modification of the certificate, the payment request is transmitted back to the start of the query loop (S140) within the processing unit of the payer A. If the remedial action requires a change to the certificate information, the certificate is updated as a certificate change request and duly authorized as such at the processing unit of the payer A and transmitted to the processing unit of the payee B (S158).

At the processing unit of the payee B, a proposal for remedial action is transmitted to the processing unit of the payer A (S155).

At the processing unit of the payee B the change request is authorized and transmitted to the processing unit of the payer's financial institution C (S160).

At the processing unit of the payer's financial institution C the change request is authorized, and thus becomes a change order. The change order is transmitted to the JPG SP's processing unit F, for processing in the query loop of Steps 150 and 152 described below(S162).

At the processing unit of the JPG SP F, the processing unit F queries whether payment has been received. If payment has been received, the processing unit F starts the settlement registration process of Step 212. If settlement has not been received, the processing unit F proceeds to Step 152 (S150).

At the processing unit of the JPG SP F, the processing unit queries whether the time duration of the registered certificate has expired. While this step is illustrated with time duration, a similar process is possible where an alternate dependency, such as a particular event having to occur, at which the duration of the certificate can be deemed to have expired. An example would be a contractual milestone. Another example would be the successful completion of another transaction, which could include trade credit and contingency trade credit transactions. In a similar manner, a third party judgment may have to be registered, in order to proceed past this point. An example would be a satisfactory building inspection. Another example would be the judgment of an arbitrator. If that time duration has not expired, the processing unit F starts back at Step 150. If the time duration has expired, the processing unit proceeds to start settlement (S152). The expiration of the time duration starts the fulfillment process of the bank or financial institution's contingency guarantee. If the certificate information is in the form requiring that the settlement information be processed as a Long Term Joint Payment Hold transaction, the settlement process information is transmitted to step 520 of the LT JPH configuration of this invention. If the certificate information is in the form requiring that the settlement information be processed as a Joint Payment Hold transaction, the settlement process information is transmitted to step 164 (both, "if" statements are part of step 163). Step 163 illustrates how one contingency trade credit method could be used to initiate one, or a plurality of, other contingency trade credit methods. The processing unit F generates a settlement request and transmits that request to the processing unit of financial institution of the payer C (S164).

At the processing unit of the payer's financial institution C, the request for settlement on the certificate which has an expired time duration is processed, and payment of the settlement amount is settled using electronic money, transmitted to the NPA's processing unit E (S166). At this step, the portion of the payer's credit facility which was used as security by the payer's financial institution to underwrite the trade credit process, will be used to complete the transaction, if available. If there are no funds available from the payer's credit facility, the payer's financial institution provides the transaction amount.

At the processing unit of the NPA E, the settlement amount is received, and the electronic money is transmitted to the processing unit of the JPG SP's processing unit F (S168).

At the JPG SP's processing unit F, the settlement of the electronic money is received, and deposited in the account whose disbursement authorities are both the payer and the payee (S170). A receipt for the settlement amount is registered in the processing unit of the JPG SP's processing unit, and transmitted to the processing units of the financial institutions of the payer C and the payee D (S172).

At the processing unit of the payer's financial institution C, the receipt registration is filed, and a copy of the receipt registration is forwarded to the payer's processing unit A (S178).

At the processing unit of the payer A, the receipt registration is filed (S180).

At the processing unit of the payee's financial institution D, the receipt registration is filed, and a copy of the receipt registration is transmitted to the processing unit of the payee B (S174).

At the processing unit of the payee B, the receipt registration is filed (S176).

After steps 176 and 180 are complete, either the payee or the payer's processing units can generate a settlement proposal. In the first case, where the payee's processing unit B generates a settlement proposal, the proposal certificate is transmitted to the processing unit of the payer A (S188).

At the processing unit of the payer A, in either the case of a proposal certificate received from the processing unit of the payee, or in the case where the processing unit A generates a settlement proposal this certificate is changed to a certificate change request (S182), and the change request then, in series, is signed by each internal signatory authority, each of which has the capability to propose changes.(S184). If changes are proposed, the certificate is routed back to the start of the signoff procedure (back to the start of S184). If the signoff is complete with no changes, the change request certificate is transmitted to the processing unit of the payee B (both "if" decisions are part of S186).

At the payee's processing unit B the change request certificate then, in series, is signed by each internal signatory authority, each of which has the capability to propose changes.(S190). If changes are proposed, the change request certificate is routed back to the start of the signoff procedure (back to the start of S184).

If the signoff is complete with no changes (both, "if" statements are part of S192), the change request certificate is transformed into an application certificate. This application certificate is then transmitted to the JPG SP's processing unit F(S194).

At the processing unit of the JPG SP F, the application certificate is verified to be in accordance with the terms of the JPG certificate registered at the JPG SP's processing unit (S196). The verification judgment in this step, for example, could be the judgment of an independent arbitrator. If the application certificate is verified to be in accordance with the terms of the JPG certificate registered at the JPG SP's processing unit, the processing unit F transmits an internal request for settlement payment to begin. If the application certificate is not verified to be in accordance with the terms of the JPG certificate registered at the JPG SP's processing unit, the application certificate is modified to indicate the area(s) requiring modification, and transmitted to the payer's processing unit A for processing starting with Step 184 (both "if" decisions are part of S198). Step 198 forces all parties to be in agreement for settlement to take place.

At the processing unit of the JPG SP F, settlement payment is transmitted, through the use of electronic money, to the NPA's processing unit E. The process of withdrawal of the certificate registration is started within the processing unit of the JPG SP F (S200).

At the processing unit of the NPA E, settlement payment is transmitted, through the use of electronic money, to either or both the payer's and the payee's financial institution's processing units C and D, respectively, in accordance with the settlement information transmitted as part of Step 200 (S202).

Where settlement payment has been transmitted to the payer's financial institution's processing unit C, the payment amount is deposited in the account of the payer, and confirmation of receipt of the settlement is sent to the processing unit of the payer A (S208).

The processing unit of the payer A files the confirmation of receipt of settlement (S210).

Where settlement payment has been transmitted to the payee's financial institution's processing unit D, the payment amount is deposited in the account of the payee, and confirmation of receipt of the settlement is sent to the processing unit of the payee B (S204).

The processing unit of the payee B files the confirmation of receipt of settlement (S206).

At the processing unit of the JPG SP F. confirmation of the withdrawal of the JPG certificate is registered, and the withdrawal registration information is transmitted to the processing units of the payer's and the payee's financial institutions C and D respectively (S212).

At the processing unit of the payee's financial institution D, the certificate withdrawal registration is filed, and a copy of the certificate withdrawal registration is transmitted to the processing unit of the payee B (S214).

At the processing unit of the payee B, the certificate withdrawal registration information is filed (S216).

At the processing unit of the payer's financial institution C, the certificate withdrawal registration is filed, and a copy of the certificate withdrawal registration is transmitted to the processing unit of the payer A (S218).

At the processing unit of the payer A, the certificate withdrawal registration information is filed (S220).

OC

Second, the general configuration and the procedure of the process according to the second embodiment of the present invention is described below by referring to FIGS. 6 through 8, and 9.

Figure 9:
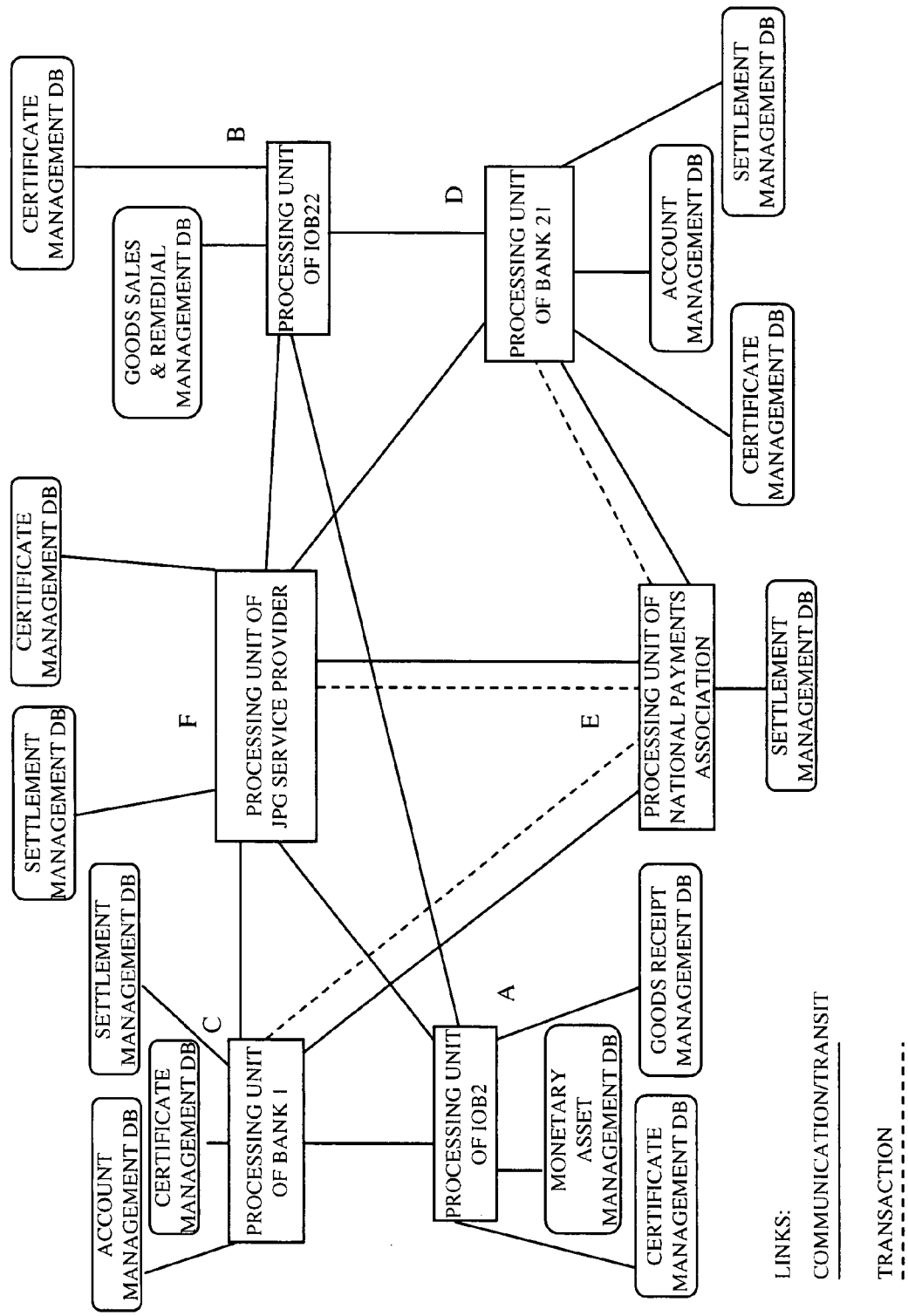
FIG. 9, shows the general configuration of the settlement system according to the second embodiment of the present invention (settlement process for the open credit settlement of money)

FIG. 9 shows the configuration of the system according to the second embodiment of the present invention. In FIG. 9, a payer's (IOB2's) processing unit A is provided for the payer of the transaction amount. A payee's processing unit B is provided for the intended payee (IOB22) of the transaction amount.

A processing unit C of the payer's financial institution is provided at the financial institution at which the payer has opened an account, and established a credit facility. A processing unit D of the payee's financial institution is provided at the financial institution at which the payee has opened an account. A financial institution correspond to, for example, a bank, or a financial service provider.

A processing unit E of the National Payments Association is provided at the financial institution at which payments are settled between financial institutions on a national basis. The National Payments Association would correspond, for example. to the Canadian Payments Association in Canada, or NACHA, the National Automated Clearing House Association in the United States. In the case of an international transaction, the National Payments Association would correspond, for example, to the CPA and NACHA working together.

A processing unit F is provided at the financial institution which is the JPG service provider.

The payer's processing unit A comprises a certificate management database (hereinafter referred to as CM DB), for use in managing the information contained in the OC certificates; a monetary asset management database (hereinafter referred to as MAM DB), for use in managing the monetary asset information (money information) which are used to guarantee for the OC certificates; and a goods receipt management database (hereinafter referred to as GRM DB), for use in managing the receipt of goods information.

The payee's processing unit B comprises a certificate management database (hereinafter referred to as CM DB), for use in managing the information contained in the OC certificates; and a goods sales and remedial management database (hereinafter referred to as GSRM DB), for use in managing the sale of goods and remedial actions.

The payer's financial institution's processing unit C comprises of a certificate management database (hereinafter referred to as CM DB), for use in managing the information contained in the OC certificates; an account management database (hereinafter referred to as AM DB), for use in managing the account and credit facility information of a customer (payer) of a financial institution; and a settlement management database (hereinafter referred to as SM DB), for use in managing the money information used in the settlement of transactions.

The payees financial institution's processing unit D comprises of an account management database (hereinafter referred to as AM DB), for use in managing the account and credit facility information of a customer (payer) of a financial institution; of a certificate management database (hereinafter referred to as CM DB); and a settlement management database (hereinafter referred to as SM DB), for use in managing the money information used in the settlement of transactions.

The National Payments Association's processing unit E comprises of a settlement management database (hereinafter referred to as SM DB), for use in managing the settlement of transactions between financial institutions.

The JPG Service Provider's processing unit F comprises of a settlement management database (hereinafter referred to as SM DB), for use in managing the money information used in the settlement of transactions; and a certificate management database (hereinafter referred to as CM DB), for use in managing the information contained in the OC certificates.

Figure 6:
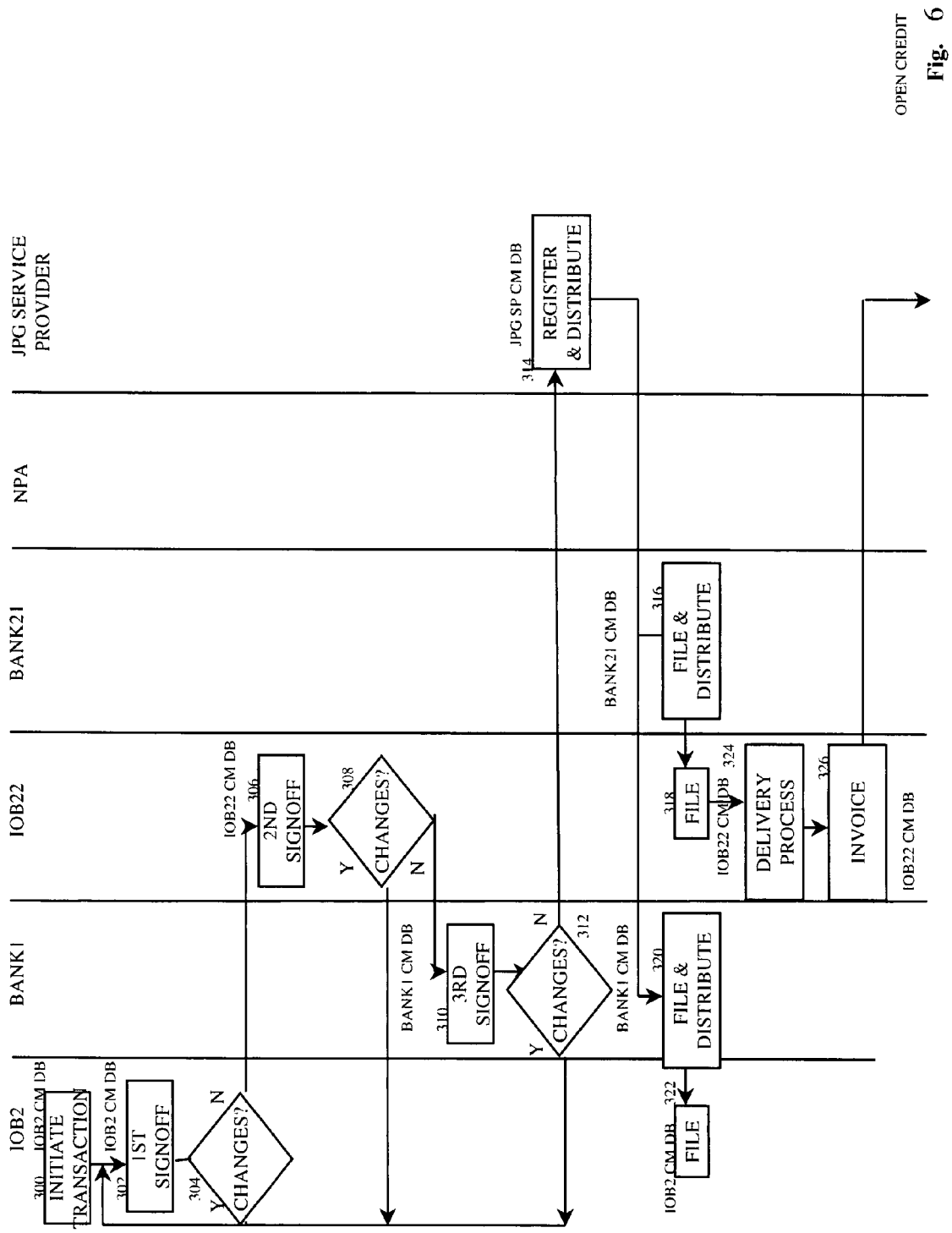
FIGS. 6 through 8, shows the procedures of the process (settlement process for the open credit settlement of money) according to the second embodiment of the present invention.
Figure 7:
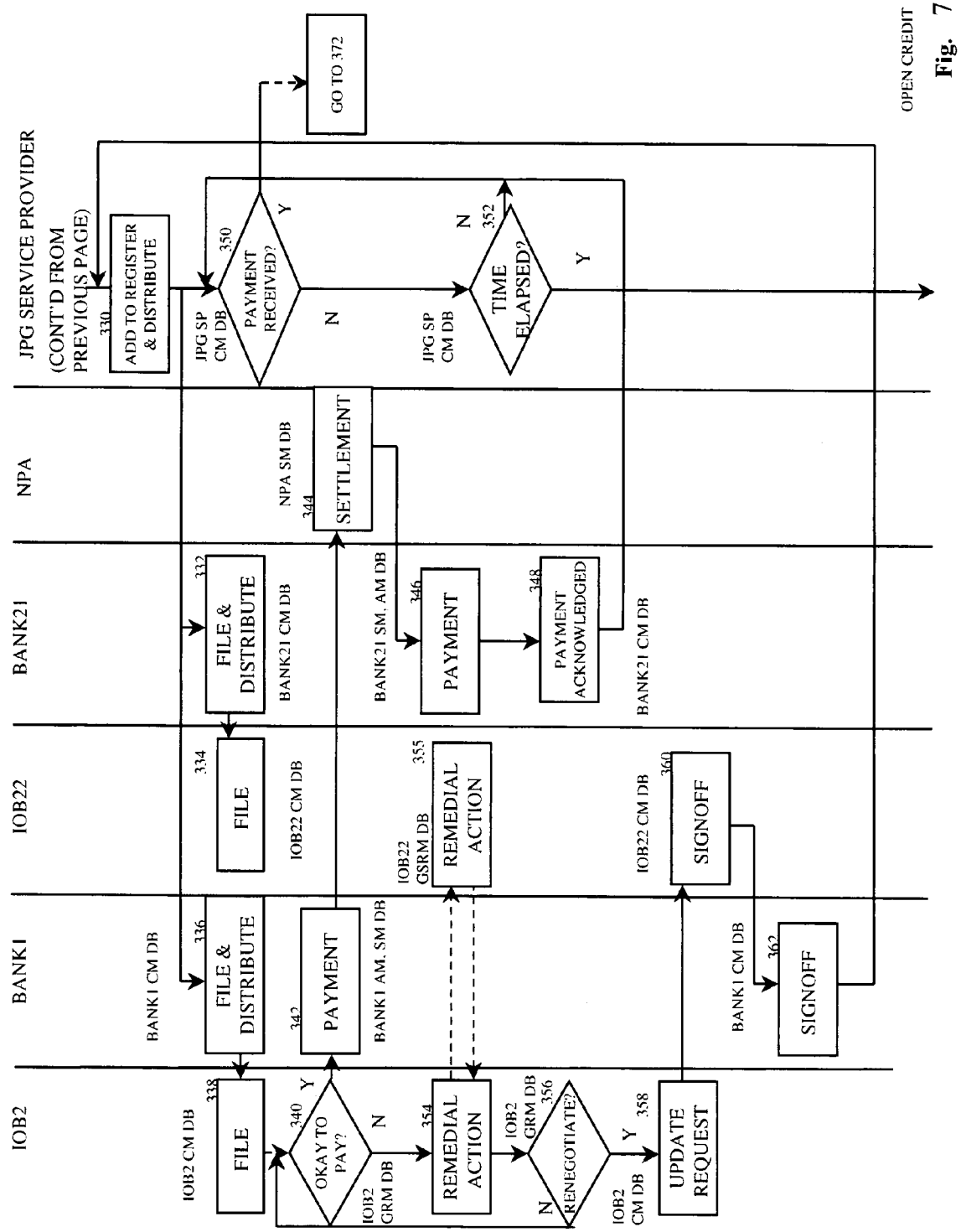
Figure 8:
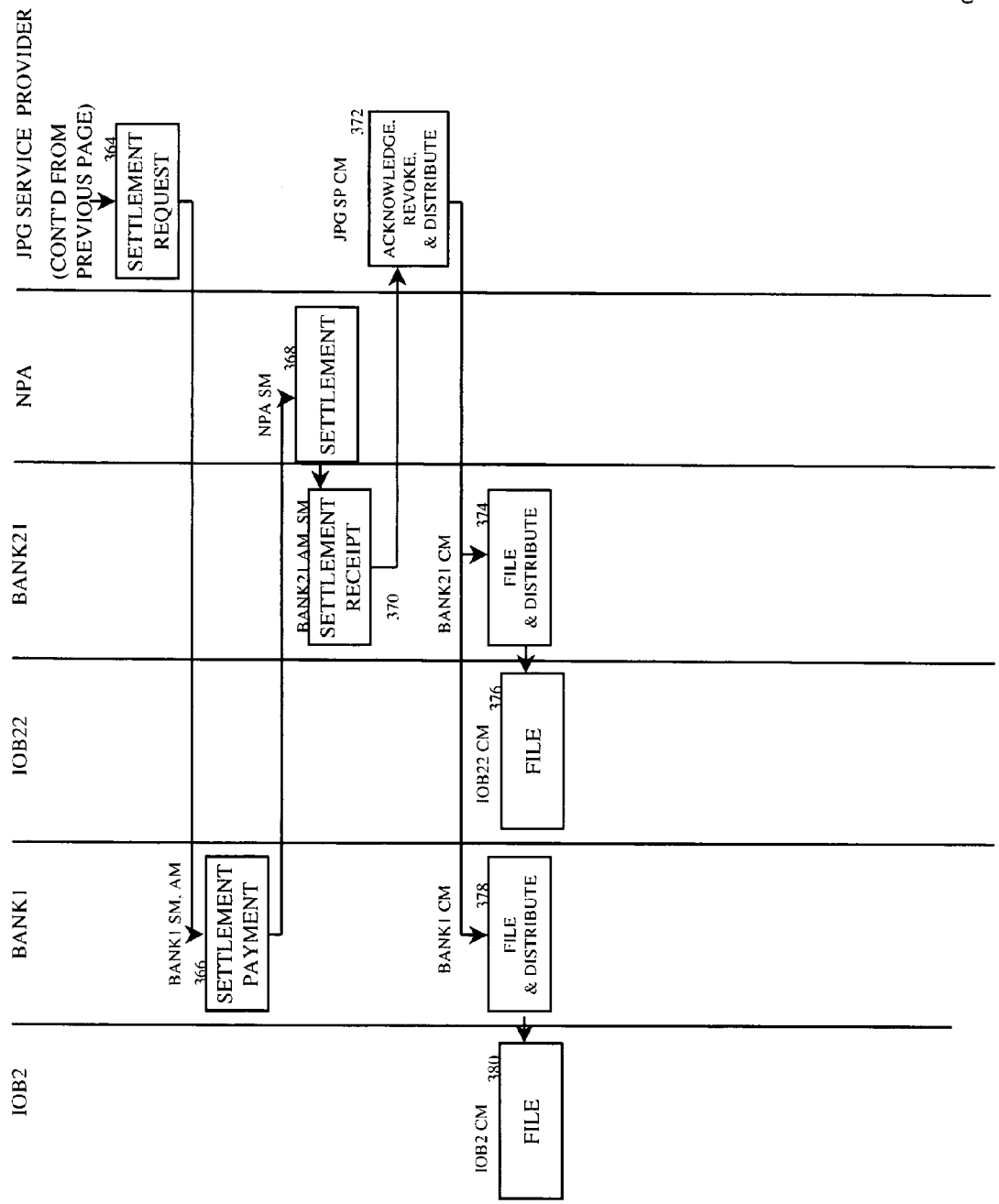

In the flowchart of FIGS. 6 through 8, the payer's processing unit A initiates a transaction by filling out an OC certificate (step 300, hereinafter referred to as S300). The payer, in filling out the transaction information, includes the reservation information from the payer's general use credit facility, for trade credit guarantee. At the payer's processing unit A the certificate then, in series, is signed by each internal signatory authority, each of which has the capability to propose changes (S302). If changes are proposed, the certificate is routed back to the start of the signoff procedure (back to the start of S302). If the signoff is complete with no changes, the OC certificate is transmitted to the processing unit of the payee B (both "if" decisions are part of S304).

The certificate information contains the monetary security information of the buyer. The monetary security can be defined, for example, as the security interest of, or the monetary equivalent of the value of that security interest. This information is in a form that allows that monetary security to be subdivided and distributed to each seller and, or, financial institution named in that certificate, as a settlement payment, for a completely formalized certificate.

At the payee's processing unit B the certificate then, in series, is signed by each internal signatory authority, each of which has the capability to propose changes (S306). If changes are proposed, the certificate is transmitted to the payer's processing unit A (back to the start of S302). If the signoff is complete with no changes, the OC certificate is transmitted to the processing unit of the financial institution of the payer C (both "if" decisions are part of S308).

At the payer's financial institution's processing unit C the certificate then, in series, is signed by each internal signatory authority, each of which has the capability to propose changes (S310). If changes are proposed, the certificate is transmitted to the processing unit of the payer A (back to the start of S302). If the signoff is complete with no changes, the OC certificate is transmitted to the processing unit of the JPG service provider F (both "if" decisions are part of S312). Each of the payer, the payee, the payer's financial institution, and the payee's financial institution need to agree to the transaction information contained in the certificate information as first formulated in steps 300 through 312.

At the JPG SP's processing unit F the completed certificate is registered. A copy of the registered certificate is then transmitted to each of the financial institutions of the payer C and the payee D (S314).

At the processing unit of the financial institution of the payer C, the copy of the registered certificate is stored, and a copy of the certificate is transmitted to the processing unit of the payer A (S320). At this step, the portion of payer's credit facility which is to be used by the payer's financial institution to underwrite the trade credit process is reserved by the payer's financial institution.

At the processing unit of the payer A, the copy of the registered certificate is stored (S322).

At the processing unit of the financial institution of the payee D, the copy of the registered certificate is stored, and a copy is forwarded to the processing unit of the payee (S316).

At the processing unit of the payee, the copy of the registered certificate is stored (S318), and approval to start the payee's delivery process is registered (S324). Once the delivery process has ended, the processing unit of the payee modifies the registered certificate to indicate the invoice information, and transmits the invoice-modified certificate to the processing unit of the JPG SP (S326).

At the processing unit of the JPG SP the modified certificate is registered. A copy of the registered certificate is then transmitted to each of the financial institutions of the payer C and the payee D (S330).

Following registration of the certificate in Step 330, the processing unit of the JPG SP registers a time-dependent query loop (described below as Steps 350 and 352).

At the processing unit of the payee's financial institution D, the registered invoice-certificate is filed, and a copy is transmitted to the payee's processing unit B (S332).

At the processing unit of the payee B, the copy of the registered certificate is filed (S334).

At the processing unit of the payer's financial institution C, the copy of the registered certificate is filed, and a copy is transmitted to the processing unit of the payer A (S336).

At the processing unit of the payer A, the copy of the registered certificate is filed (S338). Following the filing of the certificate in Step 338, a query loop is started within the processing unit of the payer A. The query loop transmits, to the registered internal signing authority, a demand for authorization to pay the registered invoice. If authorization is received, the processing unit transmits authorization to the payer's financial institution C. This authorization starts the fulfillment process of the payer's guarantee of payment. If authorization is declined, the processing unit transmits, to the payer's remedial authority, a request for remedial action (S340).

At the processing unit of the payer's financial institution, receipt of authorization to pay the settlement amount is processed, and payment is transmitted, using electronic money, to the NPA's processing unit E (S342). At this step, the portion of the payer's credit facility which was used as security by the payer's financial institution to underwrite the trade credit process, will be used to complete the transaction, if available. If there are no funds available from the payer's credit facility, the payer's financial institution provides the transaction amount.

The NPA's processing unit E registers the settlement and transmits the electronic money to the payee's financial institution's processing unit D. (S344).

The payee's financial institution's processing unit D deposits the electronic money in the account of the payee (S346). The payee's financial institution's processing unit D registers that payment of the settlement amount has been received for the certificate registered in Step 330, and transmits that registration to the processing unit of the JPG SP F, to be processed by the query loop of Steps 350 and 352, described below.

At the processing unit of the payer A, the query request for remedial action request transmitted to the remedial authority is processed. At the processing unit of the payer A, a remedial action notice is transmitted to the processing unit of the payee B (S354). The remedial authority in this step, for example, could be an independent arbitrator. If the remedial action required is accomplished by the payee or the payer without the necessity of modification of the certificate, the payment request is transmitted back to the start of the query loop (back to the start of Step 340) within the processing unit of the payer A. If the remedial action requires a change to the certificate information, the certificate is updated as a certificate change request and duly authorized as such at the processing unit of the payer A and transmitted to the processing unit of the payee B (S358).

At the processing unit of the payee B, a proposal for remedial action is transmitted to the processing unit of the payer A (S355).

At the processing unit of the payee B the change request is authorized and transmitted to the processing unit of the payer's financial institution C (S360).

At the processing unit of the payer's financial institution C the change request is authorized, and thus becomes a change order. The change order is transmitted to the JPG SP's processing unit F, for registration and processing (back to the start of Step 330) (S362).

At the processing unit of the JPG SP F, the processing unit F queries whether payment has been received. If payment has been received, the processing unit F starts the settlement registration process of Step 372. If settlement has not been received, the processing unit F proceeds to Step 352 (S350).

At the processing unit of the JPG SP F, the processing unit queries whether the time duration of the registered certificate has expired. If that time duration has not expired, the processing unit F starts back at Step 350. If the time duration has expired, the processing unit proceeds to start settlement (both, "if" statements are part of Step 352). The expiration of the time duration starts the fulfillment process of the bank or financial institution's contingency guarantee. While this step is illustrated with time duration, a similar process is possible where an alternate dependency, such as a particular event having to occur, at which the duration of the certificate can be deemed to have expired. An example would be a contractual milestone. Another example would be the successful completion of another transaction, which could include trade credit and contingency trade credit transactions. In a similar manner, a third party judgment may have to be registered, in order to proceed past this point. An example would be a satisfactory building inspection. Another example would be the judgment of an arbitrator. The processing unit F generates a settlement request and transmits that request to the processing unit of financial institution of the payer C (S364). Step 364 can only be enacted if the settlement request meets the requirements of the certificate information agreed to by all signatory parties.

At the processing unit of the payer C, after receiving the settlement request from the processing unit of the JPG SP F, the processing unit transmits electronic money in the amount of the settlement request to the processing unit of the NPA E (S366).

At the processing unit of the NPA E, the processing unit receives the electronic money, and then transmits the electronic money in the settlement amount to the payee's financial institution's processing unit D (S368).

At the processing unit of the payee's financial institution D, the settlement amount is deposited in the account of the payee. Acknowledgement of the receipt of the settlement amount is then transmitted to the processing unit of the JPG SP F (S370).

At the processing unit of the JPG SP F, confirmation of the withdrawal of the OC certificate is registered, and the withdrawal registration information is transmitted to the processing units of the payer's and the payee's financial institutions C and D respectively (S372). Step 372 can only be enacted if the settlement request meets the requirements of the certificate information agreed to by all signatory parties.

At the processing unit of the payee's financial institution D, the certificate withdrawal registration is filed, and a copy of the certificate withdrawal registration is transmitted to the processing unit of the payee B (S374).

At the processing unit of the payee B, the certificate withdrawal registration information is filed (S376).

At the processing unit of the payer's financial institution C, the certificate withdrawal registration is filed, and a copy of the certificate withdrawal registration is transmitted to the processing unit of the payer A (S378).

At the processing unit of the payer A, the certificate withdrawal registration information is filed (S380).

JPH

Third, the general configuration and the procedure of the process according to the third embodiment of the present invention is described below by referring to FIGS. 10 through 12, and 13.

Figure 13:
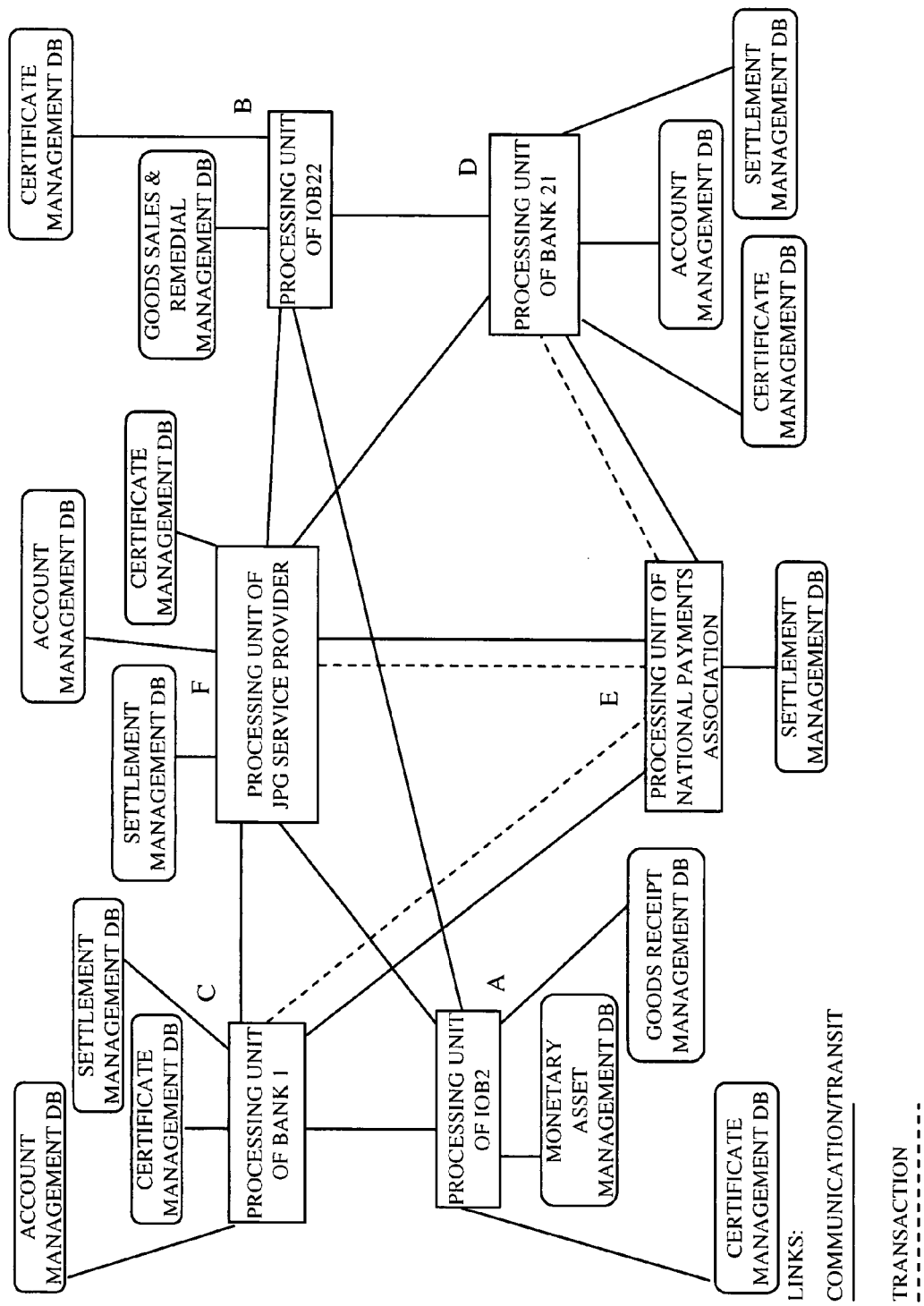
FIG. 13, shows the general configuration of the settlement system according to the third embodiment of the present invention process (settlement process for the JPH settlement of money)

FIG. 13 shows the configuration of the system according to the third embodiment of the present invention.

In FIG. 13, a payer's (IOB2's) processing unit A is provided for the payer of the transaction amount. A payee's processing unit B is provided for the intended payee (IOB22) of the transaction amount.

A processing unit C of the payer's financial institution is provided at the financial institution at which the payer has opened an account, and established a credit facility. A processing unit D of the payee's financial institution is provided at the financial institution at which the payee has opened an account. A financial institution correspond to, for example, a bank, or a financial service provider.

A processing unit E of the National Payments Association is provided at the financial institution at which payments are settled between financial institutions on a national basis. The National Payments Association Would correspond, for example, to the Canadian Payments Association in Canada, or NACHA, the National Automated Clearing House Association in the United States. In the case of an international transaction, the National Payments Association would correspond, for example, the CPA and NACHA working together.

A processing unit F is provided at the financial institution which is the JPG service provider.

The payer's processing unit A comprises a certificate management database (hereinafter referred to as CM DB), for use in managing the information contained in the JPH certificates; a monetary asset management database (hereinafter referred to as MAM DB), for use in managing the monetary asset information (money information) which are used to guarantee for the JPH certificates; and a goods receipt management database (hereinafter referred to as GRM DB), for use in managing the receipt of goods information.

The payee's processing unit B comprises a certificate management database (hereinafter referred to as CM DB), for use in managing the information contained in the JPH certificates; and a goods sales and remedial management database (hereinafter referred to as GSRM DB), for use in managing the sale of goods and remedial actions.

The payer's financial institution's processing unit C comprises of a certificate management database (hereinafter referred to as CM DB), for use in managing the information contained in the JPH certificates; an account management database (hereinafter referred to as AM DB), for use in managing the account and credit facility information of a customer (payer) of a financial institution; and a settlement management database (hereinafter referred to as SM DB), for use in managing the money information used in the settlement of transactions.

The payees financial institution's processing unit D comprises of an account management database (hereinafter referred to as AM DB), for use in managing the account and credit facility information of a customer (payer) of a financial institution; a certificate management database (hereinafter referred to as CM DB); and a settlement management database (hereinafter referred to as SM DB), for use in managing the money information used in the settlement of transactions.

The National Payments Association's processing unit E comprises of a settlement management database (hereinafter referred to as SM DB), for use in managing the settlement of transactions between financial institutions.

The JPG Service Provider s processing unit F comprises of a settlement management database (hereinafter referred to as SM DB), for use in managing the money information used in the settlement of transactions; an account management database (hereinafter referred to as AM DB), for use in managing the account information of the JPH transaction amount settled to the JPG Service Provider by the payer's financial institution; and a certificate management database (hereinafter referred to as CM DB), for use in managing the information contained in the JPH certificates.

Figure 10:
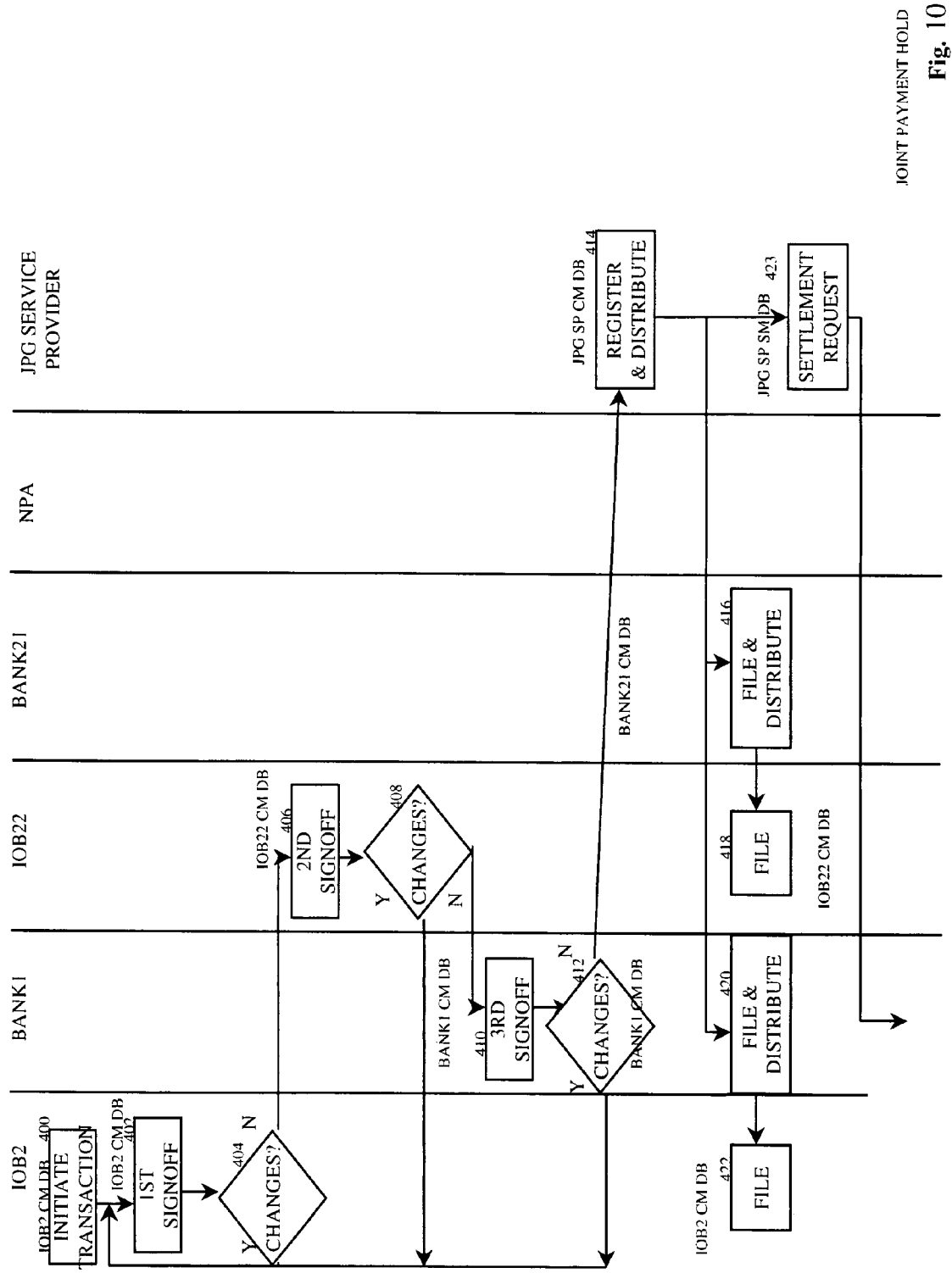
FIGS. 10 through 12, shows the procedures of the process (settlement process for the JPH settlement of money) according to the third embodiment of the invention.
Figure 11:
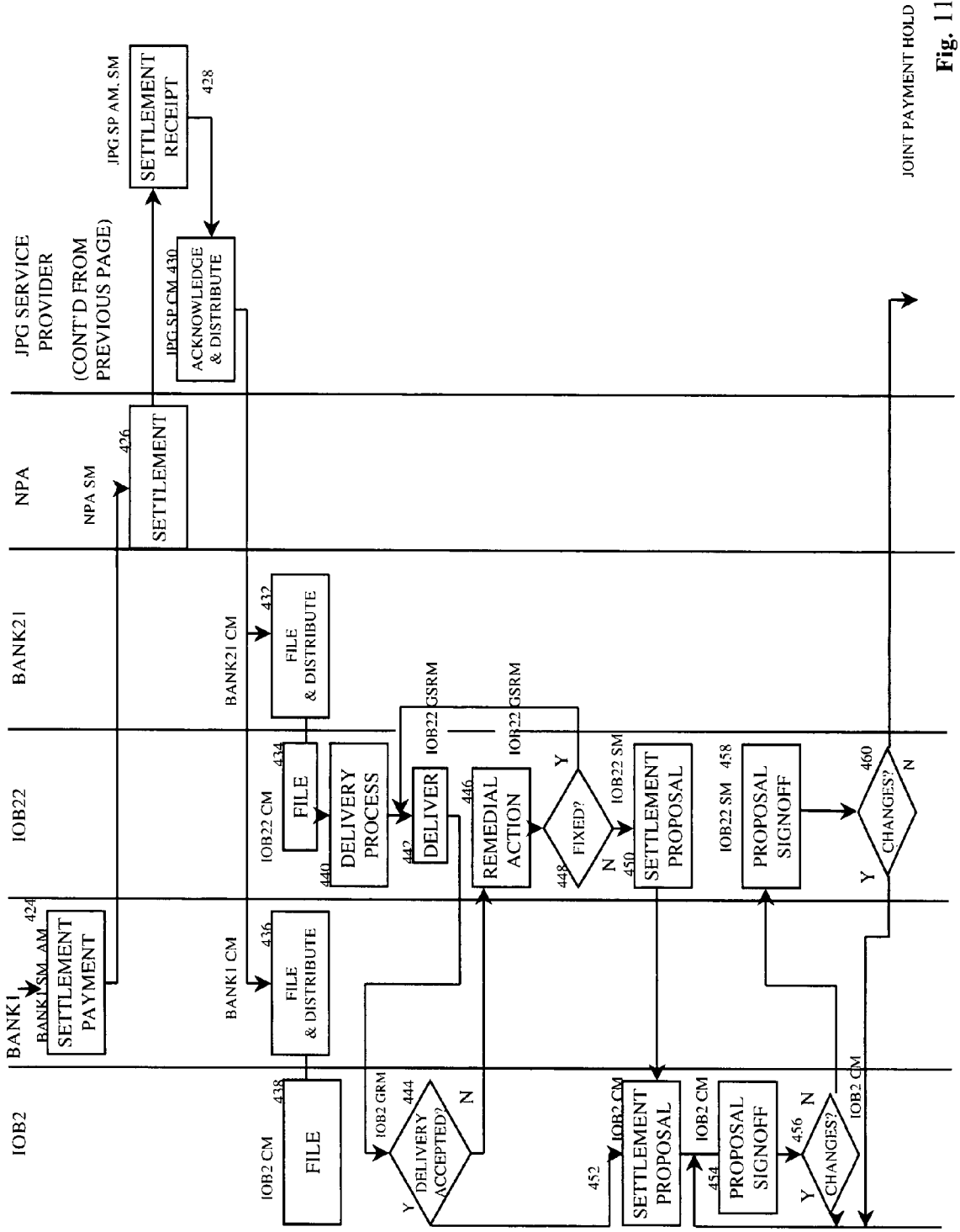
Figure 12:
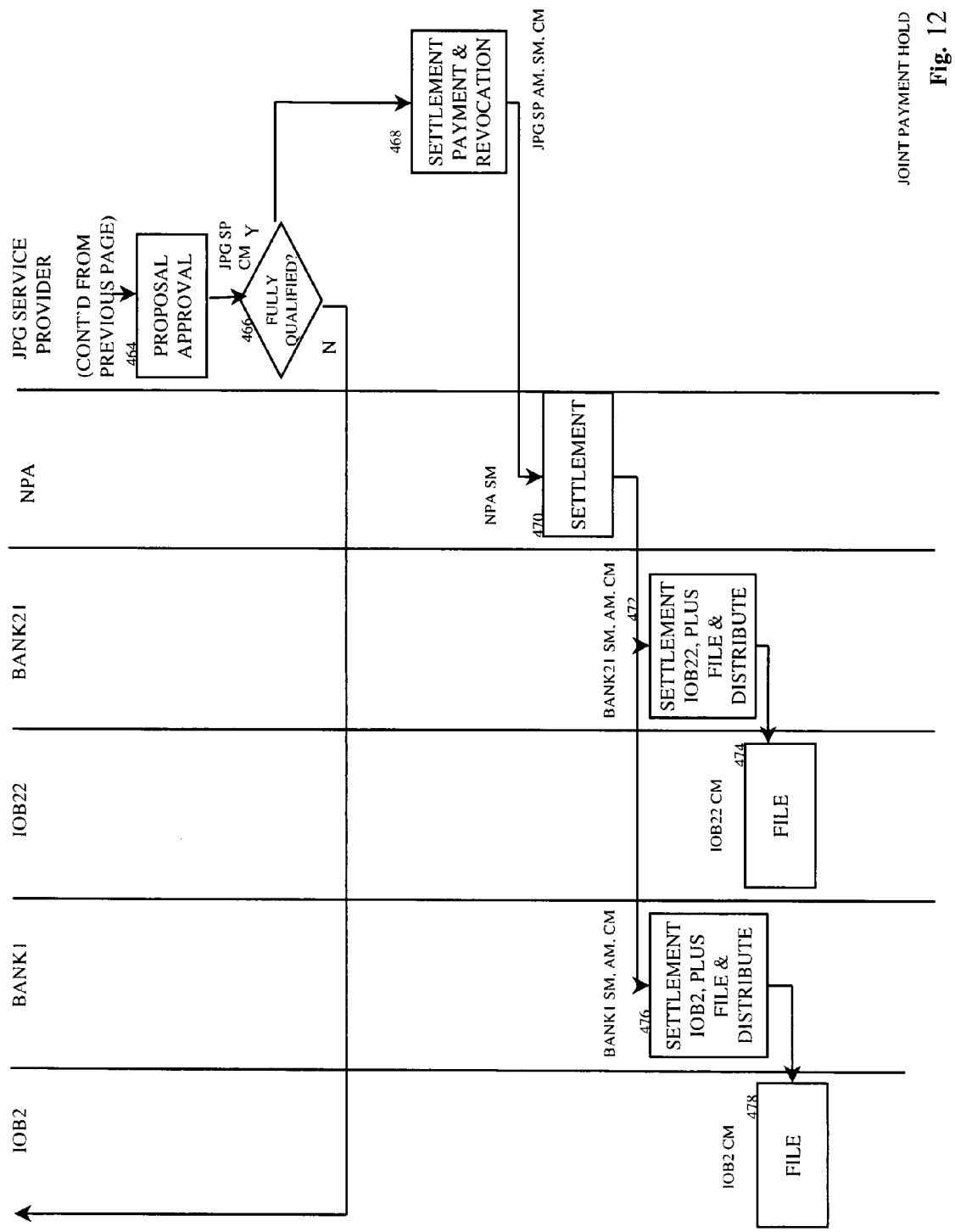

In the flowchart of FIGS. 10 through 12, the payer's processing unit A initiates a transaction by filling out a JPH certificate (step 400, hereinafter referred to as S400). The payer, in filling out the transaction information, includes the reservation information from the payer's general use credit facility, for the trade credit guarantee. At the payer's processing unit A the certificate then, in series, is signed by each internal signatory authority, each of which has the capability to propose changes (S402). If changes are proposed, the certificate is transmitted to the payer's processing unit A (back to the start of S402). If the signoff is complete with no changes, the JPH certificate is transmitted to the processing unit of the payee B (both "if" decisions are part of S404).

The certificate information contains the monetary security information of the buyer. The monetary security can be defined, for example, as the security interest of, or the monetary equivalent of the value of that security interest. This information is in a form that allows that monetary security to be subdivided and distributed to each seller and, or, financial institution named in that certificate, as a settlement payment, for a completely formalized certificate.

At the payee's processing unit B the certificate then, in series, is signed by each internal signatory authority, each of which has the capability to propose changes (S406). If changes are proposed, the certificate is routed back to the start of the signoff procedure (back to the start of S402). If the signoff is complete with no changes, the JPH certificate is transmitted to the processing unit of the financial institution of the payer C (both "if" decisions are part of S408).

At the payer's financial institution's processing unit C the certificate then, in series, is signed by each internal signatory authority, each of which has the capability to propose changes (S410). If changes are proposed, the certificate is transmitted to the processing unit of the payer A (back to the start of S402). If the signoff is complete with no changes, the JPH certificate is transmitted to the processing unit of the JPG service provider F (both "if" decisions are part of S412). This completed authorization starts the fulfillment process of the payer's guarantee of payment. Each of the payer, the payee, the payer's financial institution, and the payee's financial institution need to agree to the transaction information contained in the certificate information as first formulated in steps 400 through 412.

At the JPG SP's processing unit F the completed certificate is registered. A copy of the registered certificate is then transmitted to each of the financial institutions of the payer C and the payee D. Within the processing unit of the JPG SG F, the settlement request process is authorized (S414).

At the processing unit of the financial institution of the payer C, the copy of the registered certificate is stored, and a copy of the certificate is transmitted to the processing unit of the payer A (S420). At this step, the portion of payer's credit facility which is to be used by the payer's financial institution to underwrite the trade credit process is reserved by the payer's financial institution.

At the processing unit of the payer A, the copy of the registered certificate is stored (S422).

At the processing unit of the financial institution of the payee D, the copy of the registered certificate is stored, and a copy is forwarded to the processing unit of the payee (S416).

At the processing unit of the payee, the copy of the registered certificate is stored (S418).

At the JPG SP's processing unit F, a settlement request is generated, and transmitted to the payer's financial institution's processing unit C (S423).

At the processing unit of the payer's financial institution C, the request for settlement on the JPH certificate is processed, and payment of the settlement amount is settled using electronic money, transmitted to the NPA's processing unit E (S424). At this step, the reservation of the payer's credit facility which was used as security by the payer's financial institution to underwrite the trade credit process, will be transferred to the JPG service provider.

At the processing unit of the NPA E, the settlement amount is received, and the electronic money is transmitted to the processing unit of the JPG SP's processing unit F (S426).

At the JPG SP's processing unit F, the settlement of the electronic money is received, and deposited in the account whose disbursement authorities are both the payer and the payee (S428). A receipt for the settlement amount is registered in the processing unit of the JPG SP's processing unit, and transmitted to the processing units of the financial institutions of the payer C and the payee D (S430).

At the processing unit of the payer's financial institution C, the receipt registration is filed, and a copy of the receipt registration is forwarded to the payer's processing unit A (S436).

At the processing unit of the payer A, the receipt registration is filed (S438).

At the processing unit of the payee's financial institution D, the receipt registration is filed, and a copy of the receipt registration is transmitted to the processing unit of the payee B (S432).

At the processing unit of the payee B, the receipt registration is filed and authorization for the initiation of the delivery process is registered (S434, S440).

At the processing unit of the payee B, the delivery information is registered as a change to the certificate information. The certificate information is then transmitted to the processing unit of the payer B (S442).

At the processing unit of the payer A, if the delivery information is acceptable to proceed with settlement, the certificate is transmitted to the certificate signoff authority. If the delivery information is not acceptable, the certificate is transmitted to the processing unit of the payer B for remedial action (both "if" statements are part of Step 444).

At the processing unit of the payee B, remedial action information is added to the certificate (S446). If the remedial action information is equal to or greater than the remedial action required, the certificate information is transmitted internally to the processor to the start of step 442. If the remedial action information is less than the remedial action required (both, "if" statements are part of Step 448), settlement proposal information is added to the certificate information, and the proposal certificate information is transmitted to the processing unit of the payer A (S450). The judgment of whether the remedial action in this step, for example, could be an that of an independent arbitrator.

At the processing unit of the payer A, the certificate is transformed into a settlement proposal certificate (S452) which then, in series, is signed by each internal signatory authority, each of which has the capability to propose changes (S454). If changes are proposed, the certificate is routed back to the start of the signoff procedure (back to the start of S454). If the signoff is complete with no changes, the JPH certificate is transmitted to the processing unit of the payee B (both "if" decisions are part of S456).

At the payee's processing unit B the certificate then, in series, is signed by each internal signatory authority, each of which has the capability to propose changes (S458). If changes are proposed, the certificate is transmitted to the payer's processing unit A (back to the start of S454). If the signoff is complete with no changes, the JPH certificate is transmitted to the processing unit of the JPG SP F (both "if" decisions are part of S460).

At the processing unit of the JPG SP F, the certificate is checked for authenticity and completeness (S464). If the certificate is fully qualified, the certificate is approved for settlement. If the certificate is not authorized, the certificate is transmitted to the processing unit of the payer A, for processing starting at step 454 (S466). Step 466 forces all parties to be in agreement for settlement to take place. The completeness judgment in this step, as an example, could be the judgment of an independent arbitrator. For the fully qualified certificate, electronic money in the settlement amount, together with registration of the withdrawal of the JPH certificate is transmitted to the processing unit of the NPA E (S468). At this step, the portion of the payer's credit facility which was used as security by the payer's financial institution to underwrite the trade credit process, will be sued to complete the transaction, if available. If there are no funds available from the payer's credit facility, the payer's financial institution provides the transaction amount.

At the processing unit of the NPA E, electronic money in the settlement amount, together with registration of the withdrawal of the JPH certificate is transmitted to either, or both, of the financial institutions of the payer and the payee C and D, respectively, as authorized in the certificate proposal certificate (S470).

At the processing unit of the payee's financial institution D, any electronic money received is deposited in the account of the payee, certificate withdrawal registration is filed, and a copy of the certificate withdrawal registration is transmitted to the processing unit of the payee B (S472).

At the processing unit of the payee B, the certificate withdrawal registration information is filed (S474).

At the processing unit of the payer's financial institution C, any electronic money received is deposited in the account of the payer, the certificate withdrawal registration is filed, and a copy of the certificate withdrawal registration is transmitted to the processing unit of the payer A (S476).

At the processing unit of the payer A, the certificate withdrawal registration information is filed (S478).

LT JPH

Fourth, the general configuration and the procedure of the process according to the fourth embodiment of the present invention is described below by referring to FIGS. 14 through 16, and 17.

Figure 17:
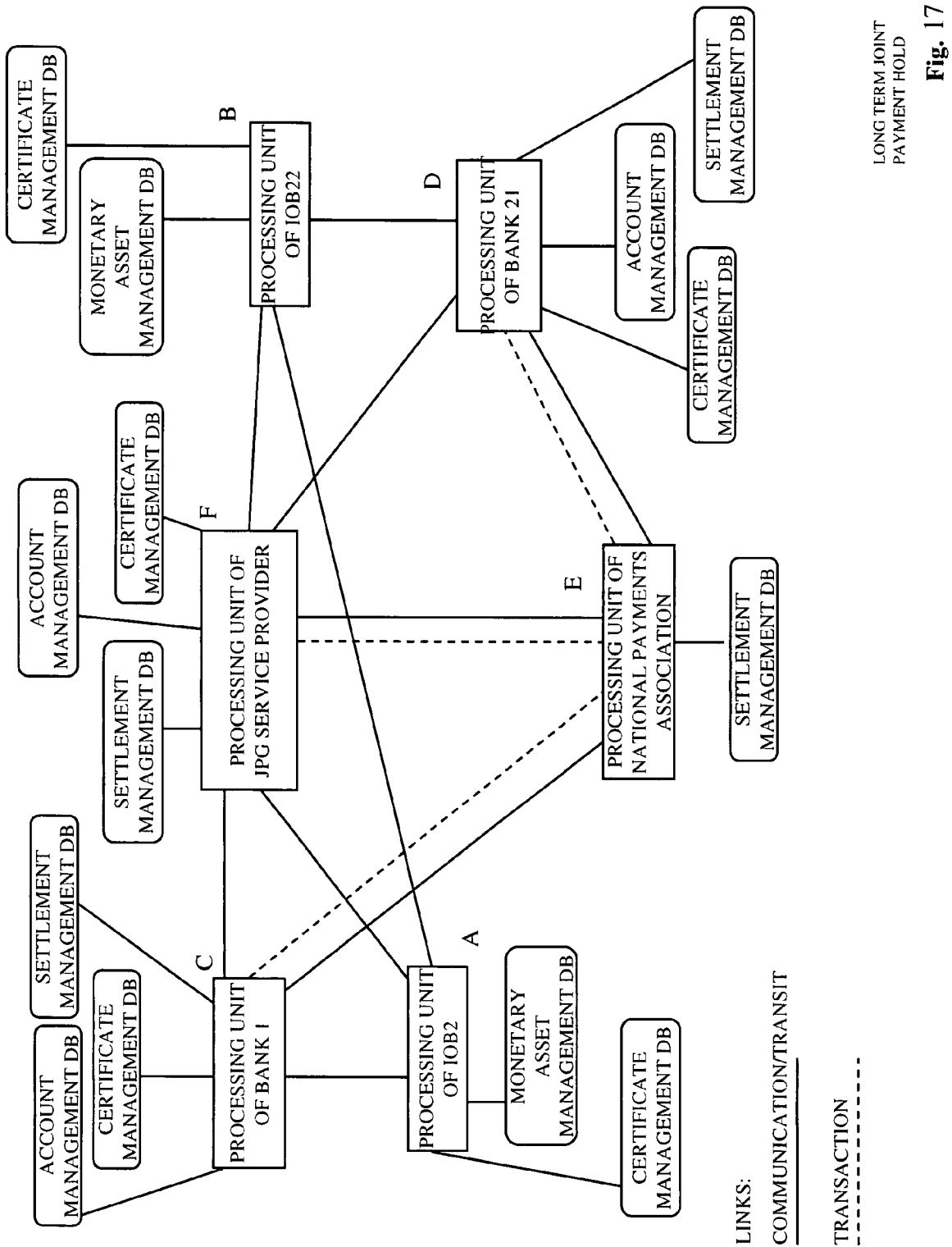
FIG. 17, shows the general configuration of the settlement system according to the fourth embodiment of the present invention (LT JPH sharing account for the long-term settlement of money)

FIG. 17 shows the configuration of the system according to the fourth embodiment of the present invention.

In FIG. 17, a payer's (IOB2's) processing unit A is provided for the payer of the transaction amount. A payee's processing unit B is provided for the intended payee (IOB22) of the transaction amount.

A processing unit C of the payer's financial institution is provided at the financial institution at which the payer has opened an account, and established a credit facility. A processing unit D of the payee's financial institution is provided at the financial institution at which the payee has opened an account and, for those transactions requiring the same, established a credit facility. A financial institution correspond to, for example, a bank, or a financial service provider.

A processing unit E of the National Payments Association is provided at the financial institution at which payments are settled between financial institutions on a national basis. The National Payments Association would correspond, for example, to the Canadian Payments Association in Canada, or NACHA, the National Automated Clearing House Association in the United States. In the case of an international transaction, the National Payments Association would correspond, for example, to the CPA and NACHA working together.

A processing unit F is provided at the financial institution which is the JPG service provider.

The payer's processing unit A comprises a certificate management database (hereinafter referred to as CM DB), for use in managing the information contained in the LT JPH certificates; and a monetary asset management database (hereinafter referred to as MAM DB), for use in managing the monetary asset information (money information) which are used to guarantee for the LT JPH certificates.

The payee's processing unit B comprises a certificate management database (hereinafter referred to as CM DB), for use in managing the information contained in the LT JPH certificates; and a monetary asset management database (hereinafter referred to as MAM DB), for use in managing the monetary asset information (money information) which are used to guarantee for the LT JPH certificates The payer's financial institution's processing unit C comprises of a certificate management database (hereinafter referred to as CM DB), for use in managing the information contained in the LT JPH certificates; an account management database (hereinafter referred to as AM DB), for use in managing the account and credit facility information of a customer (payer) of a financial institution; and a settlement management database (hereinafter referred to as SM DB), for use in managing the money information used in the settlement of transactions.

The payees financial institution's processing unit D comprises of an account management database (hereinafter referred to as AM DB), for use in managing the account and credit facility information of a customer (payer) of a financial institution; a certificate management database (hereinafter referred to as CM DB), for use in managing the information contained in the LT JPH certificates; and a settlement management database (hereinafter referred to as SM DB), for use in managing the money information used in the settlement of transactions.

The National Payments Association's processing unit E comprises of a settlement management database (hereinafter referred to as SM DB), for use in managing the settlement of transactions between financial institutions.

The JPG Service Provider's processing unit F comprises of a settlement management database (hereinafter referred to as SM DB), for use in managing the money information used in the settlement of transactions; an account management database (hereinafter referred to as AM DB), for use in managing the account information of the LT JPH transaction amount settled to the JPG Service Provider by the payer's financial institution; and a certificate management database (hereinafter referred to as CM DB), for use in managing the information contained in the LT JPH certificates.

Figure 14:
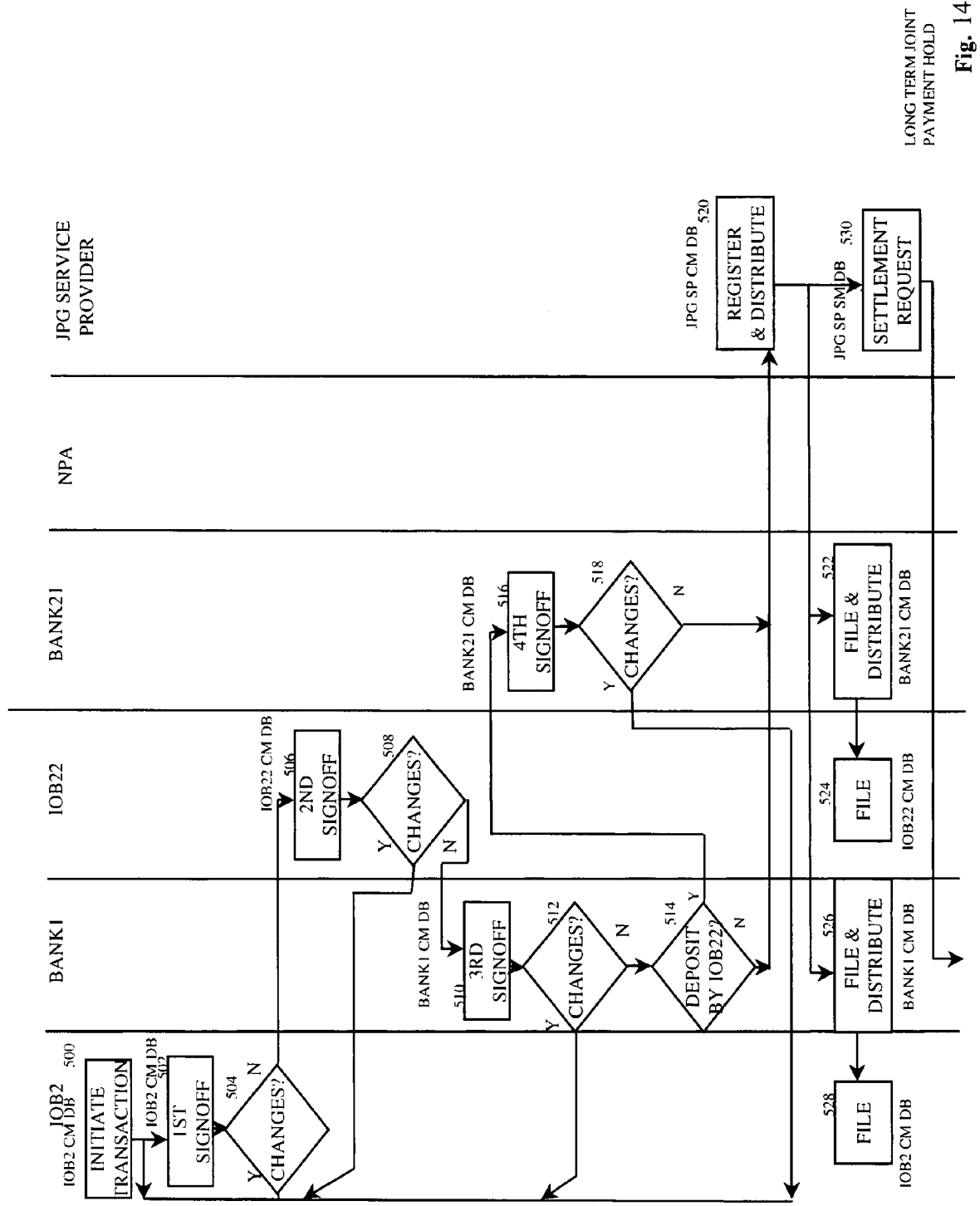
FIGS. 14 through 16, shows the procedures of the process (LT JPH sharing account for the long-term settlement of money) according to the fourth embodiment of the invention.
Figure 15:
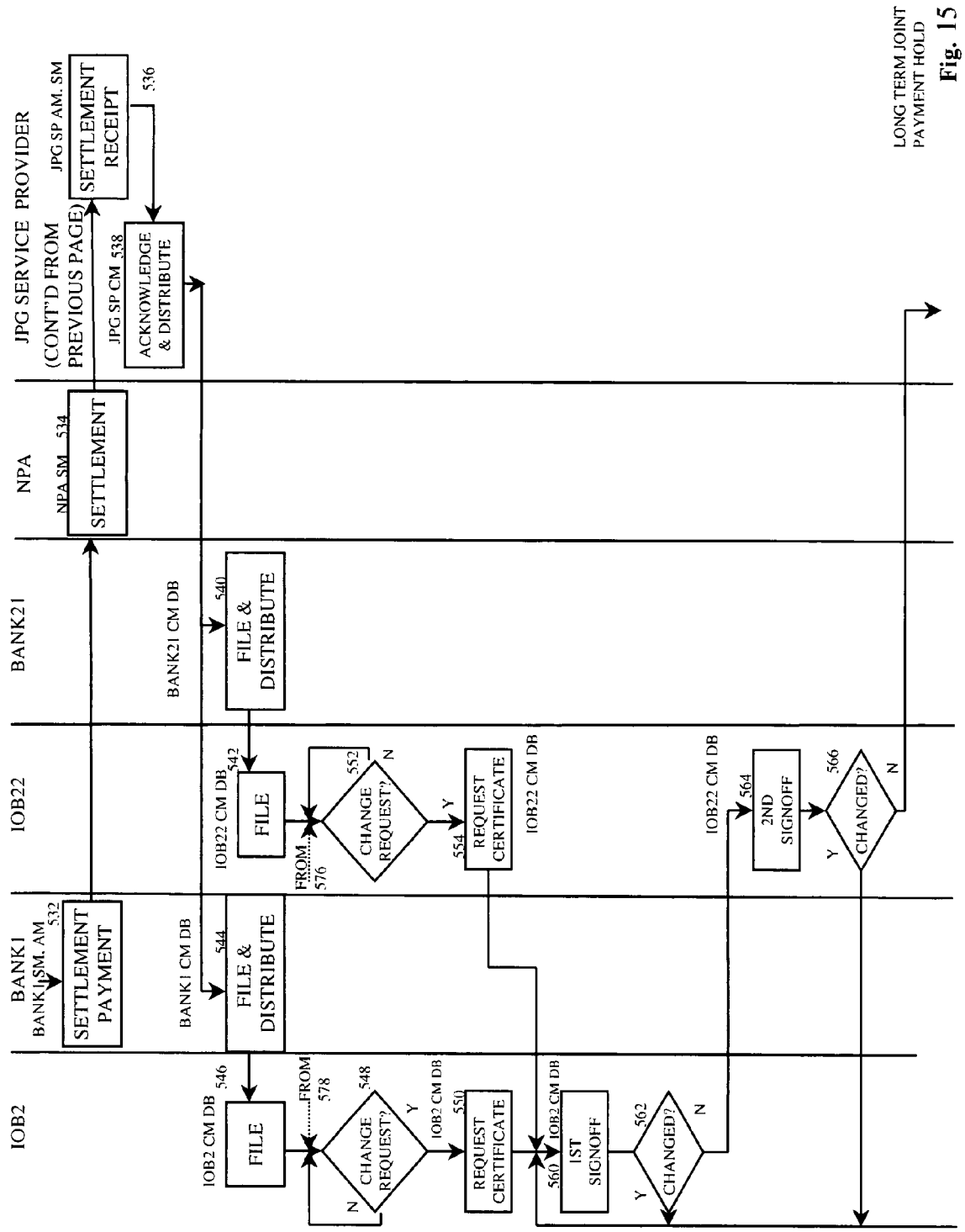
Figure 16:
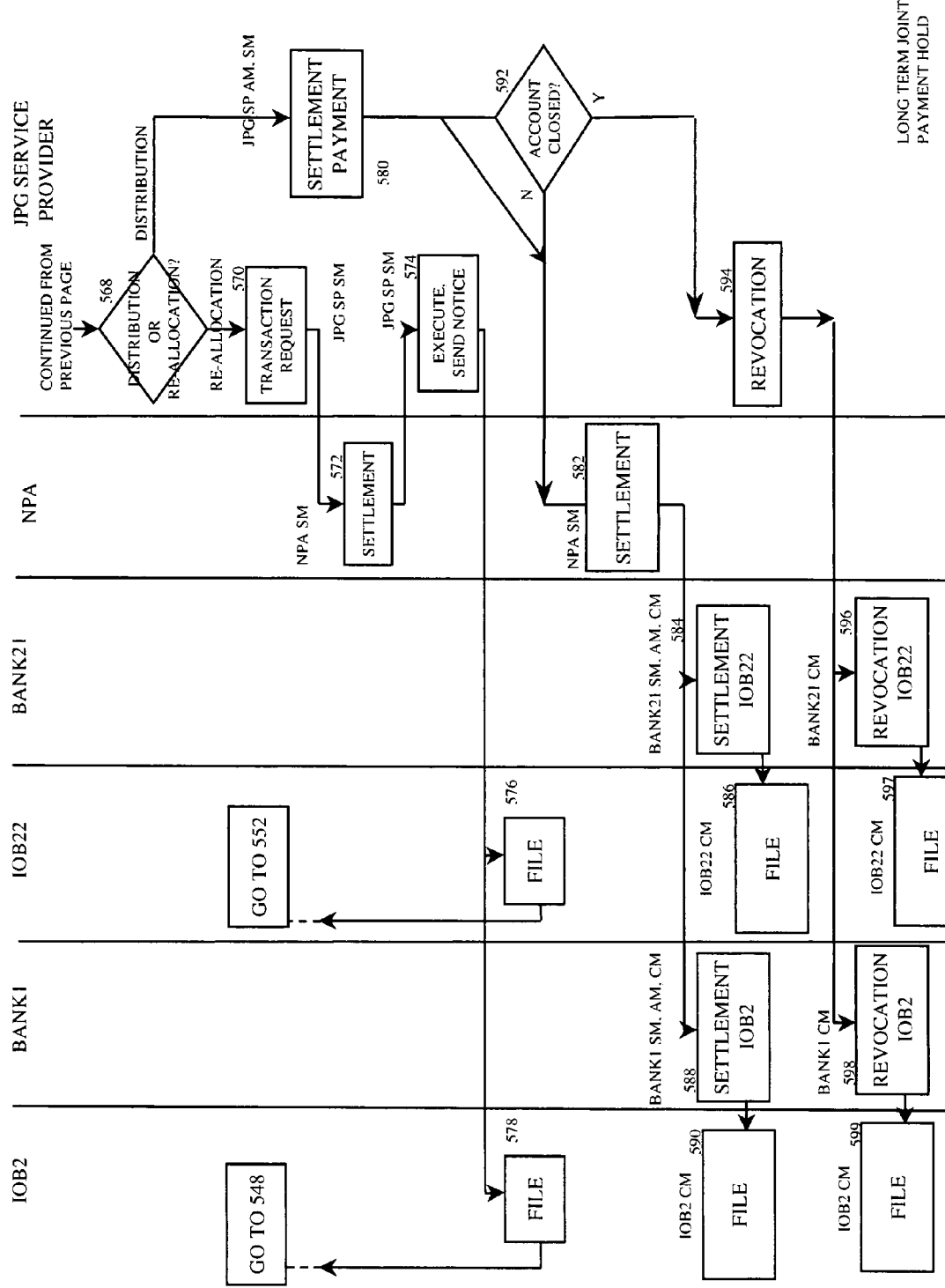

In the flowchart of FIGS. 14 through 16, the payer's processing unit A initiates a transaction by filling out a LT JPH certificate (step 500, hereinafter referred to as S500). The payer, in filling out the transaction information, includes the reservation information from the payer's general use credit facility, for the trade credit guarantee. At the payer's processing unit A the certificate then, in series, is signed by each internal signatory authority, each of which has the capability to propose changes (S502). If changes are proposed, the certificate is transmitted to the payer's processing unit A (back to the start of S502). If the signoff is complete with no changes, the LT JPH certificate is transmitted to the processing unit of the payee B (both "if" decisions are part of S504).

The certificate information contains the monetary security information of the buyer. The monetary security can be defined, for example, as the security interest of, or the monetary equivalent of the value of that security interest. This information is in a form that allows that monetary security to be subdivided and distributed to each seller and, or, financial institution named in that certificate, as a settlement payment, for a completely formalized certificate.

At the payee's processing unit B the certificate then, in series, is signed by each internal signatory authority, each of which has the capability to propose changes (S506). If changes are proposed, the certificate is routed back to the start of the signoff procedure (back to the start of S502). If the signoff is complete with no changes, the LT JPH certificate is transmitted to the processing unit of the financial institution of the payer C (both "if" decisions are part of S508).

At the payer's financial institution's processing unit C the certificate then, in series, is signed by each internal signatory authority, each of which has the capability to propose changes (S510). If changes are proposed, the certificate is transmitted to the processing unit of the payer A (back to the start of S502). If the signoff is complete with no changes (both "if" decisions are part of S512) the LT JPH certificate is checked to see if there is a deposit expected by the payee. If there is a deposit expected from the payee, the certificate is transmitted to the payee's financial institution's processing unit D. If no deposit from the payee is specified, the certificate is transmitted to the processing unit of the JPG service provider F (both "if decisions are part of Step 514).

At the payee's financial institution's processing unit D the certificate then, in series, is signed by each internal signatory authority, each of which has the capability to propose changes (S516). If changes are proposed, the certificate is transmitted to the processing unit of the payer A (back to the start of S502). If the signoff is complete with no changes, the LT JPH certificate is transmitted to the processing unit of the JPG service provider F (both "if" decisions are part of S518). This completed authorization starts the fulfillment process of the payer's guarantee of payment. Each of the payer, the payee, the payer's financial institution, and the payee's financial institution need to agree to the transaction information contained in the certificate information as first formulated in steps 500 through 518.

At the JPG SP's processing unit F the completed certificate is registered. A copy of the registered certificate is then transmitted to each of the financial institutions of the payer C and the payee D. Within the processing unit of the JPG SG F, the settlement request process is authorized (S520).

At the processing unit of the financial institution of the payer C, the copy of the registered certificate is stored, and a copy of the certificate is transmitted to the processing unit of the payer A (S526). At this step, the portion of payer's credit facility which is to be used by the payer's financial institution to underwrite the trade credit process is reserved by the payer's financial institution.

At the processing unit of the payer A, the copy of the registered certificate is stored (S528).

At the processing unit of the financial institution of the payee D, the copy of the registered certificate is stored, and a copy is forwarded to the processing unit of the payee (S522).

At the processing unit of the payee, the copy of the registered certificate is stored (S524).

At the JPG SP's processing unit F, a settlement request is generated, and transmitted to the payer's financial institution's processing unit C (S530).

At the processing unit of the payer's financial institution C, the request for settlement on the JPH certificate is processed, and payment of the settlement amount is settled using electronic money, transmitted to the NPA's processing unit E (S532).

At the processing unit of the NPA E, the settlement amount is received, and the electronic money is transmitted to the processing unit of the JPG SP's processing unit F (S534).

At the JPG SP's processing unit F, the settlement of the electronic money is received, and deposited in the account whose disbursement authorities are both the payer and the payee (S536). At this step, the reservation of the payer's credit facility which was used as security by the payer's financial institution to underwrite the trade credit process, will be transferred to the JPG service provider. A receipt certificate for the settlement amount is registered in the processing unit of the JPG SP's processing unit, and transmitted to the processing units of the financial institutions of the payer C and the payee D (S538).

At the processing unit of the financial institution of the payer C, the copy of the registered certificate is stored, and a copy of the certificate is transmitted to the processing unit of the payer A (S544).

At the processing unit of the payer A, the copy of the registered certificate is stored (S546), and a change request query loop is initiated.

At the processing unit of the financial institution of the payee D, the copy of the registered certificate is stored, and a copy is forwarded to the processing unit of the payee B (S540).

At the processing unit of the payee B, the copy of the registered certificate is stored (S542), and a change request query loop is initiated. If no change request is initiated at the processing unit of the payee B, the query loop continues to operate. If a change request is initiated (both "if" statements are part of S552), a change request certificate is transmitted to the processing unit of the payer A (S554).

At the processing unit of the payer A, if no change request is initiated, the query loop continues to operate. If a change request is initiated (both "if" statements are part of S548), a change request certificate is generated (S550).

At the processing unit of the payer A, the change request certificate then, in series, is signed by each internal signatory authority, each of which has the capability to propose changes (S560). If changes are proposed, the certificate is transmitted to the payer's processing unit A (back to the start of S560). If the signoff is complete with no changes, the LT JPH certificate is transmitted to the processing unit of the payee B (both "if" decisions are part of S562).

At the payee's processing unit B the certificate then, in series, is signed by each internal signatory authority, each of which has the capability to propose changes (S564). If changes are proposed, the certificate is routed back to the start of the signoff procedure (back to the start of S560) If the signoff is complete with no changes (the last two "if" statements are part of S566), the LT JPH change certificate is transmitted to the JPG SP's processing unit F.

At the JPG SP's processing unit F, if the change certificate contains a request for a settlement payment to be made a settlement requisition is issued, and if the change certificate contains a request for re-allocation of the money information contained in the payer's and/or payee's account information (both "if" statements are part of Step 568) a re-allocation request is issued. Step 568 forces all parties to be in agreement for settlement to take place, because the re-allocation can only be allowed if it contains instructions compatible with the certificate information initially agreed by all parties.

At the JPG SP's processing unit F, in response to a re-allocation request, a transaction request containing electronic money information from the account of either or both of the payer and the payee is issued to the NPA's processing unit E (S570).

At the NPS's processing unit E, the transaction request is executed, and the electronic money information is sent to the JPG SP's processing unit F (S572).

At the JPG SP's processing unit F, the electronic money information is deposited in the account of either or both of the payer and the payee. A notice of the transaction information is sent to the payer's and the payee's processing units A and B, respectively (S574).

At the payee's processing unit B, the transaction information is filed, and the processing unit resumes the query loop of Step 552 (S576).

At the payer's processing unit A, the transaction information is filed, and the processing unit resumes the query loop of Step 548 (S578).

A transaction executed in Steps 570 through 578 allows the balance of legal ownership of assets to be transferred from one individual or business to another in a plurality of transactions, while each individual or business retains the control of final settlement transactions out of the LT JPH facility. In addition, a transaction executed in Steps 570 through 578 allows the movement of assets from one class of assets to another, under the joint control of the payer and the payee.

At the JPG SP's processing unit F, in response to a settlement requisition, electronic money is withdrawn from either or both the payer's and the payee's account and the electronic money information is transmitted to the NPA's processing unit E (S580). At this step, the portion of the party's credit facility which was used as security by the party's financial institution to underwrite the trade credit process, will be used to complete the transaction, if available. If there are no funds available from the party's credit facility, the party's financial institution provides the transaction amount. If the settlement information includes a request to terminate the LT JPG facility, a revocation request is initiated (S592).

At the NPA's processing unit E, the electronic money information is transmitted to both of the payer's and the payee's financial institution's processing units C and D, respectively (S582).

At the payee's financial institution's processing unit D, any electronic money received is deposited in the account of the payee. The money information is transmitted to the payee's processing unit B (S584).

At the payee's processing unit B, the money information is filed (S586).

At the payer's financial institution's processing unit C, any electronic money received is deposited in the account of the payer. The money information is transmitted to the payer's processing unit A (S588).

At the payer's processing unit A, the money information is filed (S590).

At the JPG SP's processing unit F, the revocation certificate is authorized, and a copy is sent to payer's and payee's financial institution's processing units C and D, respectively (S594).

At the processing unit of the payee's financial institution D. certificate withdrawal registration is filed, and a copy of the certificate withdrawal registration is transmitted to the processing unit of the payee B (S596).

At the processing unit of the payee B, the certificate withdrawal registration information is filed (S597).

At the processing unit of the payer's financial institution C, the certificate withdrawal registration is filed, and a copy of the certificate withdrawal registration is transmitted to the processing unit of the payer A (S598).

At the processing unit of the payer A, the certificate withdrawal registration information is filed (S599).

CC

Fifth, the general configuration and the procedure of the process according to the fifth embodiment of the present invention is described below by referring to FIGS. 18 through 19, and 20.

Figure 20:
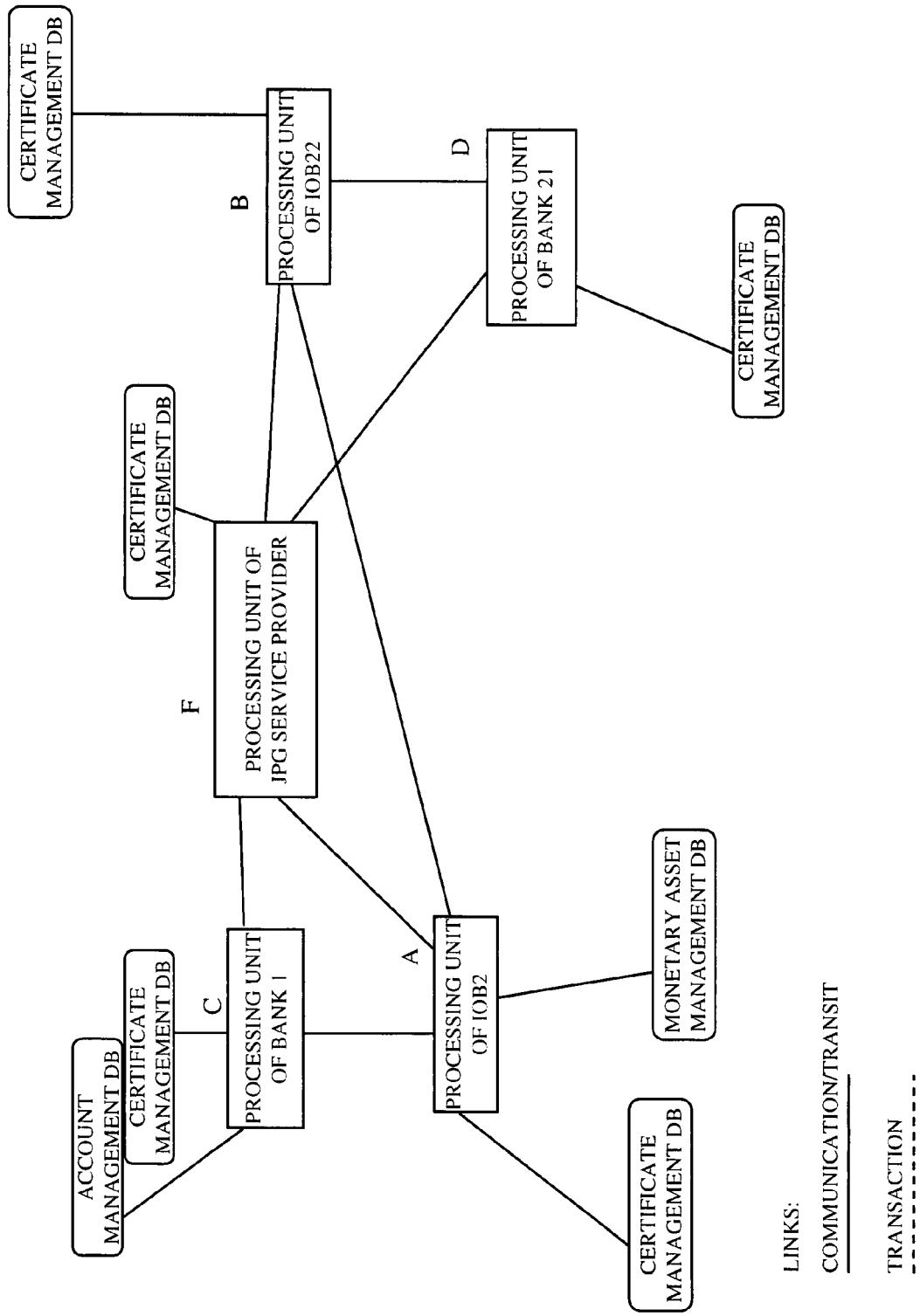
FIG. 20, shows the general configuration of the settlement system according to the fifth embodiment of the present invention (credit check facility)

FIG. 20 shows the configuration of the system according to the fifth embodiment of the present invention. In FIG. 20, a payer's (IOB2's) processing unit A is provided for the potential payer of the transaction amount. A potential payee's processing unit B is provided for the intended payee (IOB22) of the transaction amount.

A processing unit C of the potential payer's financial institution is provided at the financial institution at which the potential payer has opened an account, and established a credit facility. A processing unit D of the potential payee's financial institution is provided at the financial institution at which the potential payee has opened an account. A financial institution correspond to, for example, a bank, or a financial service provider.

A processing unit F is provided at the financial institution which is the JPG service provider.

The potential payer's processing unit A comprises a certificate management database (hereinafter referred to as CM DB), for use in managing the information contained in the CC certificates; and a monetary asset management database (hereinafter referred to as MAM DB), for use in managing the monetary asset information (money information) which are used to guarantee for the CC certificates.

The potential payee's processing unit B comprises a certificate management database (hereinafter referred to as CM DB), for use in managing the information contained in the CC certificates.

The potential payer's financial institution's processing unit C comprises of a certificate management database (hereinafter referred to as CM DB), for use in managing the information contained in the CC certificates; an account management database (hereinafter referred to as AM DB), for use in managing the account and credit facility information of a customer (payer) of a financial institution; and a settlement management database (hereinafter referred to as SM DB), for use in managing the money information used in the settlement of transactions.

The payees financial institution's processing unit D comprises of an account management database (hereinafter referred to as AM DB), for use in managing the account and credit facility information of a customer (payer) of a financial institution.

The JPG Service Provider's processing unit F comprises of a certificate management database (hereinafter referred to as CM DB), for use in managing the information contained in the CC certificates.

Steps 600 to 624 detail a method which enables the agreement of terms and the reservation of credit, separate from the completion of one or a plurality of transaction agreements.

Figure 18:
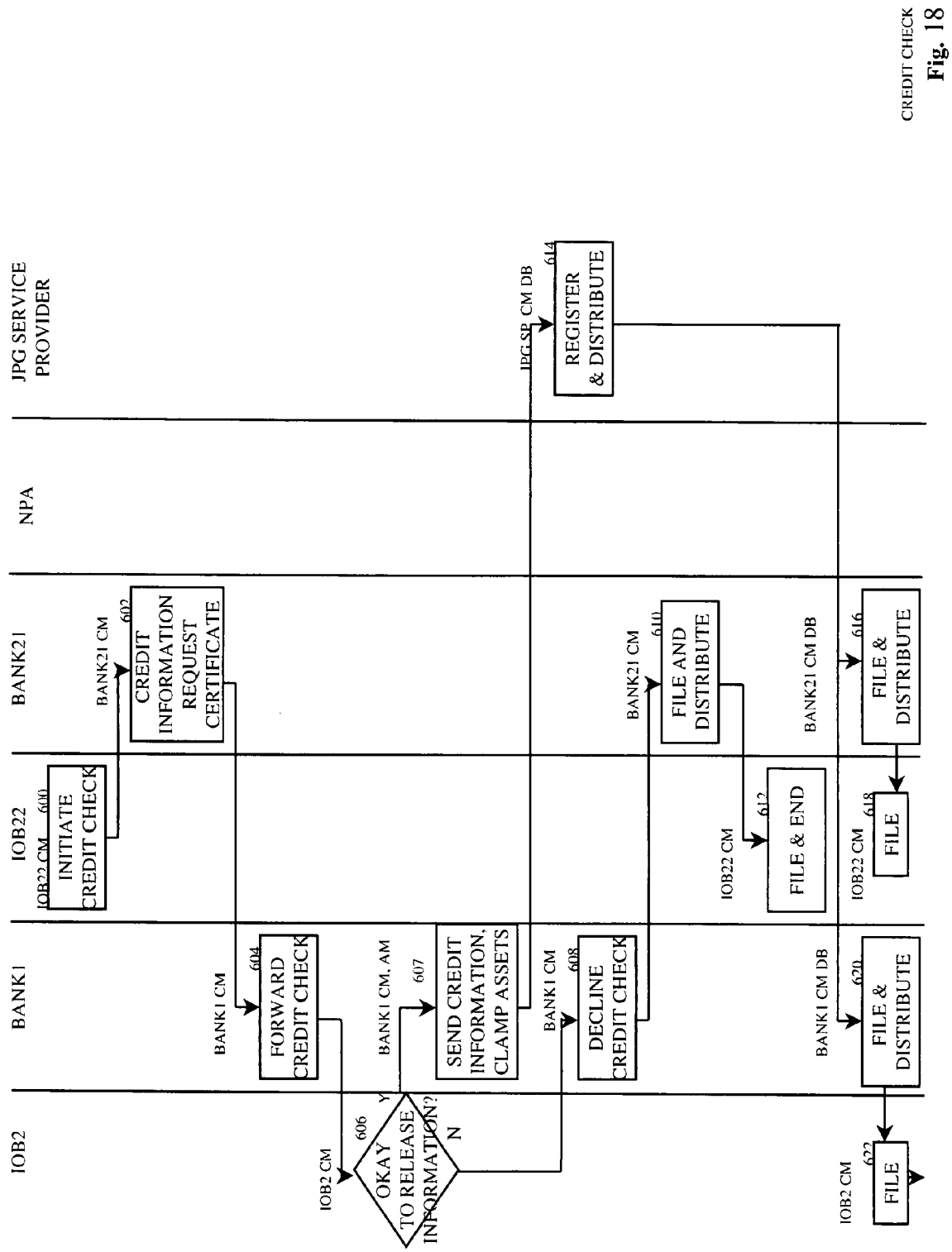
FIGS. 18 through 19, shows the procedures of the process (credit check facility) according to the fifth embodiment of the invention.
Figure 19:
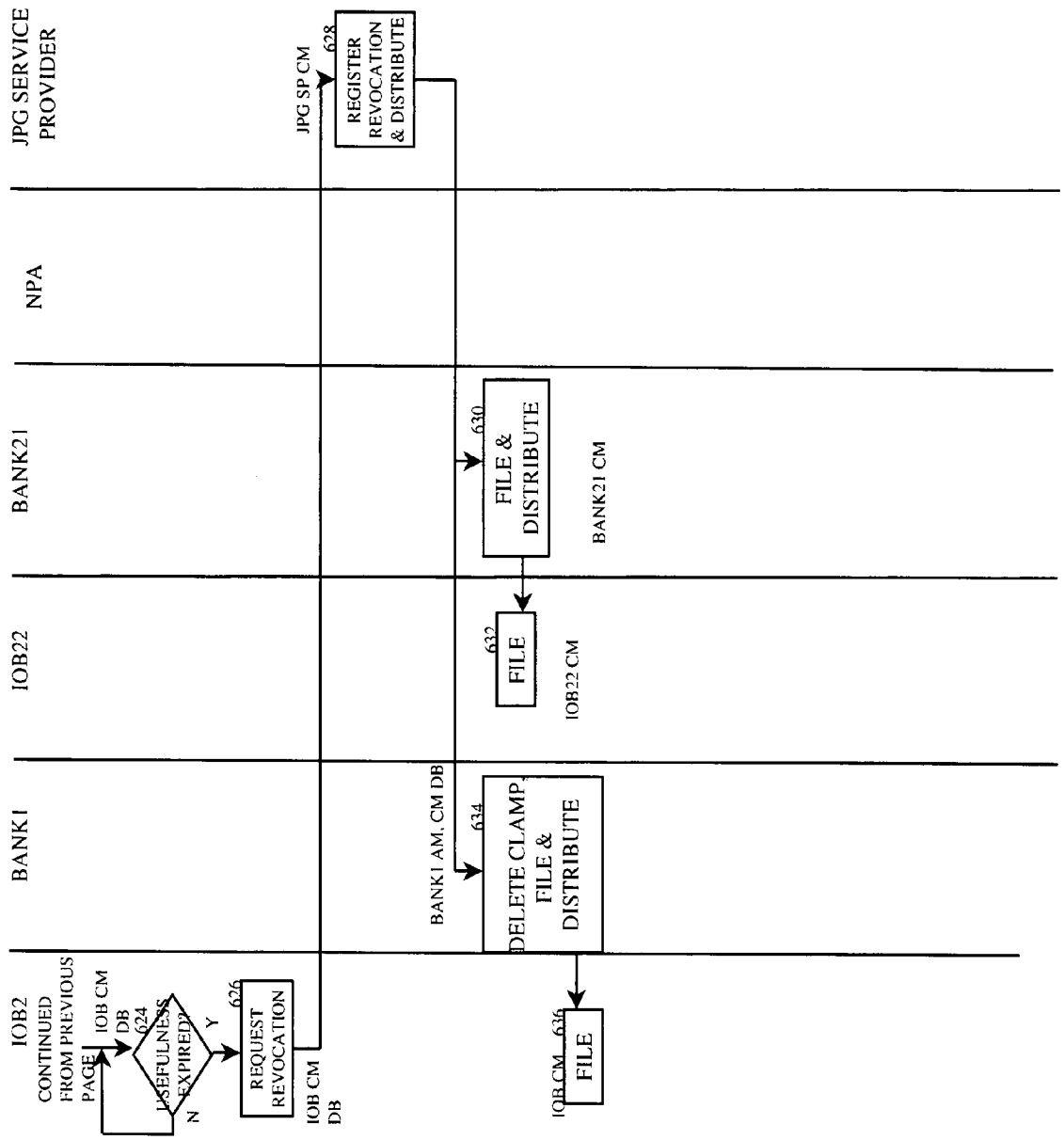

In the flowchart of FIGS. 18 through 19, the payee's processing unit B initiates a Credit Check by filling out a CC certificate. The CC certificate is then transmitted to the payee's financial institution's processing unit D (step 600, hereinafter referred to as S600). The payer, in filling out the transaction information, includes the reservation information from the payer's general use credit facility, for the trade credit guarantee.

The certificate information contains the monetary security information of the buyer. The monetary security can be defined, for example, as the security interest of, or the monetary equivalent of the value of that security interest. This information is in a form that allows that monetary security to be subdivided and distributed to each seller and, or, financial institution named in that certificate, as a settlement payment, for a completely formalized certificate.

At the payee's financial institution's processing unit D, a copy of the CC certificate is filed, and the CC certificate is transmitted to the payer's financial institution's processing unit C (S602).

At the payer's financial institution's processing unit C. a copy of the CC certificate is filed, and the CC certificate is transmitted to the payer's processing unit A (S604).

At the payer's processing unit A, either authorization is entered to assent to the use of the CC certificate, in which case the authorized certificate is transmitted to the payer's financial institution's processing unit C, or the CC certificate is declined, in which case the declined certificate is sent to the payer's financial institution's processing unit C (S606).

At the payer's financial processing unit C, receipt of a declined CC certificate causes the processing unit to file a copy of the certificate information, and transmit the declined certificate to the payee's financial institution's processing unit D (S608).

At the payee's financial institution's processing unit D, a copy of the declined certificate is filed, and the declined certificate is transmitted to the processing unit of the payee B (S610).

At the payee's processing unit B, the declined certificate is filed (S612).

At the payer's financial processing unit C, receipt of an authorized CC certificate causes the processing unit to place a hold on that part of the unused credit facility that is available or requested by the CC certificate, whichever value is the lesser. After placement of the credit hold, the payer's financial institution's processing unit C transmits the certificate information, including the credit hold information, to the JPG SP's processing unit F (S607). At this step, the portion of payer's credit facility which is to be used by the payer's financial institution to underwrite the trade credit process is reserved by the payer's financial institution. Each of the payer, the payee, the payer's financial institution, and the payee's financial institution need to agree to the transaction information contained in the certificate information as first formulated in steps 600 through 607.

At the JPG SP's processing unit F, the authorized certificate information is filed, and a copy of the registration is transmitted to the payer's and the payee's financial institutions' processing units, respectively (S614).

At the payee's financial institution's processing unit D, a copy of the registered CC certificate is filed, and the certificate is transmitted to the payee's processing unit B (S616).

At the payee's processing unit B, the registered certificate information is stored (S618).

At the payer's financial institution's processing unit C, a copy of the registered CC certificate is filed, and the certificate is transmitted to the payer's processing unit A (S620).

At the payer's processing unit A, the registered certificate information is filed (S622).

At the payer's processing unit A, when the usefulness of the CC certificate has expired (S624), a request for revocation of the certificate is transmitted to the JPG SP's processing unit F (S626). In the alternative, the defined expiration of usefulness can be that a transaction needs to be initiated. In that case, the assets clamped in step 607 could be used as the guarantee for one of the forms of payment in the other implementations.

At the JPG SP's processing unit F, the revocation request information is registered in the certificate information, and a copy of the revocation order is transmitted to the payer's and the payee's financial institutions' processing units C and D, respectively (S628). Step 628 requires revocation information that is in agreement with the certificate information agreed to by all signatory parties.

At the payee's financial institution's processing unit D, a copy of the revocation information is filed, and the revocation information is transmitted to the payee's processing unit B (S630).

At the payee's processing unit B, the revocation information is filed (S632).

At the payer's financial institution's processing unit C, the revocation information causes the credit hold of the registered CC certificate to be revoked. The revocation information is filed, and a copy of the revocation information is transmitted to the processing unit of the payer A (S634).

At the processing unit of the payer A, the revocation information is filed (S636).

BP

Sixth, the general configuration and the procedure of the process according to the sixth embodiment of the present invention is described below by referring to FIGS. 21, and 22 through 23.

Figure 21:
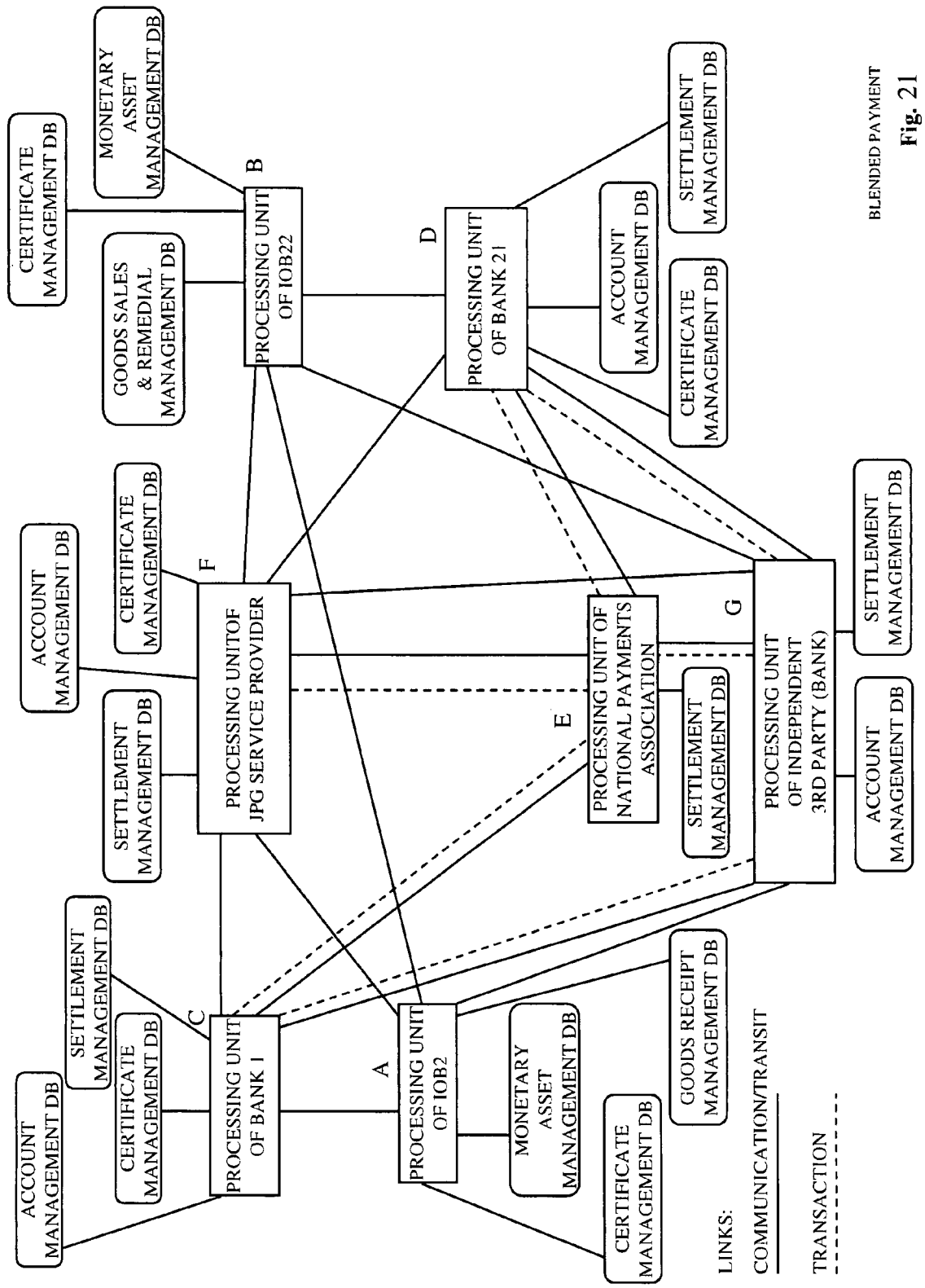
FIG. 21, shows the general configuration of the settlement system according to the sixth embodiment of the present invention (blended payment facility)

FIG. 21 shows the configuration of the system according to the sixth embodiment of the present invention. In FIG. 21, a payer's (IOB2's) processing unit A is provided for the payer of the transaction amount. A payee's processing unit B is provided for the intended payee (IOB22) of the transaction amount.

A processing unit C of the payer's financial institution is provided at the financial institution at which the payer has opened an account, and established a credit facility. A processing unit D of the payee's financial institution is provided at the financial institution at which the payee has opened an account. A financial institution correspond to, for example, a bank, or a financial service provider. A processing unit G of an independent third party financial institution is provided at the financial institution at which the payer and the payee have opened an account. The purpose of the third party account(s) is (are) to facilitate an alternative settlement mechanism as part of the blended payment facility.

A processing unit E of the National Payments Association is provided at the financial institution at which payments are settled between financial institutions on a national basis. The National Payments Association would correspond, for example, to the Canadian Payments Association in Canada, or NACHA, the National Automated Clearing House Association in the United States. In the case of an international transaction, the National Payments Association would correspond, for example, the CPA and NACHA working together.

A processing unit F is provided at the financial institution which is the JPG service provider.

The payer's processing unit A comprises a certificate management database (hereinafter referred to as CM DB), for use in managing the information contained in the BP certificates; a monetary asset management database (hereinafter referred to as MAM DB), for use in managing the monetary asset information (money information) which are used to guarantee for the BP certificates; and a goods receipt management database (hereinafter referred to as GRM DB), for use in managing the receipt of goods information.

The payee's processing unit B comprises a certificate management database (hereinafter referred to as CM DB), for use in managing the information contained in the BP certificates; in the case where the payee is required to make a payment, a monetary asset management database (hereinafter referred to as MAM DB), for use in managing the monetary asset information (money information) which are used to guarantee for the BP certificates; and a goods sales and remedial management database (hereinafter referred to as GSRM DB), for use in managing the sale of goods and remedial actions.

The payer's financial institution's processing unit C comprises of a certificate management database (hereinafter referred to as CM DB), for use in managing the information contained in the BP certificates; an account management database (hereinafter referred to as AM DB), for use in managing the account and credit facility information of a customer (payer) of a financial institution; and a settlement management database (hereinafter referred to as SM DB), for use in managing the money information used in the settlement of transactions.

The payees financial institution's processing unit D comprises of an account management database (hereinafter referred to as AM DB), for use in managing the account and credit facility information of a customer (payer) of a financial institution; of a certificate management database (hereinafter referred to as CM DB), for use in managing the information contained in the BP certificates; and a settlement management database (hereinafter referred to as SM DB), for use in managing the money information used in the settlement of transactions.

The National Payments Association's processing unit E comprises of a settlement management database (hereinafter referred to as SM DB), for use in managing the settlement of transactions between financial institutions.

The JPG Service Provider's processing unit F comprises of a settlement management database (hereinafter referred to as SM DB), for use in managing the money information used in the settlement of transactions; an account management database (hereinafter referred to as AM DB), for use in managing the account information of the BP transaction amount settled to the JPG Service Provider by the payer's financial institution; and a certificate management database (hereinafter referred to as CM DB), for use in managing the information contained in the BP certificates.

The Independent $3^{rd}$ Party's processing unit G comprises of a settlement management database (hereinafter referred to as SM DB), for use in managing the money information used in the settlement of transactions; and an account management database (hereinafter referred to as AM DB), for use in managing the account information of the BP transaction amount settled to the I3P by the payer's financial institution.

Figure 22:
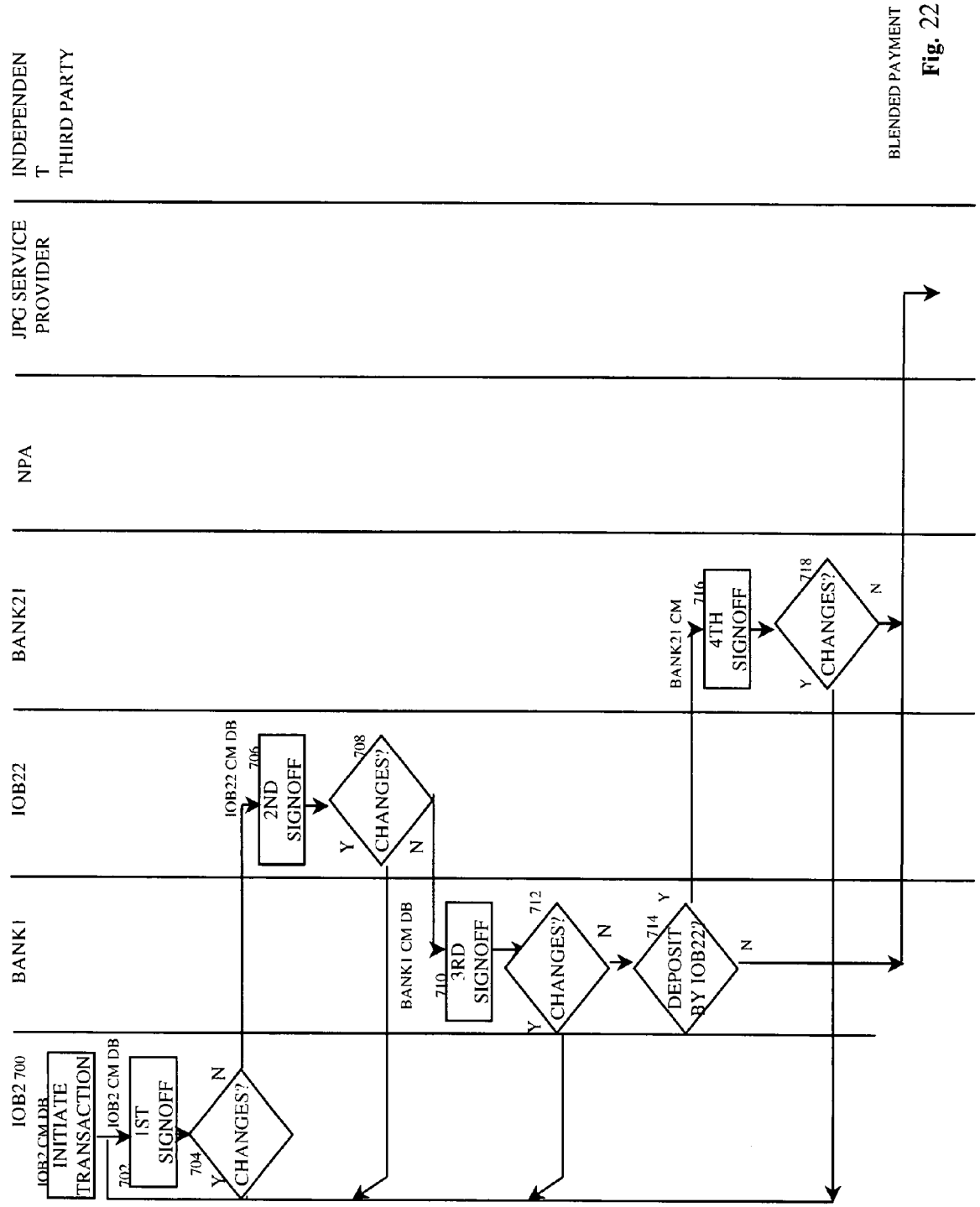
FIGS. 22 through 23, shows the procedures of the process (blended payment facility) according to the sixth embodiment of the invention.
Figure 23:
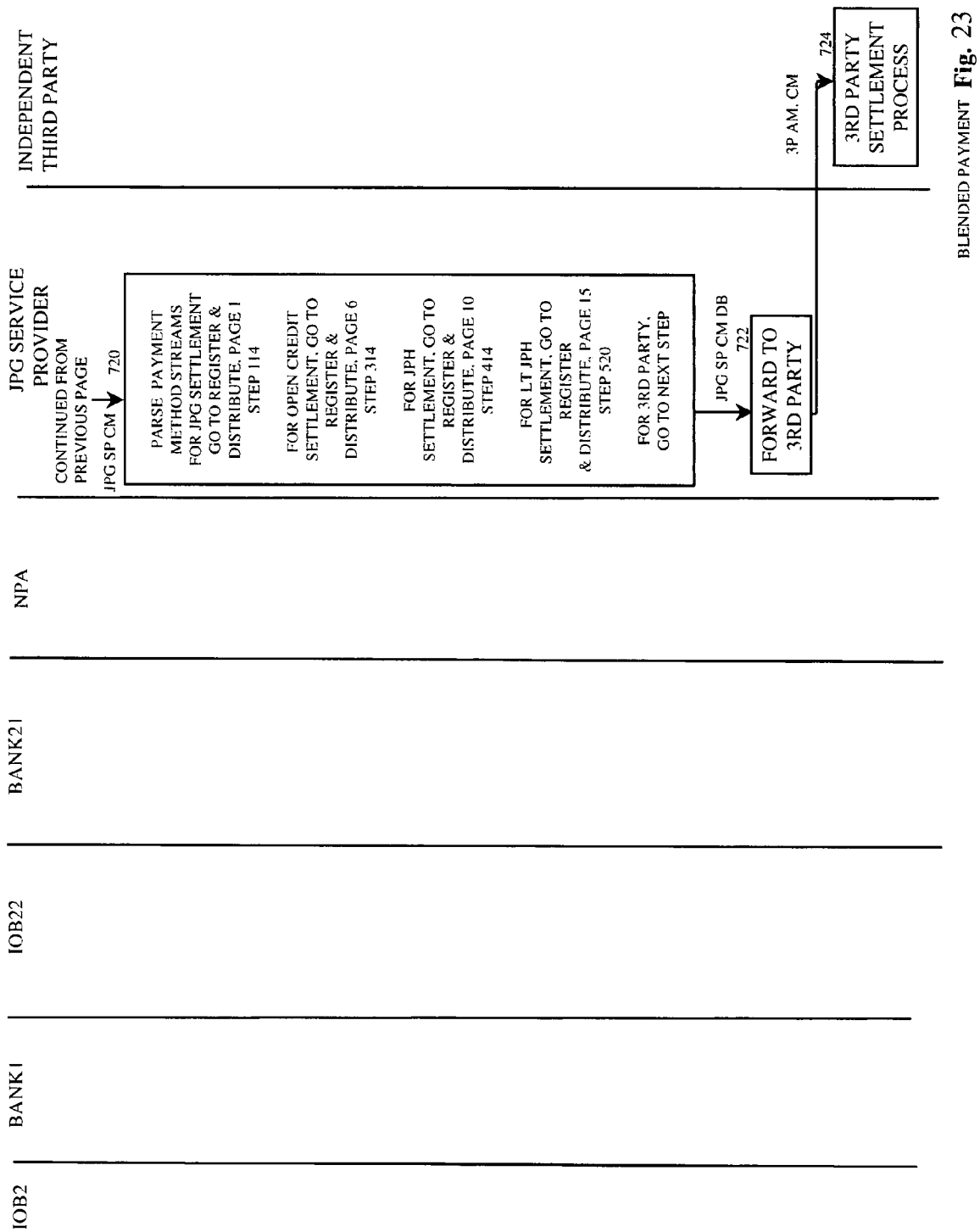

In the flowchart of FIGS. 22 through 23, the payer's processing unit A initiates a transaction by filling out a BP certificate (step 700, hereinafter referred to as S700). The payer, in filling out the transaction information, includes the reservation information from the payer's general use credit facility, for the trade credit guarantee. At the payer's processing unit A the certificate then, in series, is signed by each internal signatory authority, each of which has the capability to propose changes (S702). If changes are proposed, the certificate is transmitted to the payer's processing unit A (back to the start of S702). If the signoff is complete with no changes, the BP certificate is transmitted to the processing unit of the payee B (both "if" decisions are part of S704).

The certificate information contains the monetary security information of the buyer. The monetary security can be defined, for example, as the security interest of, or the monetary equivalent of the value of that security interest. This information is in a form that allows that monetary security to be subdivided and distributed to each seller and, or, financial institution named in that certificate, as a settlement payment, for a completely formalized certificate.

At the payee's processing unit B the certificate then, in series, is signed by each internal signatory authority, each of which has the capability to propose changes (S706). If changes are proposed, the certificate is routed back to the start of the signoff procedure (back to the start of S702). If the signoff is complete with no changes, the BP certificate is transmitted to the processing unit of the financial institution of the payer C (both "if" decisions are part of S708).

At the payer's financial institution's processing unit C the certificate then, in series, is signed by each internal signatory authority, each of which has the capability to propose changes (S710). If changes are proposed, the certificate is transmitted to the processing unit of the payer A (back to the start of S702). If the signoff is complete with no changes (both "if" decisions are part of S712) the BP certificate is checked to see if there is a payment expected by the payee. If there is a payment expected from the payee, the certificate is transmitted to the payee's financial institution's processing unit D. If no payment from the payee is specified, the certificate is transmitted to the processing unit of the JPG service provider F (both "if decisions are part of Step 714).

At the payee's financial institution's processing unit D the certificate then, in series, is signed by each internal signatory authority, each of which has the capability to propose changes (S716). If changes are proposed, the certificate is transmitted to the processing unit of the payer A (back to the start of S702). If the signoff is complete with no changes, the BP certificate is transmitted to the processing unit of the JPG service provider F (both "if" decisions are part of S718). Each of the payer, the payee, the payer's financial institution, and the payee's financial institution need to agree to the transaction information contained in the certificate information as first formulated in steps 700 through 718.

At the JPG SP's processing unit F, the BP certificate information is parsed into subsidiary certificate information, and modified into separate certificates, as specified within the BP certificate information, for settlement according to the Joint Payment Guarantee, Open Credit, Joint Payment Hold, Long Term Joint Payment Hold, or a Third Party settlement process. For that part of the settlement which is to be processed as a JPG certificate, the JPG certificate is entered into the JPG settlement process by registration per Step 114 of the JPG settlement process. It is then processed as a JPG certificate from that point forward. For that part of the settlement which is to be processed as an OC certificate, the OC certificate is entered into the OC settlement process by registration per Step 314 of the OC settlement process. It is then processed as an OC certificate from that point forward. For that part of the settlement which is to be processed as a JPH certificate, the JPH certificate is entered into the JPH settlement process by registration per Step 414 of the JPH settlement process. It is then processed as a JPH certificate from that point forward. For that part of the settlement which is to be processed as a LT JPH certificate, the LT JPH certificate is entered into the LT JPH settlement process by registration per Step 520 of the LT JPH settlement process. It is then processed as a LT JPH certificate from that point forward (S720). Step 720 illustrates how one contingency trade credit method could be used to initiate one, or a plurality of, other contingency trade credit methods.

At the JPG SP's processing unit F, that part of the BP certificate information which has been parsed into third party settlement information is registered and transmitted to the third party's processing unit G (S724).

PF

Seventh, the general configuration and the procedure of the process according to the seventh embodiment of the present invention is described below by referring to FIGS. 24, and 25 through 26. The pro-forma instrument can be used as a planning tool for financial resources over a series of payment intervals.

Figure 24:
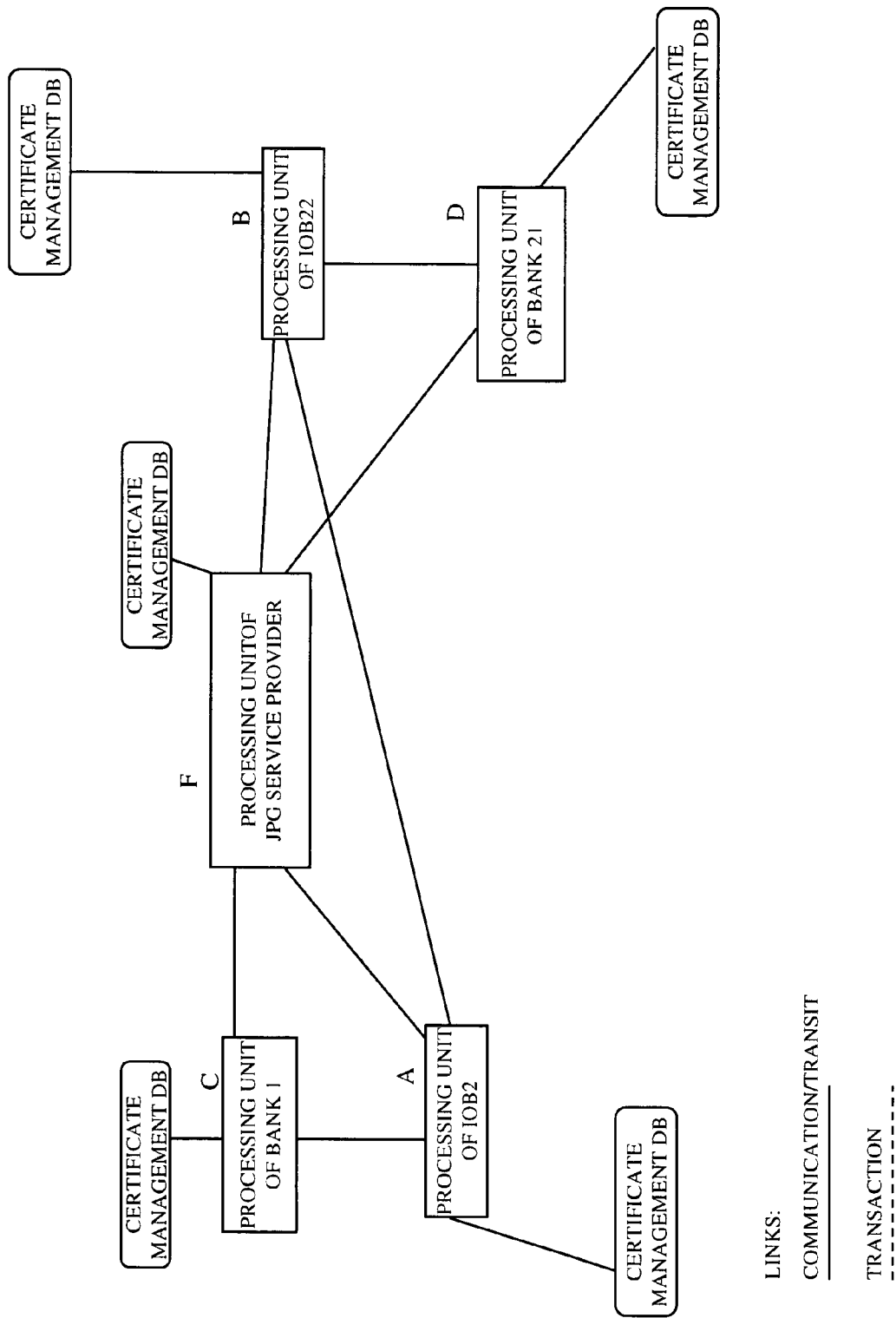
FIG. 24, shows the general configuration of the settlement system according to the seventh embodiment of the present invention (pro-forma financial planning facility)

FIG. 24 shows the configuration of the system according to the seventh embodiment of the present invention. In FIG. 24, a pro-forma payer's (IOB2's) processing unit A is provided for the pro-forma payer of the transaction amount. A pro-forma payee's processing unit B is provided for the pro-forma payee (IOB22) of the transaction amount.

A processing unit C of the pro-forma payer's financial institution is provided at the financial institution at which the pro-forma payer has opened an account, and established a credit facility. A processing unit D of the pro-forma payee's financial institution is provided at the financial institution at which the pro-forma payee has opened an account. A financial institution correspond to, for example, a bank, or a financial service provider.

A processing unit F is provided at the financial institution which is the JPG service provider.

The pro-forma payer's processing unit A comprises a certificate management database (hereinafter referred to as CM DB), for use in managing the information contained in the PF certificates.

The pro-forma payee's processing unit B comprises a certificate management database (hereinafter referred to as CM DB), for use in managing the information contained in the PF certificates.

The pro-forma payer's financial institution's processing unit C comprises of a certificate management database (hereinafter referred to as CM DB), for use in managing the information contained in the PF certificates.

The pro-forma payees financial institution's processing unit D comprises of a certificate management database (hereinafter referred to as CM DB), for use in managing the information contained in the PF certificates.

The JPG Service Provider's processing unit F comprises of a certificate management database (hereinafter referred to as CM DB), for use in managing the information contained in the PF certificates.

Figure 25:
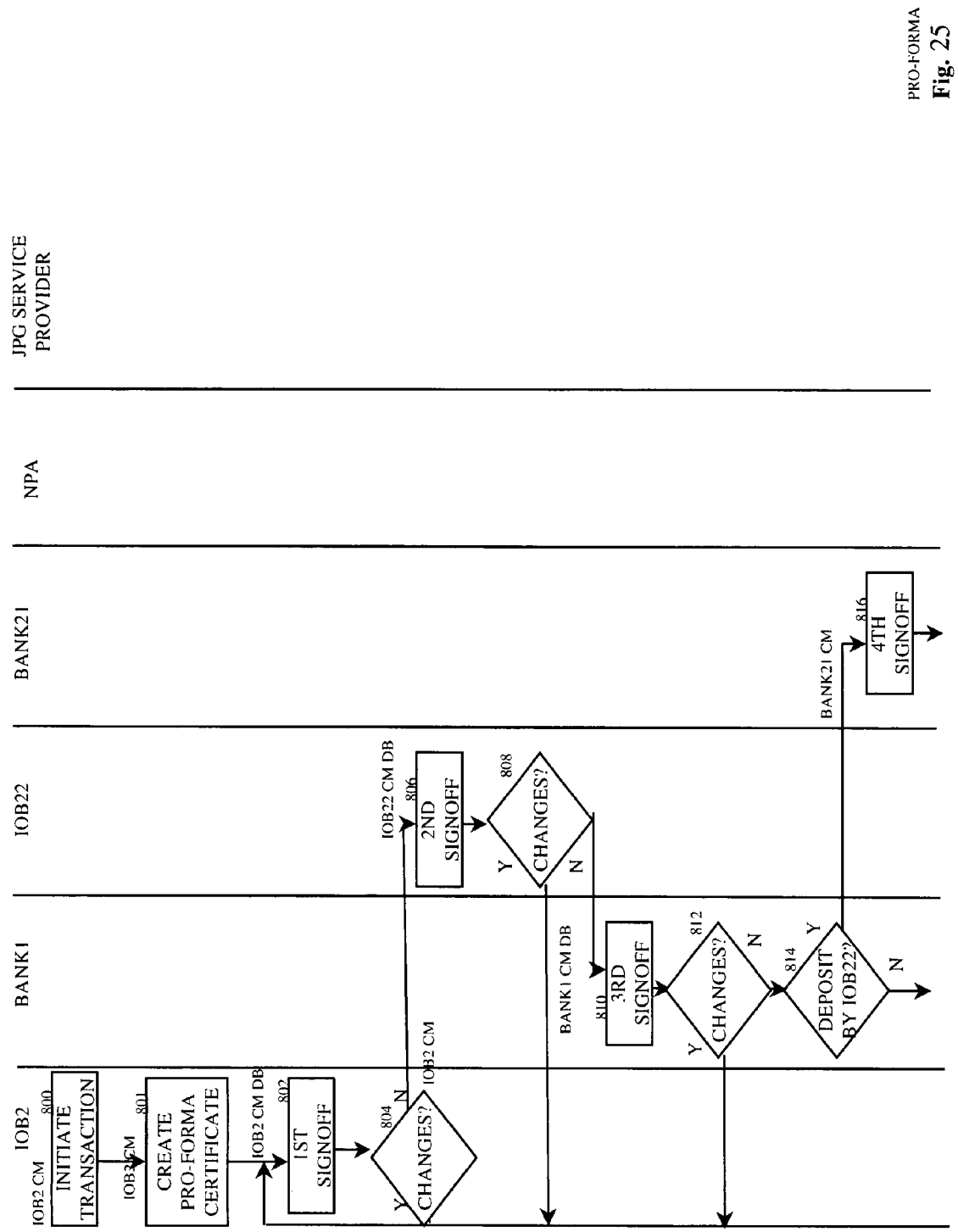
FIGS. 25 and 26, shows the procedures of the process (pro-forma financial planning facility) according to the seventh embodiment of the invention.
Figure 26:
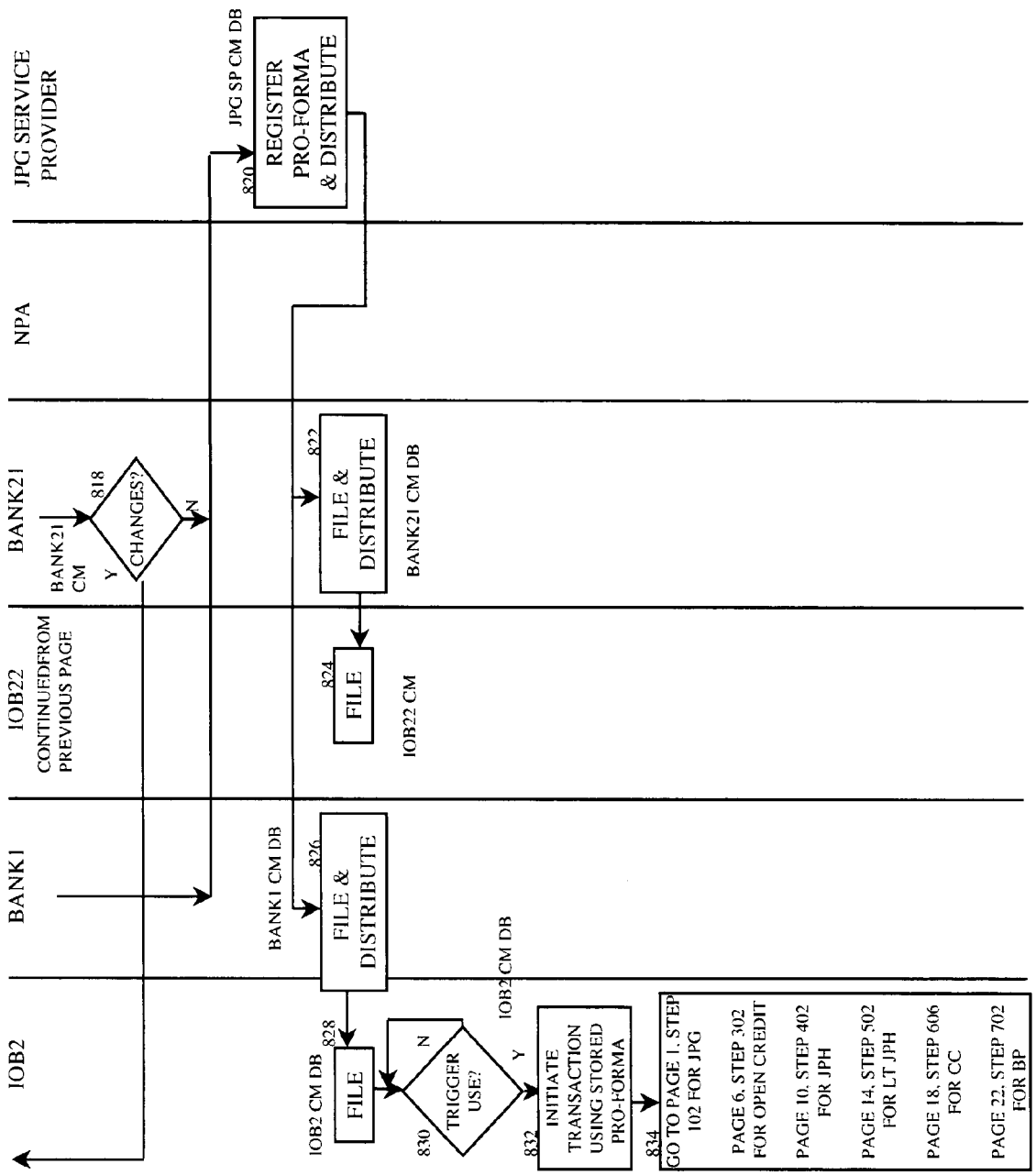
Figure 27:
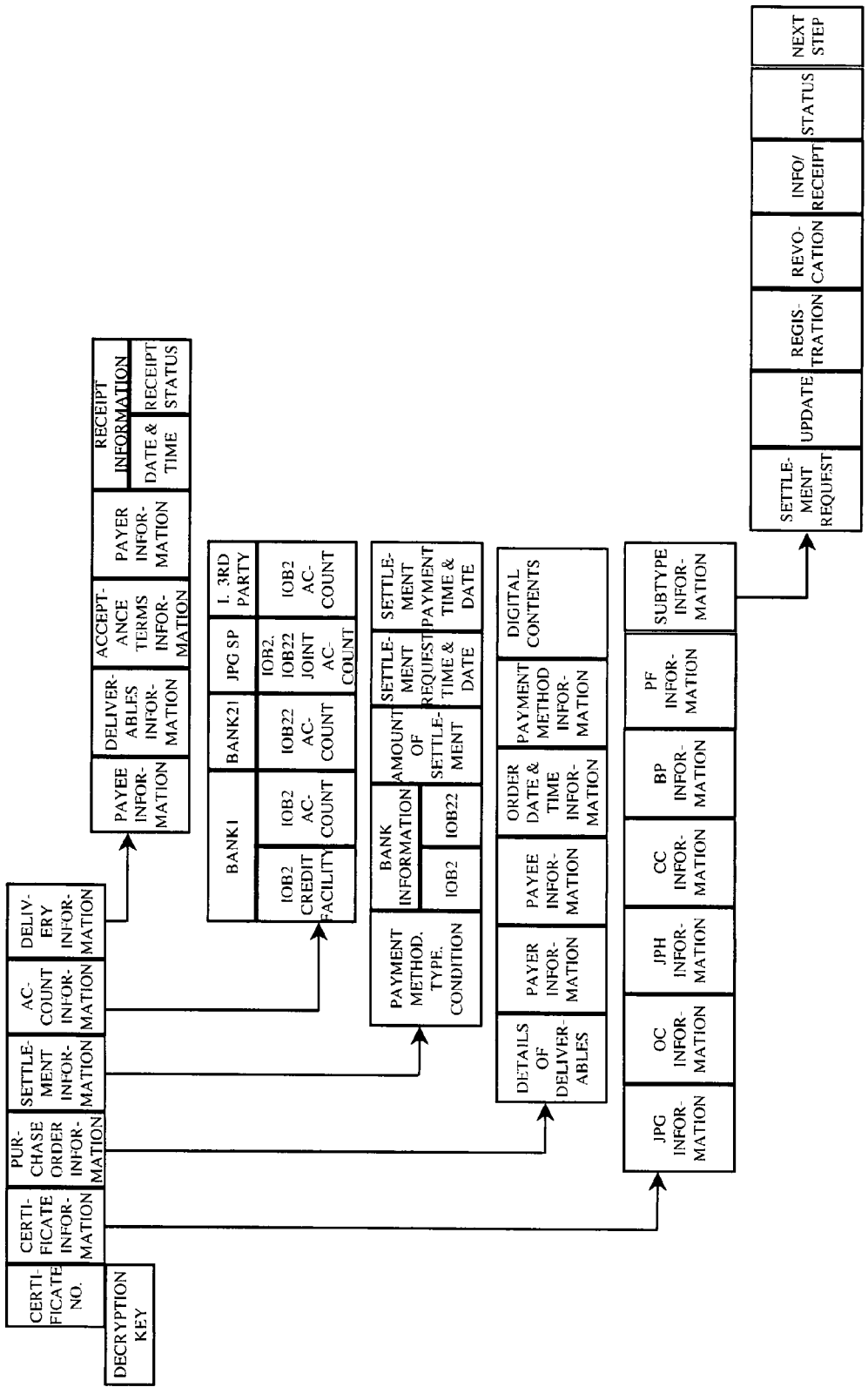
FIG. 27, shows the settlement process information contained in the certificate information for this invention.
Figure 29:
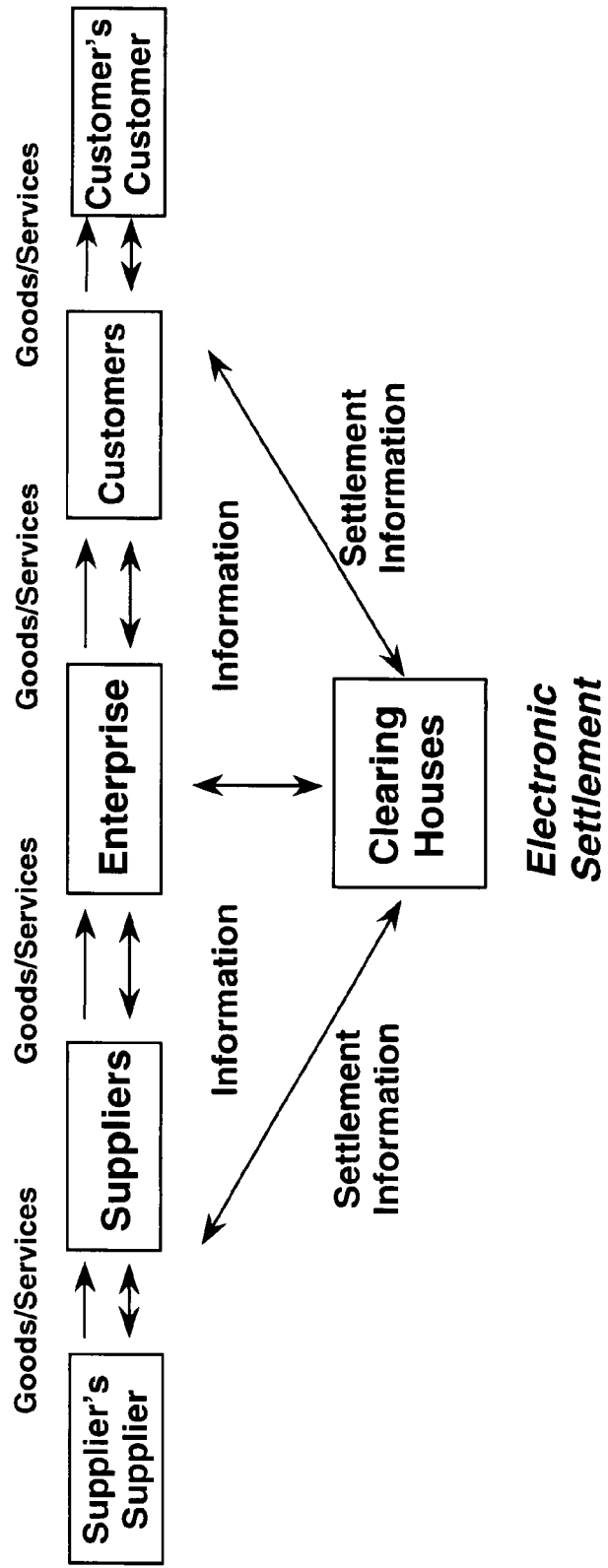
Figure 30:
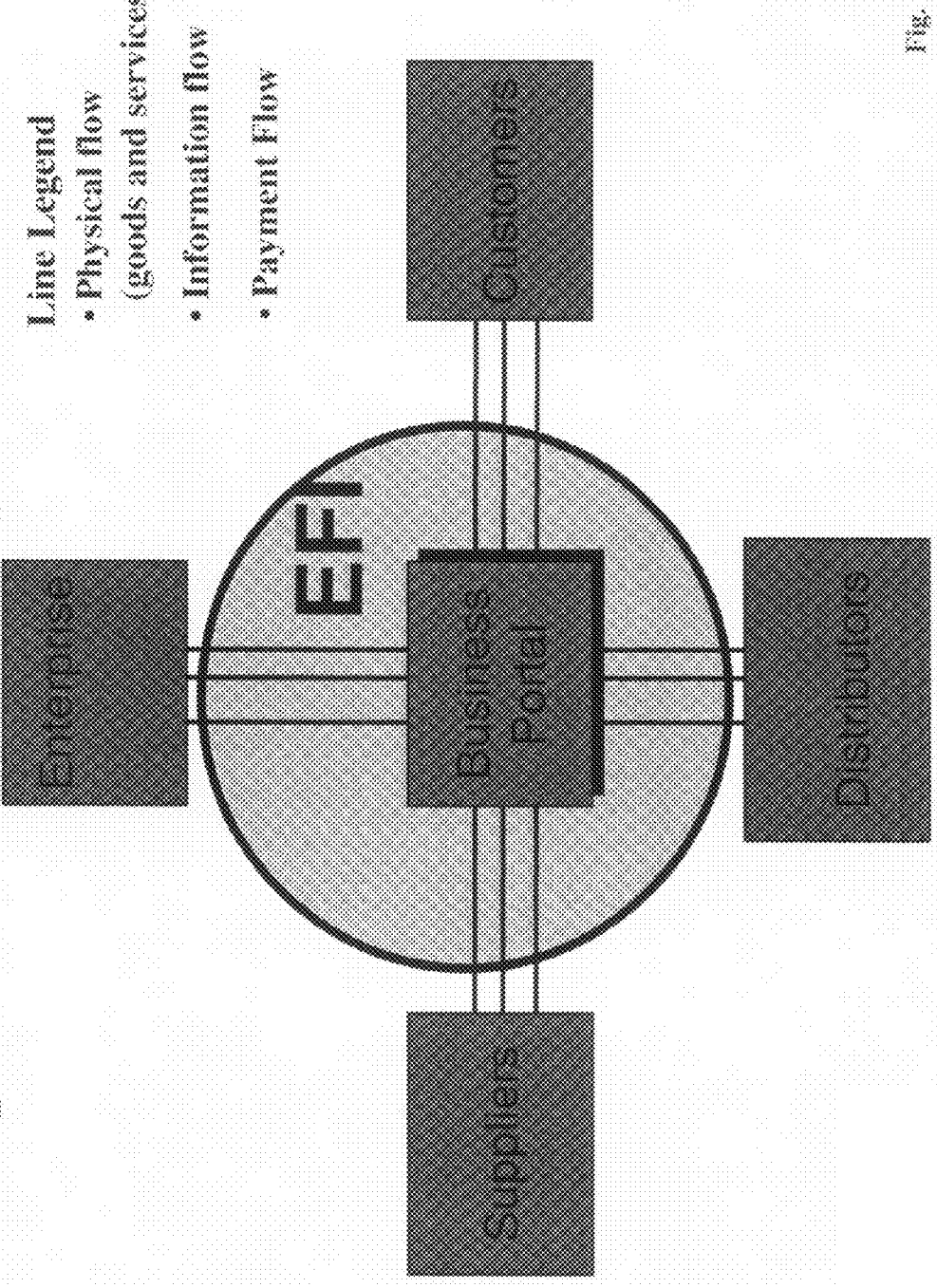
Figure 31:
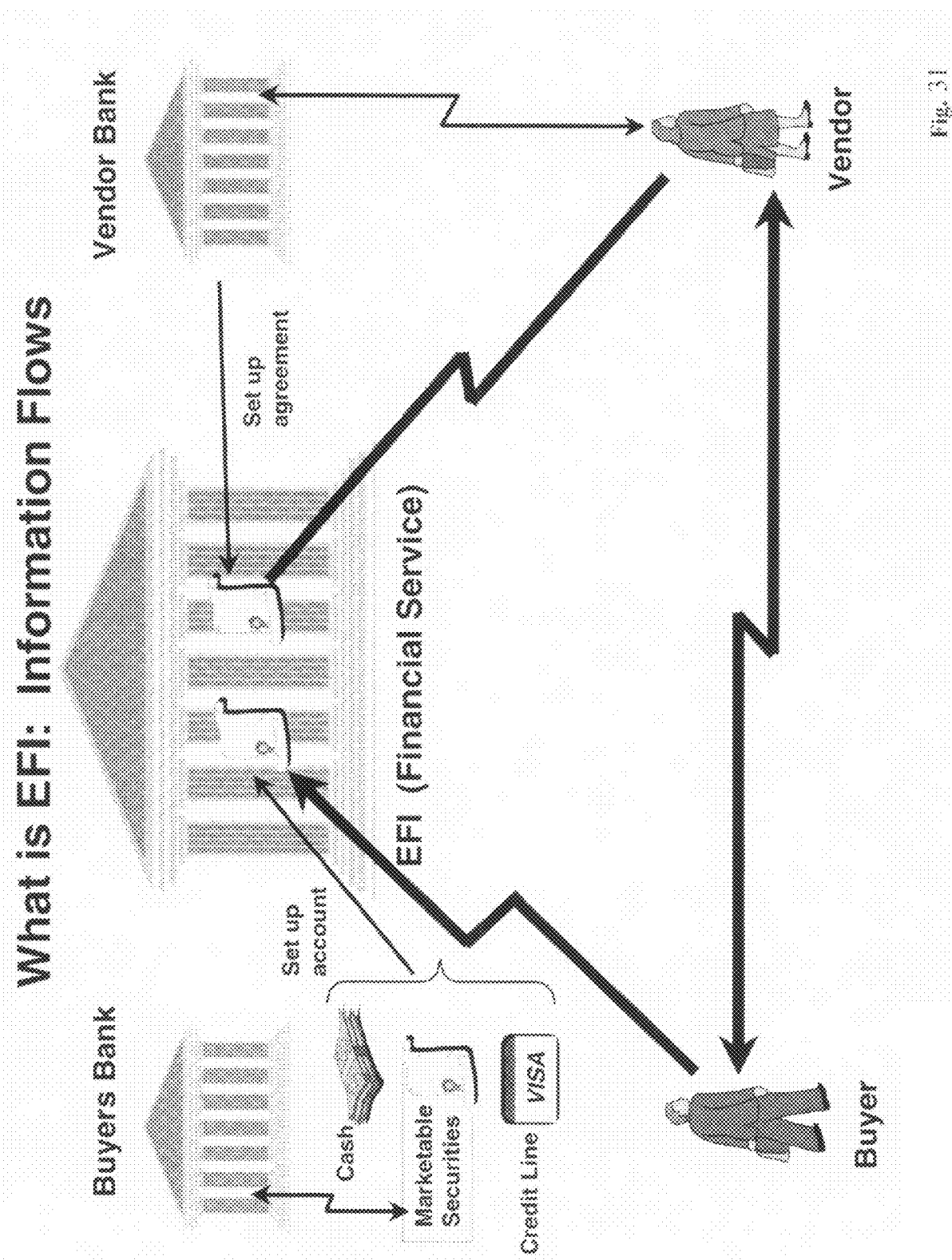
Figure 32:
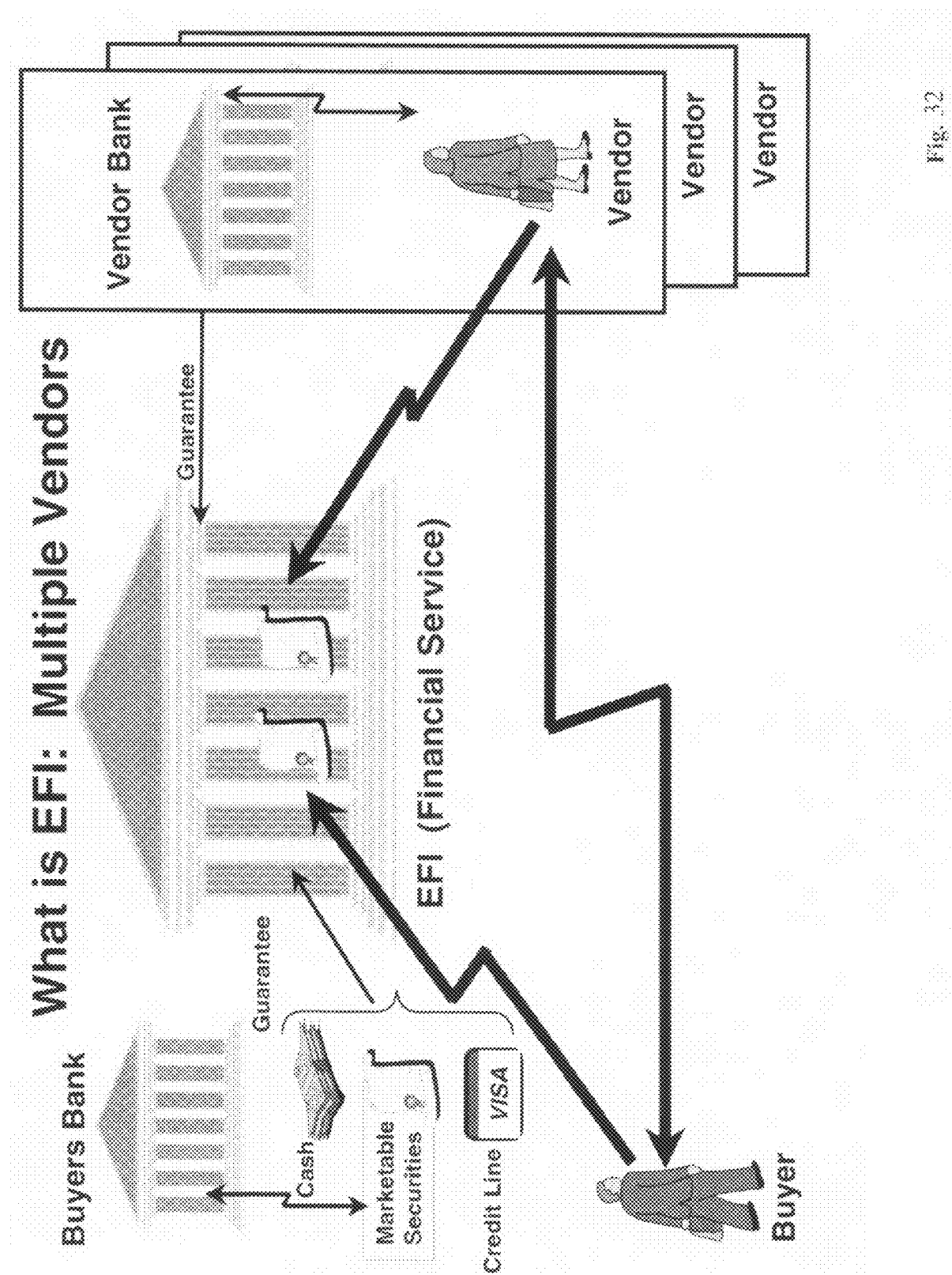
Figure 33:
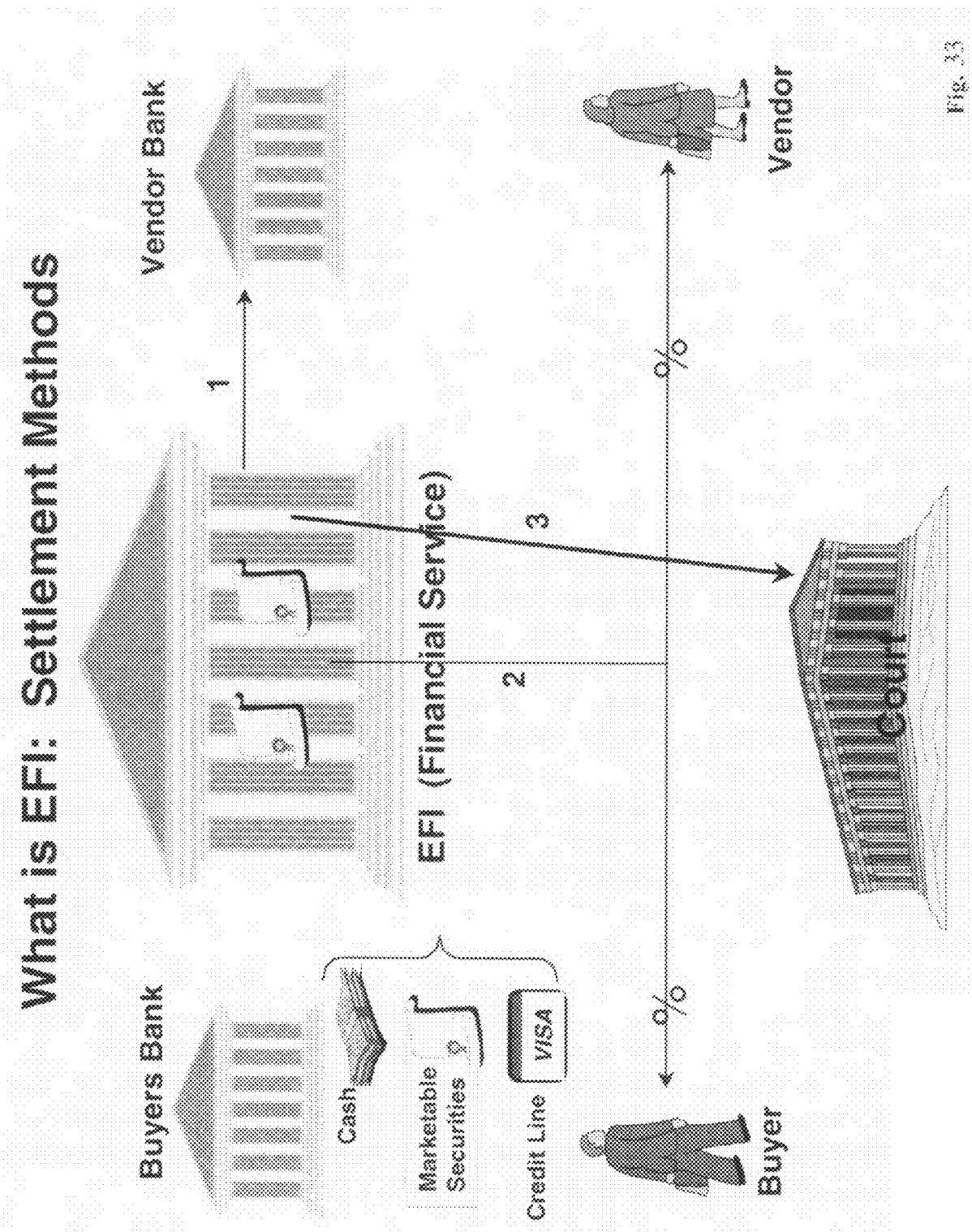
Figure 34:
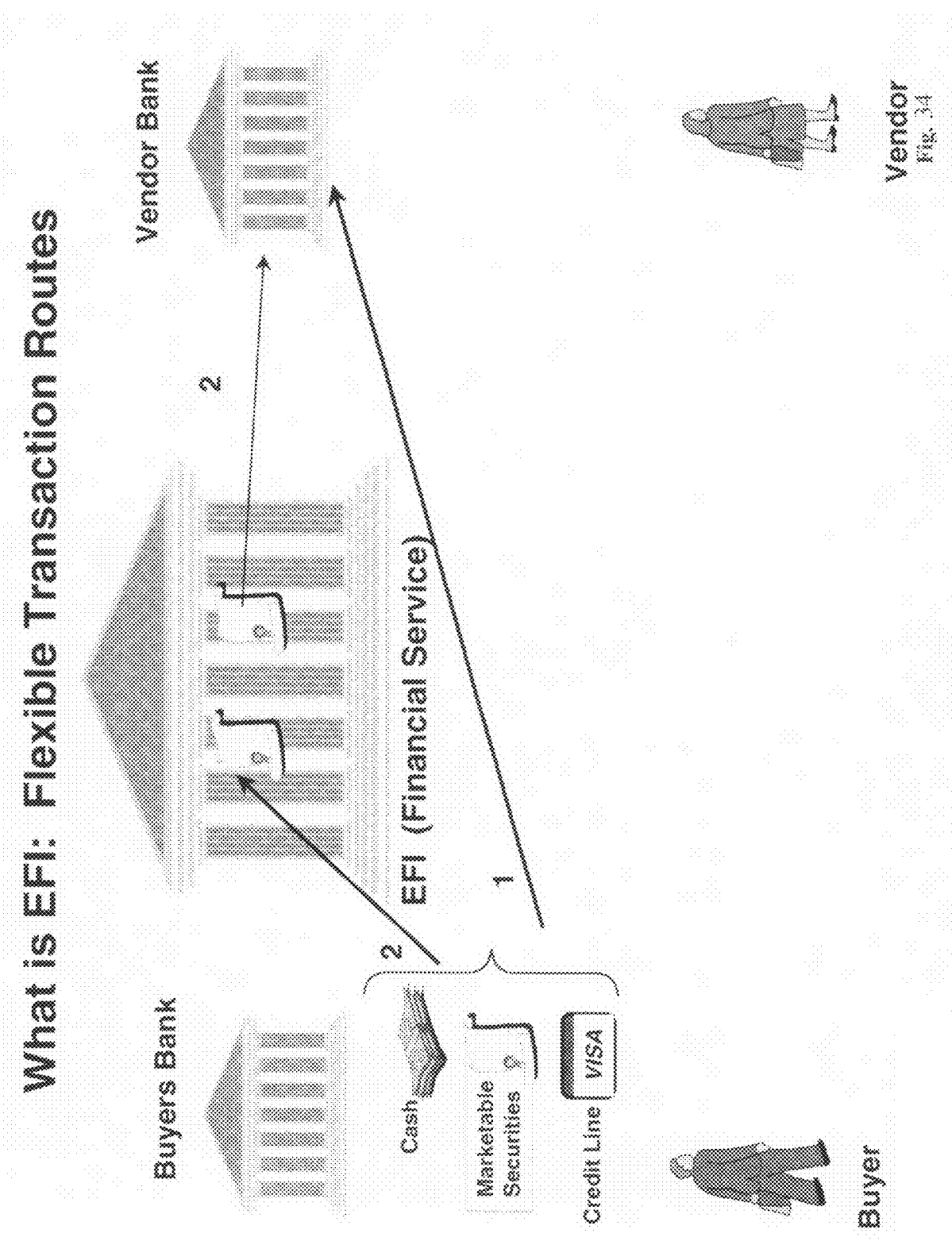

In the flowchart of FIGS. 25 through 26, the payer's processing unit A initiates a pro-forma transaction by filling out a PF certificate (step 800, hereinafter referred to as S800). The payer, in filling out the transaction information, includes the reservation information from the payer's general use credit facility, for the trade credit guarantee. At the payer's processing unit A the certificate then, in series, is signed by each internal signatory authority, each of which has the capability to propose changes (S802). If changes are proposed, the certificate is transmitted to the payer's processing unit A (back to the start of S802). If the signoff is complete with no changes, the PF certificate is transmitted to the processing unit of the payee B (both "if" decisions are part of S804).

The certificate information contains the monetary security information of the buyer. The monetary security can be defined, for example, as the security interest of, or the monetary equivalent of the value of that security interest. This information is in a form that allows that monetary security to be subdivided and distributed to each seller and, or, financial institution named in that certificate, as a settlement payment, for a completely formalized certificate.

At the payee's processing unit B the certificate then, in series, is signed by each internal signatory authority, each of which has the capability to propose changes (S806). If changes are proposed, the certificate is routed back to the start of the signoff procedure (back to the start of S802). If the signoff is complete with no changes, the PF certificate is transmitted to the processing unit of the financial institution of the payer C (both "if" decisions are part of S808).

At the payer's financial institution's processing unit C the certificate then, in series, is signed by each internal signatory authority, each of which has the capability to propose changes (S810). If changes are proposed, the certificate is transmitted to the processing unit of the payer A (back to the start of S802). If the signoff is complete with no changes (both "if" decisions are part of S812) the PF certificate is checked to see if there is a payment expected by the payee. If there is a payment expected from the payee, the certificate is transmitted to the payee's financial institution's processing unit D. If no payment from the payee is specified, the certificate is transmitted to the processing unit of the JPG service provider F (both "if decisions are part of Step 814).

At the payee's financial institution's processing unit D the certificate then, in series, is signed by each internal signatory authority, each of which has the capability to propose changes (S816). If changes are proposed, the certificate is transmitted to the processing unit of the payer A (back to the start of S802). If the signoff is complete with no changes, the PF certificate is transmitted to the processing unit of the JPG service provider F (both "if" decisions are part of S818). Each of the payer, the payee, the payer's financial institution, and the payee's financial institution need to agree to the transaction information contained in the certificate information as first formulated in steps 800 through 818.

At the processing unit of the JPG service provider F, the PF certificate is registered, and a copy of the registered certificate is transmitted to the payer's and payee's financial institutions' processing units C and D, respectively (S820).

At the processing unit of the financial institution of the payee D, the copy of the registered certificate is stored, and a copy is forwarded to the processing unit of the payee B (S822).

At the processing unit of the payee B, the copy of the registered certificate is stored (S824).

At the processing unit of the financial institution of the payer C, the copy of the registered certificate is stored, and a copy of the certificate is transmitted to the processing unit of the payer A (S826). At this step, the portion of payer's credit facility which is to be used by the payer's financial institution to underwrite the trade credit process is reserved by the payer's financial institution.

At the processing unit of the payer A, the copy of the registered certificate is stored (S828). A query loop is then started within the processing unit of the payer A. If authorization is given (S830), the pro-forma certificate information is processed to initiate a transaction of the type specified in the pro-forma certificate (S832). The stored pro-forma transaction information can then be used, when authorization is given, by inserting the certificate to the start of the JPG Step 102, or the OC credit at step 302, or the JPH at step 402, or the LT JPH at step 502, or the BP at Step 702 (S834) Step 834 illustrates how one contingency trade credit method could be used to initiate one, or a plurality of, other contingency trade credit methods.

Processing Unit

Figure 37:
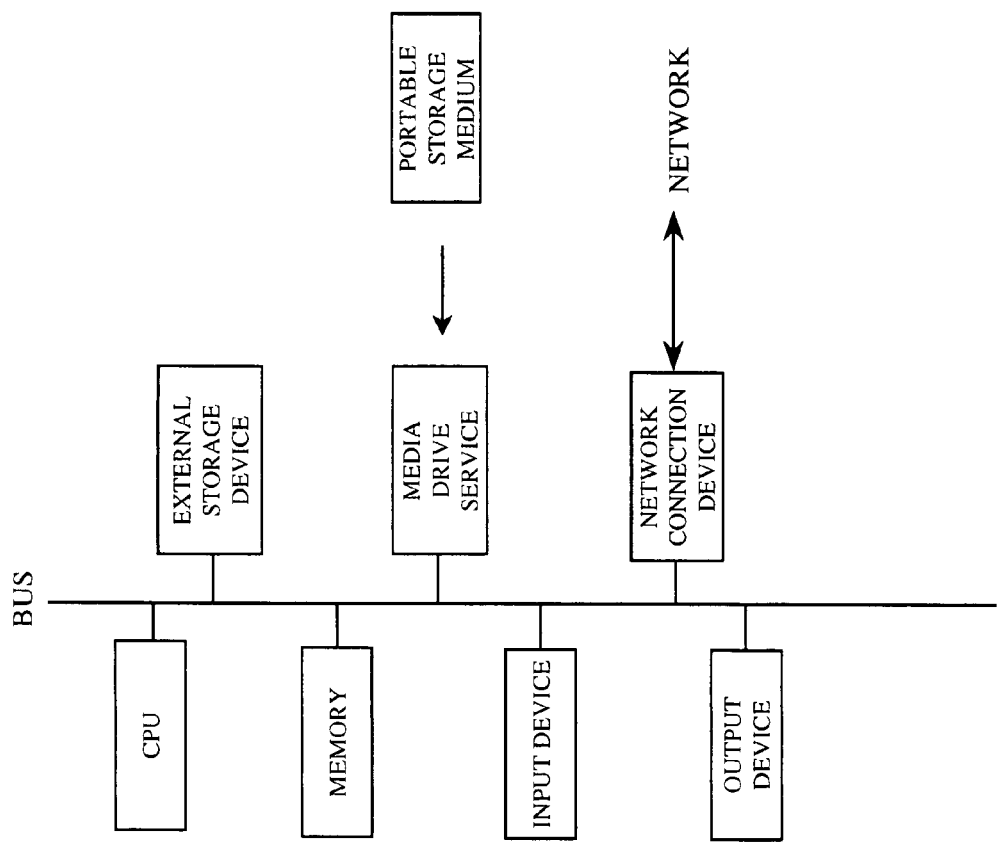
FIG. 37, shows the configuration of an information processing device.

Each device or unit according to the present embodiment can be designed using the information processing unit (computer) as shown in the FIG. 37. The information processing device shown on FIG. 37 comprises a CPU (central processing unit), memory, an input device, an output device, an external storage device, a media drive device, and a network connection device. These components are interconnected through a bus.

The memory stores a program and data used for a process. The memory can be, for example, ROM (read only memory), RAM (random access memory). etc. The CPU performs the necessary process by executing the program using the memory.

The input device is, for example, a keyboard, a pointing device, a touch panel. etc., and can be used when inputting an instruction and information from a user. The output device is, for example, a display, a printer, etc. and can be used when outputting an inquiry, a process result, etc. to a user. The external storage device is, for example, a magnetic disk device, an optical disk device, a magneto-optical disk device, etc. The above described program and data are stored in the external storage device, and loaded onto memory for use as necessary. The external storage device can also be used as a database of various types.

The media drive device drive a portable storage medium, and accesses the stored components. The portable storage medium can be any computer-readable storage medium such as a memory card, a floppy disk, CD-ROM (compact disk read only memory), an optical disk, a magneto-optical disk, etc. The above described program and data are stored on the portable storage medium, and loaded onto the memory for use as necessary.

The network connection device communicates with other devices through an optional network (line) such as a LAN (local area network), etc., and converts data for communications. When it is necessary, the above described program and data are received from an external device, and they are loaded onto memory to be used.

Figure 38:
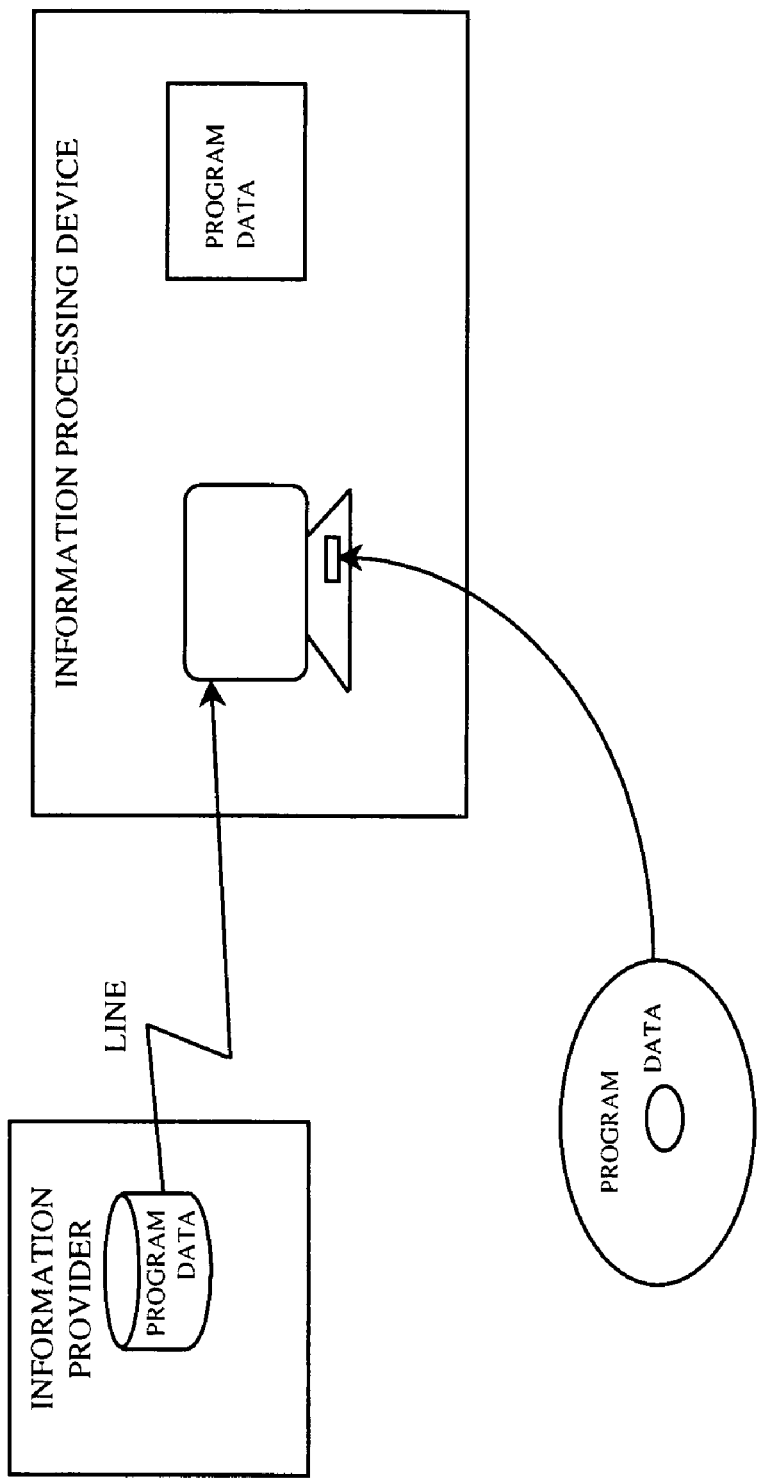
FIG. 38, show storage media.

The FIG. 38 shows computer-readable storage media capable of providing the program and data for the information processing device shown on FIG. 37. The program and data stored in the portable storage medium and an external database are loaded into the memory. The CPU executes the program using the data and performs a necessary process.

Figure 39:
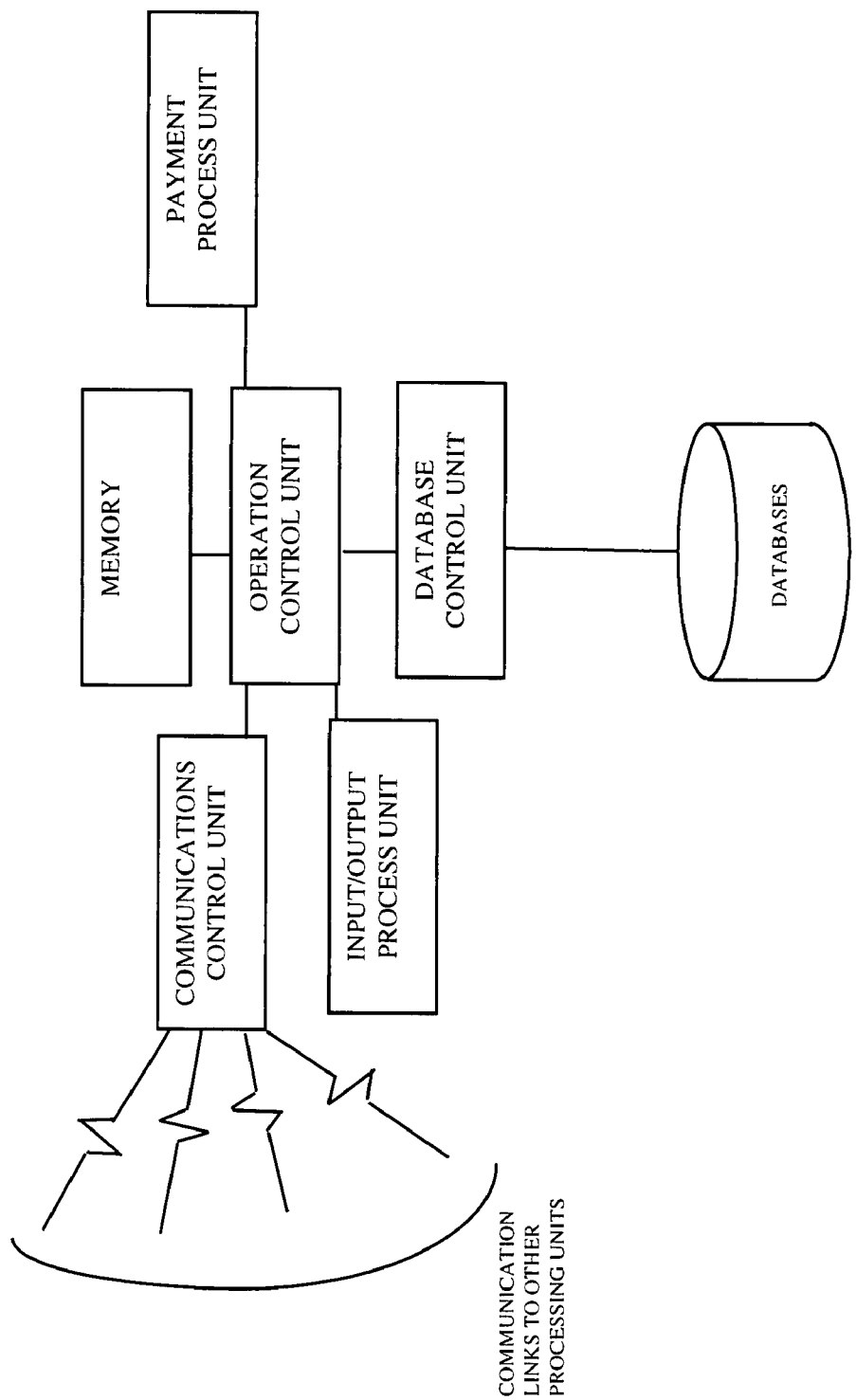
FIG. 39 shows the general configuration according to an embodiment of a processing unit.

To attain the above-described functions of the processing units of the above-described invention, the transaction management device is designed as shown on the FIG. 39. That is, the transaction management device comprises an operation control unit for controlling the entire system; a communications control unit for line-connection to each unit which data is transmitted to or received from; a database control unit for controlling each database; a transaction management process unit for executing each function of the transaction management device; an input/output process unit; and a memory (random access memory).

Encryption

Figure 41:
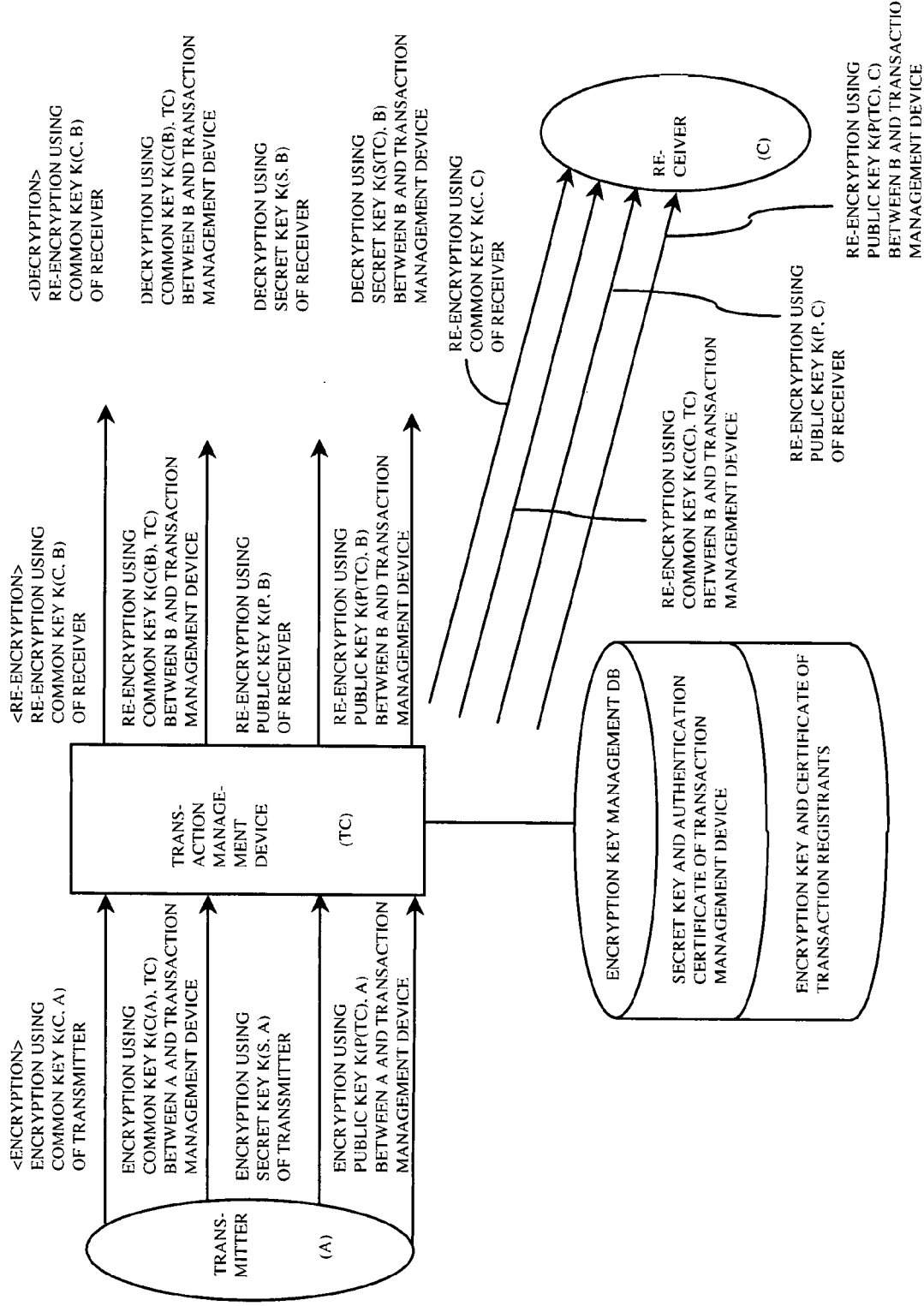
FIG. 41, if provided, would show the general configuration of the settlement system according to the ninth embodiment of the present invention process (encrypted settlement process for the delayed settlement of money).

The characteristics of the encryption and decryption according to the present embodiment are described below, and in FIGS. 40 and 41.

Generally, in a goods order, payment in electronic money, transmission of digital contents, transmission, transfer, etc. of electronic money through a final settlement, etc. in the electronic commerce, privacy cannot be protected or may be illegally used if an electronic message is transmitted or received as a plain text. Various encryption methods such as a secret key/public key method in which different keys are used for encryption and decryption including the RSA (Rivest-Shamir-Adleman) method, the DSA (digital signature algorithm) method, etc., and a common key method in which the same key is used for encryption and decryption including the DES (data encryption standard) method, the FEAL (fast encryption algorithm) method, etc. have been developed. Using the above described methods, messages are transmitted after being encrypted so that third parties cannot read them. The current encryption methods are classified into the following two types.

In the first type of encryption method, a transmitter encrypts electronic messages using a common key which is an encryption key of the transmitter. The transmitter also encrypts the transmitter's common key using the receiver's public key separately obtained and transmits the encrypted key together with the encrypted messages so that the receiver can decrypt the encrypted messages. The receiver decrypts the encrypted key using his or her own secret key to obtain the transmitter's common key, and decrypts the encrypted messages using the obtained transmitter's common key. However, if the transmitter's common key is preliminarily transmitted to the receiver, only the messages are encrypted before transmission using the transmitter s common key.

However, in the above described conventional encrypt methods, when a transmitter encrypts a message using his or her common key, the transmitter has to publish it to another person (receiver). Therefore, the common key should be changed each time to avoid an illegal use or to protect privacy. If a message is encrypted using the receiver's public key, a complicated process of obtaining the receiver's public key should be performed. If the transmitter sends a second and subsequent messages to the same receiver, the receiver's public key can be managed in the database so that the transmitter does not have to obtain again the receiver's public key. In this case, however, the management file becomes large, and no synchronization can be gained if the receiver's public key is changed, thereby generating the possibility that messages cannot be correctly transmitted to the receiver.

What is claimed is:

1. A method that combines a contingency process with a trade credit process to create a contingency trade credit process, wherein one or a plurality of partial security interests are specified in credit, payment, settlement, settlement request, transaction, or transaction details information in the certificate information, comprising:

i. Receiving, by a processing unit of a payer's financial institution, certificate information containing credit information of a payer;

ii. Receiving, by a processing unit of a service provider, the certificate information containing transaction information containing time or event information, and transaction details information;

iii. Receiving, by the processing unit of the service provider, the certificate information containing invoice and settlement request information;

iv. Receiving, by the processing unit of the service provider, the certificate information containing event information;

v. Processing, by the processing unit of the service provider, an algorithm which calculates time information, and processes available event and settlement request information, wherein the algorithm uses the available information to choose between requesting a settlement to be sent to the processing unit of the service provider or to a processing unit of a payee's financial institution;

vi. Transmitting the certificate information containing a request for settlement from the processing unit of the service provider;

vii. Transmitting, by the processing unit of the payer's financial institution, payment in response to the request for settlement;

viii. Implementing trade credit, wherein:
  1. Providing an unsecured offer to provide timely payment directly to the payee by the payer;
  2. accenting of the offer by the payee;
  3. exchanging consideration between the payee and the payer;

ix. Implementing offer and acceptance for trade credit, wherein the payer and payee propose and signoff transaction certificate information, sending changes back to the other party for signoff until both parties have signed off on identical certificate information;

x. Implementing exchange of consideration between the payee and the payer, wherein:
  1. the payee delivers the contracted service or product, constructs invoice information, and transmits a settlement request to a Joint Payment Guarantee (JPG) service provider;
  2. the JPG service provider registers the settlement request and sends the information to the banks of the payer and the payee, for file storage and further distribution to those parties;
  3. the buyer decides to pay where invoice and delivery match expectations, directing the bank of the payer to send electronic payment through the National Payments Association (NPA) to the bank of the payer, which in turn sends acknowledgement of that payment to the JPG service provider; or 4. the JPG service provider, after receipt of payment acknowledgement information from the bank of the payee issues a revocation of the JPG certificate information for the specified transaction to the banks of the payee and the payer, followed by distribution of the revocation information to the payee and the payer;

xi. Implementing contingency, wherein:
1. partial security interests are transmitted from the financial institution of the payer to a joint account of the payer and the payee;
2. the joint account is held by the Joint Payment Guarantee (JPG) Service Provider;
3. transmission is triggered by payment period time expiry;
4. the JPG service provider processes time information, and, upon the expiry of time as defined in the certificate information, processes the certificate information to decide whether the next method step is a long term payment hold or an immediate settlement;
5. in the case of an immediate settlement, the JPG service provider transmits a settlement request to the bank of the payer, which in turn sends the settlement amount to the bank of the payee, which sends receipt acknowledgement to the JPG service provider, after which the JPG service provider registers the settlement receipt information and distributes a copy of the same to the banks of the payee and the payer, for further distribution to the payee and the payer by their respective banks;
6. in the case of long term payment hold, the JPG service provider holds the settlement amount in a joint account until one or a plurality of settlement distributions is approved by the payer and the payee, after which settlement or settlements are processed in the manner of immediate settlement;

xii. Nullifying of contingency by mutual consent of the payer and the payee, or by timely payment by the payer to the payee.

2. The method of claim 1, in which the contingency trade credit process can be used to satisfy one or a plurality of portions of individual trade credit agreements, wherein the certificate information contains transaction information provided in accordance with the terms of one or a plurality of trade credit agreements.

3. The method of claim 1, in which a contingency trade credit process can be used to satisfy one or a plurality of portions of individual trade credit agreements, wherein the certificate information contains transaction information provided in accordance with a portion of terms of one or a plurality of trade credit agreements.

* * * * *